United States Patent
Koelling et al.

(10) Patent No.: US 10,197,081 B2
(45) Date of Patent: Feb. 5, 2019

(54) CHANNEL LOCK FASTENERS AND FASTENING SYSTEM

(71) Applicant: Lockdowel, Inc., Fremont, CA (US)

(72) Inventors: Fred Koelling, Foster City, CA (US); Bryan Koelling, Carmel Valley, CA (US); Daniel Savage, San Mateo, CA (US); Hoang Dang, San Jose, CA (US)

(73) Assignee: Lockdowel, Inc., Fremont, CA (US)

( * ) Notice: Subject to any disclaimer, the term of this patent is extended or adjusted under 35 U.S.C. 154(b) by 0 days.

(21) Appl. No.: 15/215,506

(22) Filed: Jul. 20, 2016

(65) Prior Publication Data
US 2017/0023043 A1 Jan. 26, 2017

Related U.S. Application Data

(60) Provisional application No. 62/194,800, filed on Jul. 20, 2015, provisional application No. 62/245,211, filed on Oct. 22, 2015.

(51) Int. Cl.
*F16B 12/20* (2006.01)
*F16B 12/22* (2006.01)
(Continued)

(52) U.S. Cl.
CPC ............ *F16B 12/22* (2013.01); *A47B 47/025* (2013.01); *A47B 47/042* (2013.01); *A47F 5/10* (2013.01);
(Continued)

(58) Field of Classification Search
CPC ........ F16B 12/12; F16B 12/125; F16B 12/20; F16B 12/22; F16B 12/10; F16B 12/24;
(Continued)

(56) References Cited

U.S. PATENT DOCUMENTS

| 979,853 A | 12/1910 | Hartshorn |
|---|---|---|
| 3,310,327 A | 3/1967 | Tremblay |
| (Continued) | | |

FOREIGN PATENT DOCUMENTS

| CA | 2280528 A1 | 4/2000 |
|---|---|---|
| CN | 103 216 505 A | 7/2013 |
| (Continued) | | |

OTHER PUBLICATIONS

International Search Report, dated Nov. 28, 2016, for corresponding International Application No. PCT/US2016/043205.
(Continued)

*Primary Examiner* — Michael P Ferguson
(74) *Attorney, Agent, or Firm* — Intellectual Property Law Group LLP

(57) ABSTRACT

A friction fit fastening system, that creates a firm and invisible connection between panels or substrates without the use of tools or glue, comprising a fastener and mating rout. The fastener has a ramp element that allows it to slide and connect to a mating rout. Different routs are used for different embodiments of the fasteners. The rout is formed directly in the panel face or edge or formed on a substrate by a router bit that has three cutting edges. The connections made by the friction fit fastening system are invisible. The fasteners can be installed at the manufacturing site so the user simply slides or inserts the fasteners into the appropriate slot or hole when assembling. The friction fit fastening system is easily removable from the panels making assembling and disassembling quick and easy because the fastener is made of one piece.

15 Claims, 39 Drawing Sheets

(51) Int. Cl.
 *A47B 47/02* (2006.01)
 *A47B 47/04* (2006.01)
 *A47F 5/10* (2006.01)
 *F16B 12/12* (2006.01)
 *F16B 12/24* (2006.01)

(52) U.S. Cl.
 CPC .... *F16B 12/125* (2013.01); *A47B 2230/0077* (2013.01); *A47B 2230/0081* (2013.01); *F16B 12/24* (2013.01)

(58) Field of Classification Search
 CPC .... F16B 12/26; F16B 12/46; F16B 2012/466; A47B 47/042; A47B 2230/0029; A47B 2230/0074; A47B 2230/0077; A47B 2230/0081; Y10T 403/7015; Y10T 403/7094
 See application file for complete search history.

(56) References Cited

U.S. PATENT DOCUMENTS

| | | | |
|---|---|---|---|
| 3,674,068 A | | 7/1972 | Lucci |
| 3,752,553 A | | 8/1973 | Bildahl et al. |
| 3,894,377 A | | 7/1975 | Welch |
| 4,199,907 A | | 4/1980 | Bains |
| 4,258,464 A | * | 3/1981 | Ullman, Jr. ............ A47B 57/22 144/220 |
| 4,332,205 A | | 6/1982 | Corl |
| 4,922,678 A | | 5/1990 | Scheiwiller |
| 4,932,105 A | | 6/1990 | Muller |
| 4,942,709 A | | 7/1990 | Waldron |
| 5,090,835 A | | 2/1992 | Cox |
| 5,380,119 A | | 1/1995 | Hadden |
| 5,430,983 A | | 7/1995 | Taipalensuu |
| D377,601 S | * | 1/1997 | Kozyrski ....................... D6/300 |
| 5,636,934 A | | 6/1997 | Nakanishi et al. |
| 5,934,486 A | | 8/1999 | Jarvis et al. |
| 6,000,186 A | | 12/1999 | Fielding |
| 6,186,698 B1 | | 2/2001 | Knapp |
| 6,234,596 B1 | | 5/2001 | Egger |
| 6,389,742 B1 | | 5/2002 | Wuster |
| 6,761,008 B2 | | 7/2004 | Chen et al. |
| 7,225,751 B2 | | 6/2007 | Rueckert |
| 8,104,989 B2 | | 1/2012 | Liu et al. |
| 8,291,594 B2 | * | 10/2012 | Etling ..................... B64G 1/58 244/159.1 |
| 8,549,796 B2 | | 10/2013 | Heather |
| 8,608,407 B1 | | 12/2013 | Vaughn et al. |
| 8,641,315 B2 | | 2/2014 | Liu et al. |
| 9,051,953 B2 | | 6/2015 | Imel et al. |
| 2003/0026651 A1 | * | 2/2003 | Ley ........................ E06B 3/96 403/401 |
| 2004/0067098 A1 | | 4/2004 | Sun |
| 2004/0223805 A1 | | 11/2004 | Benedetti et al. |
| 2005/0097851 A1 | | 5/2005 | Lubera et al. |
| 2006/0174579 A1 | | 8/2006 | Matson |
| 2008/0159806 A1 | | 7/2008 | Niswonger |
| 2010/0003077 A1 | | 1/2010 | Kelley |
| 2010/0079045 A1 | | 4/2010 | Yeh |
| 2010/0254757 A1 | * | 10/2010 | Saul ..................... F16B 12/125 29/428 |
| 2011/0085853 A1 | | 4/2011 | Liu |
| 2011/0255915 A1 | | 10/2011 | Chen et al. |
| 2012/0301217 A1 | | 11/2012 | Liu et al. |
| 2012/0321378 A1 | * | 12/2012 | Velez, Jr. ................ F16B 12/20 403/300 |
| 2013/0239509 A1 | | 9/2013 | Wang |
| 2013/0287484 A1 | | 10/2013 | Phillips |
| 2014/0150368 A1 | | 6/2014 | MacDonald |
| 2014/0294498 A1 | | 10/2014 | Logan |
| 2015/0147113 A1 | | 5/2015 | Crabtree |

FOREIGN PATENT DOCUMENTS

| | | | | |
|---|---|---|---|---|
| DE | 295 11 055 | * | 2/1996 | ............. F16B 12/46 |
| DE | 10 2011 122 697 | * | 6/2013 | ............. F16B 12/12 |
| JP | S05126547 U | | 10/1975 | |
| WO | WO 2015158622 A1 | | 10/2015 | |
| WO | WO 2016/133455 A1 | | 8/2016 | |

OTHER PUBLICATIONS

Written Opinion of the International Searching Authority, dated Nov. 28, 2016, for corresponding International Application No. PCT/US2016/043205.

* cited by examiner

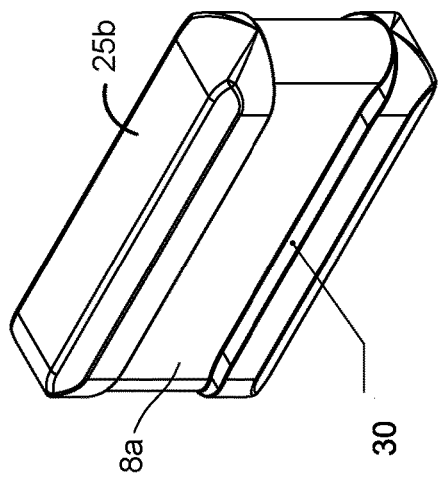
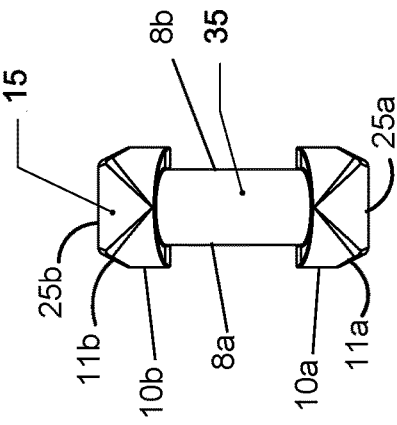
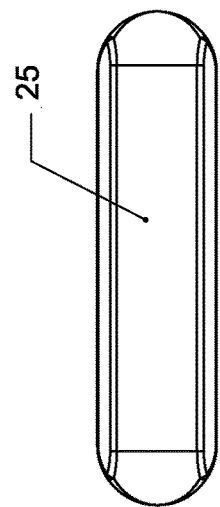
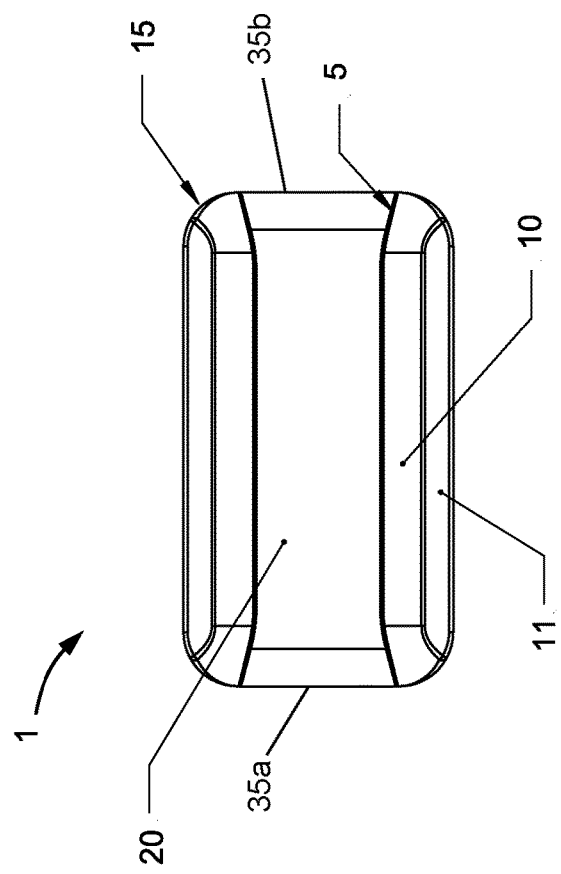

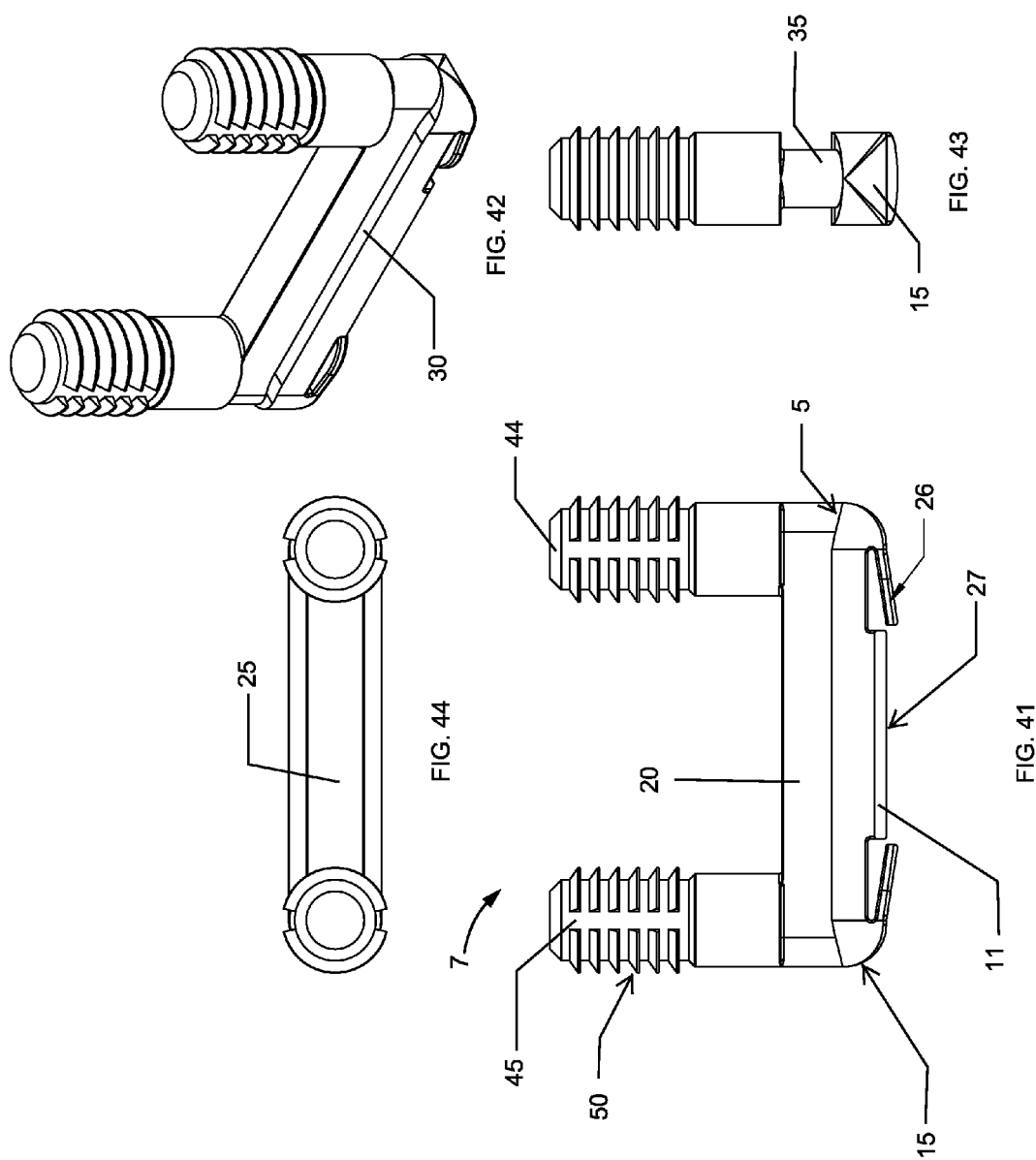

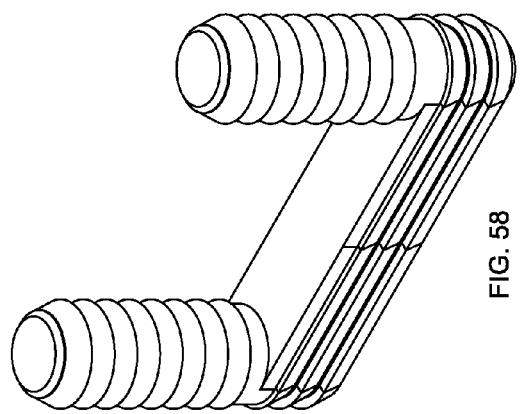
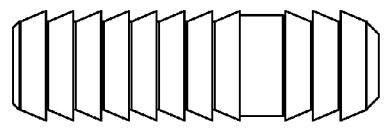
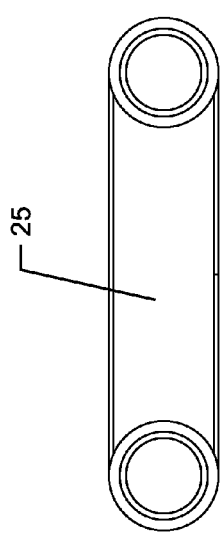
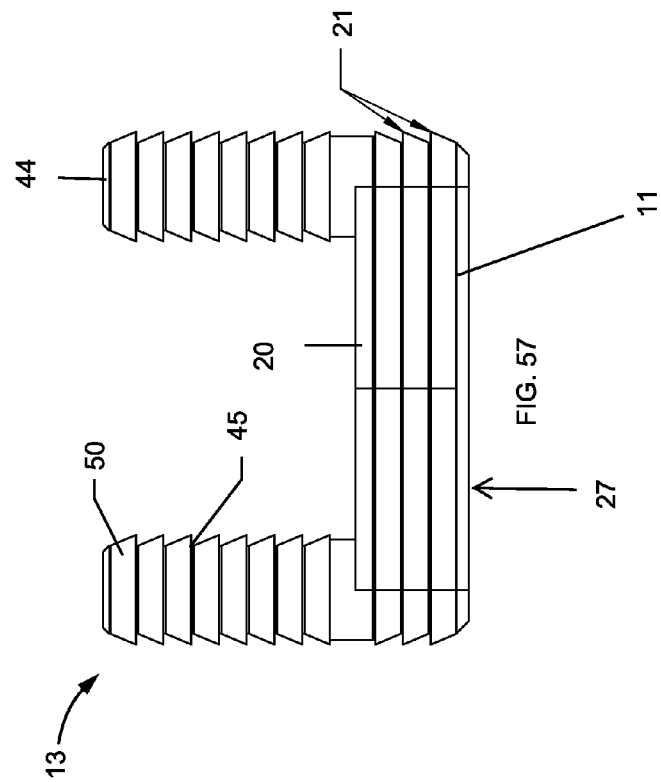

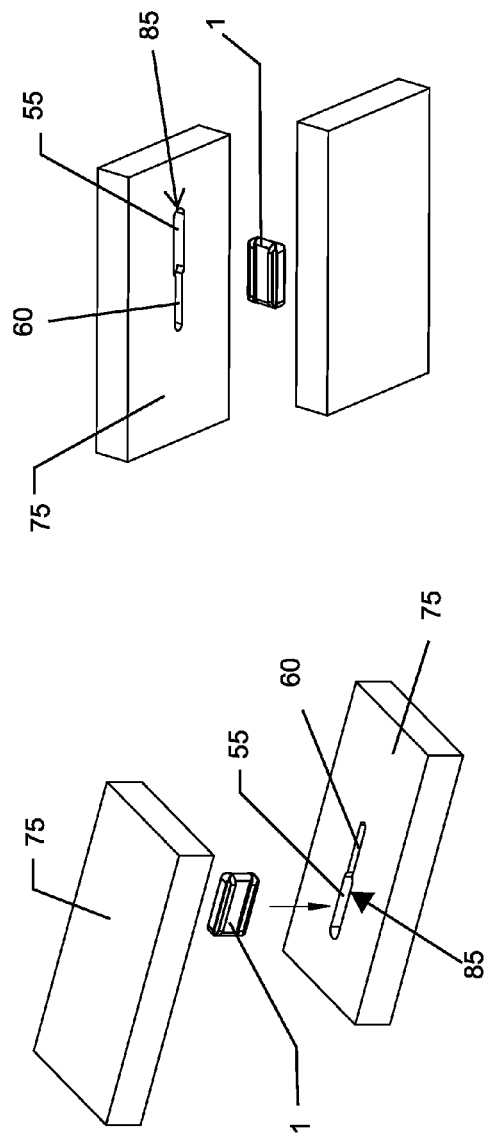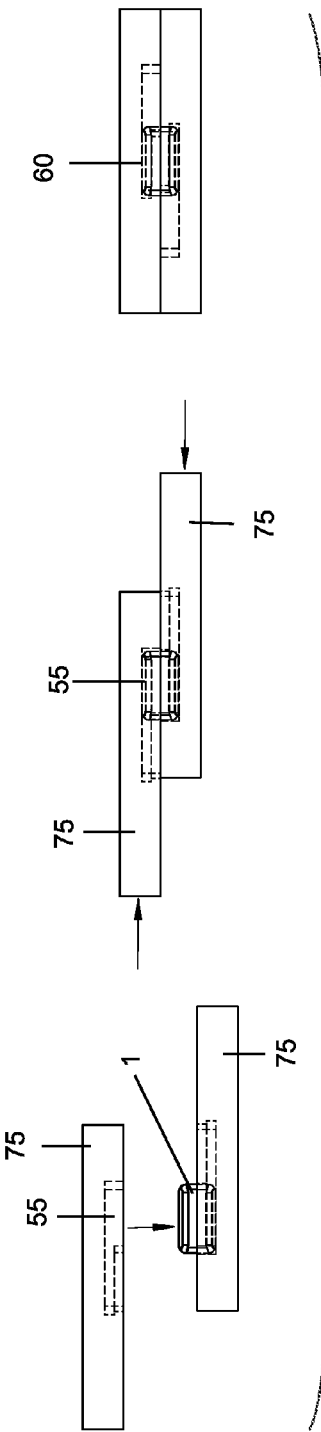
FIG. 68A
FIG. 68B

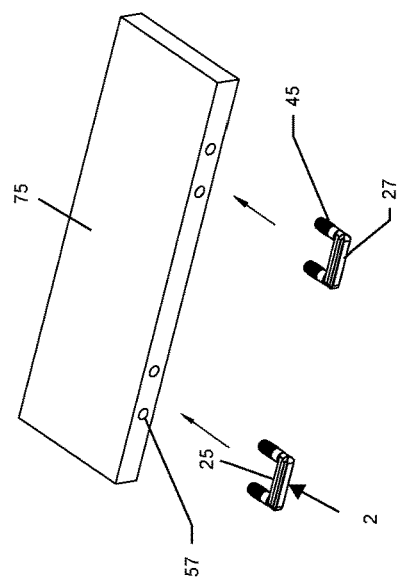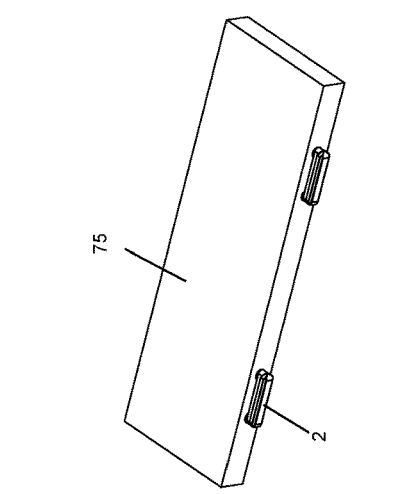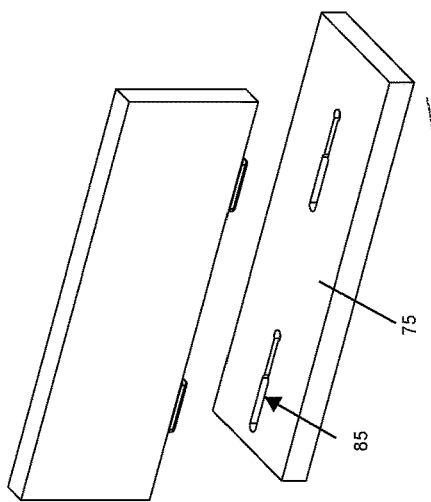
FIG. 69A
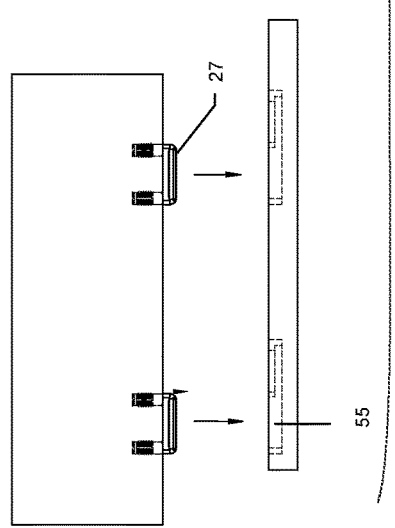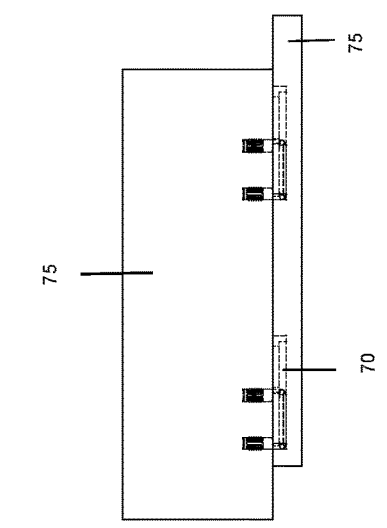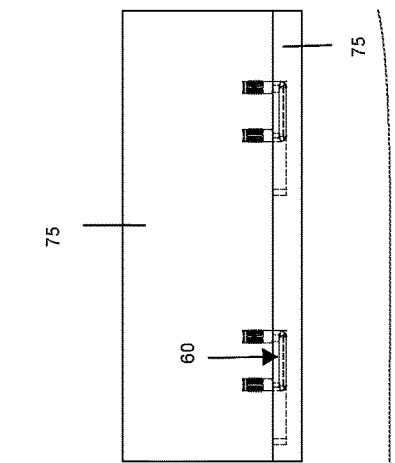
FIG. 69B

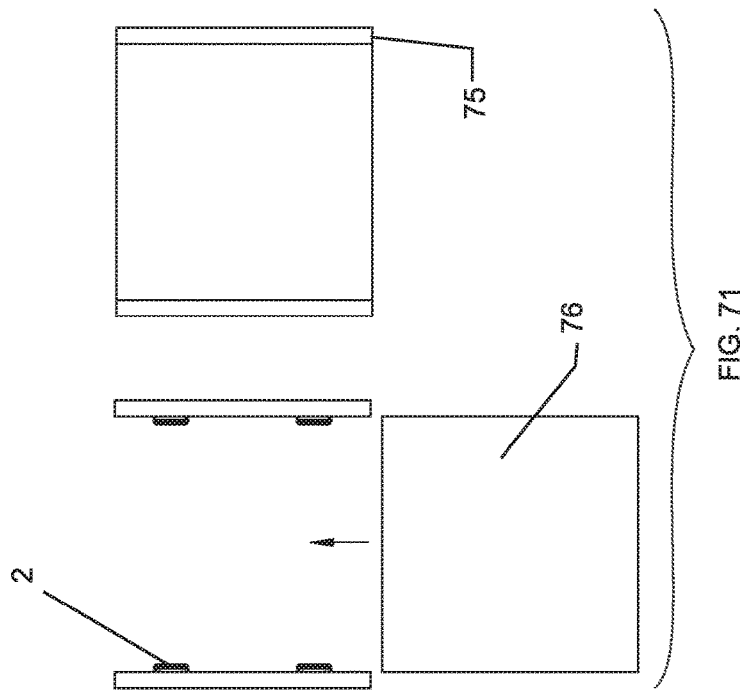
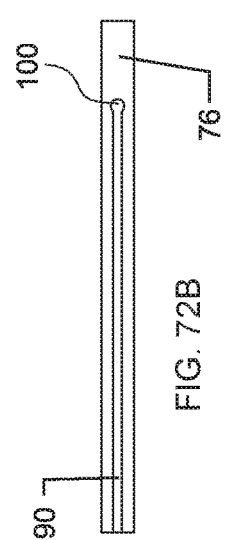
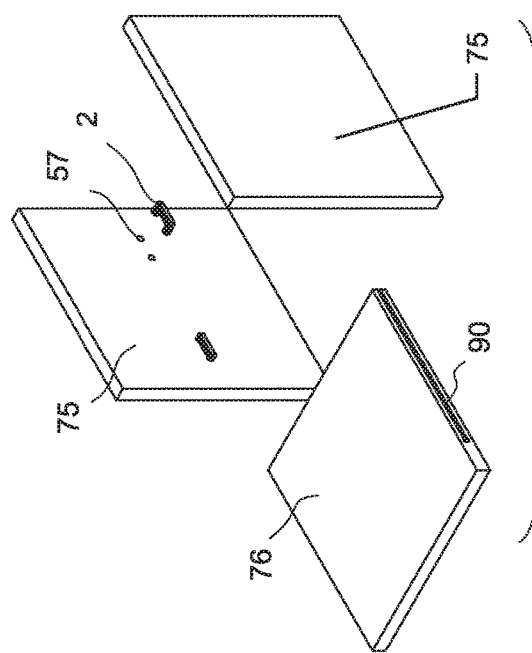
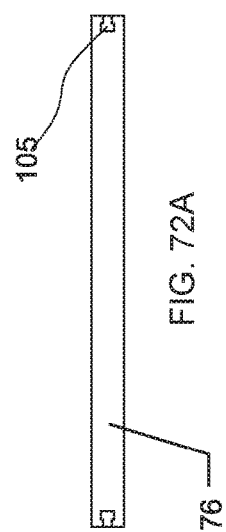

SECTION A-A

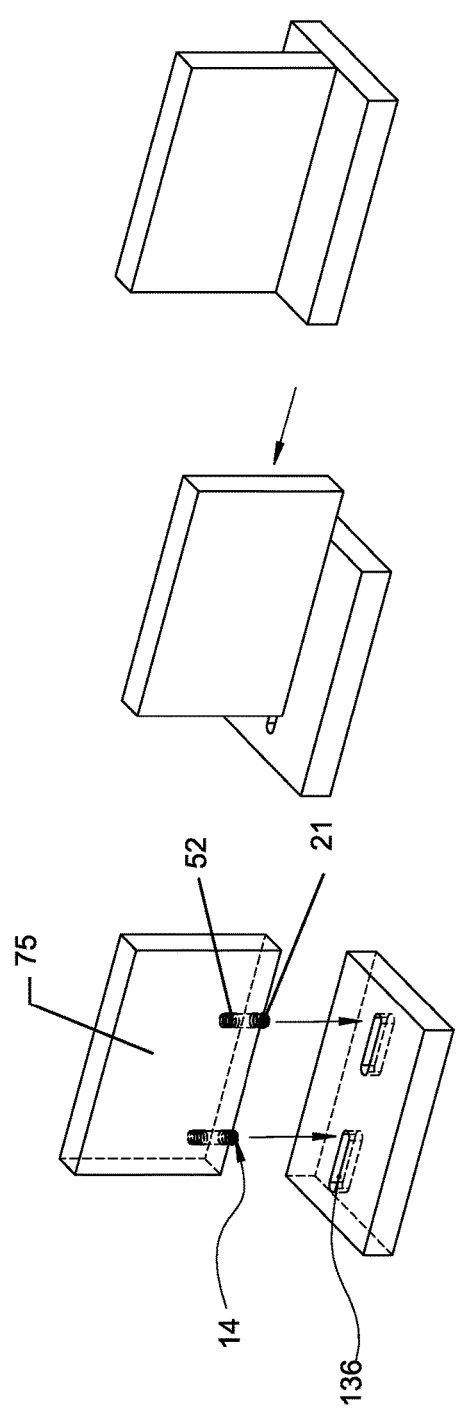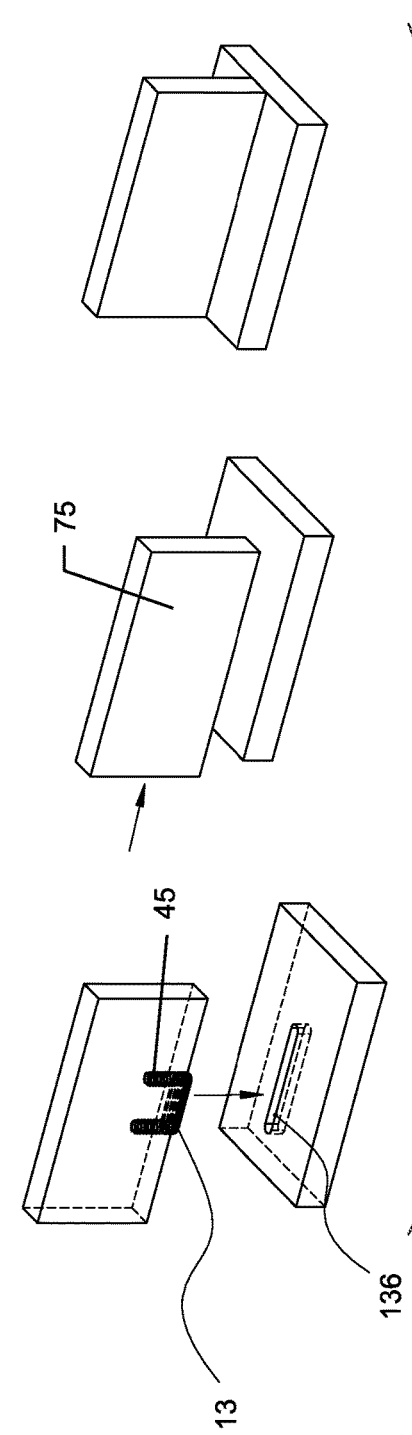

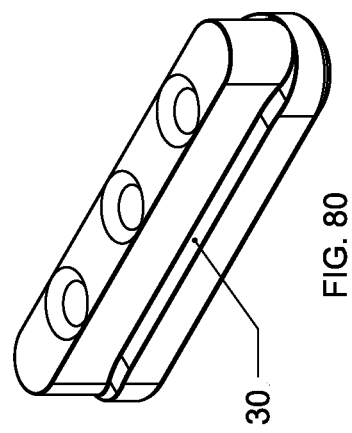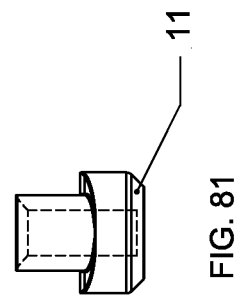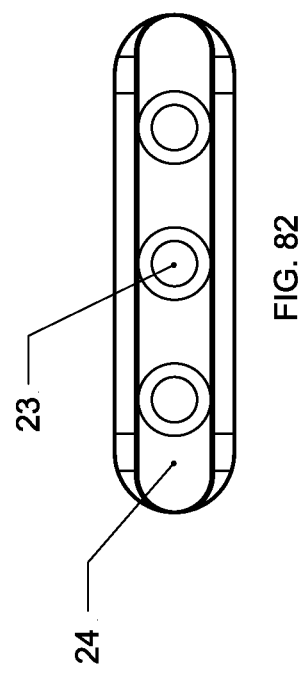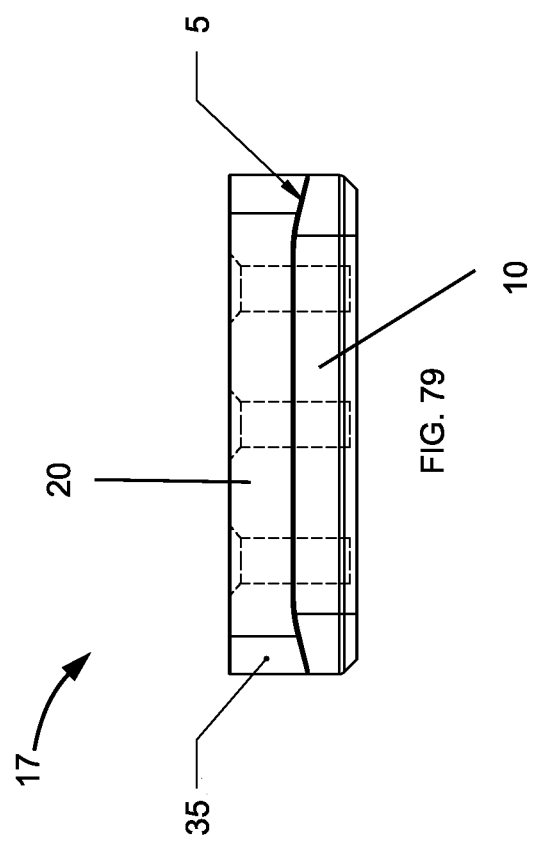

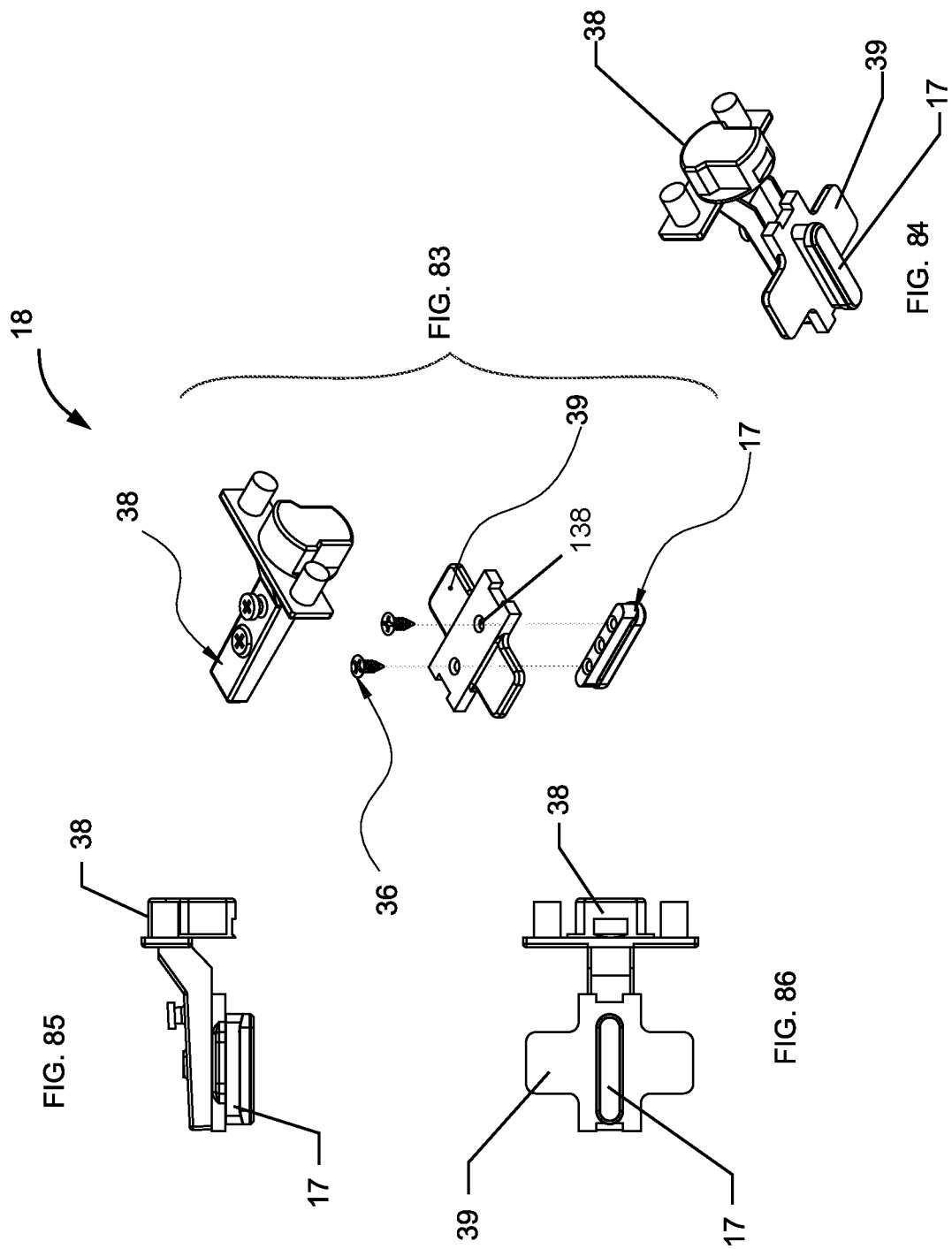

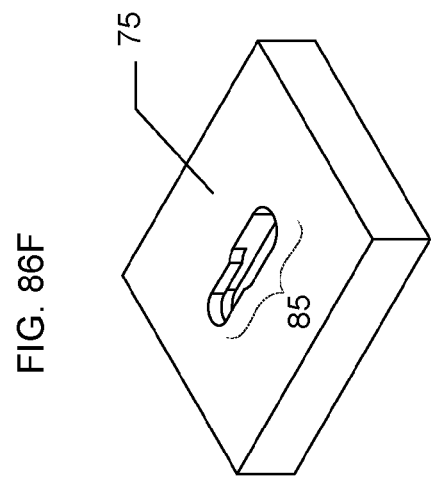
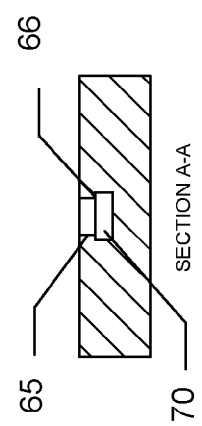
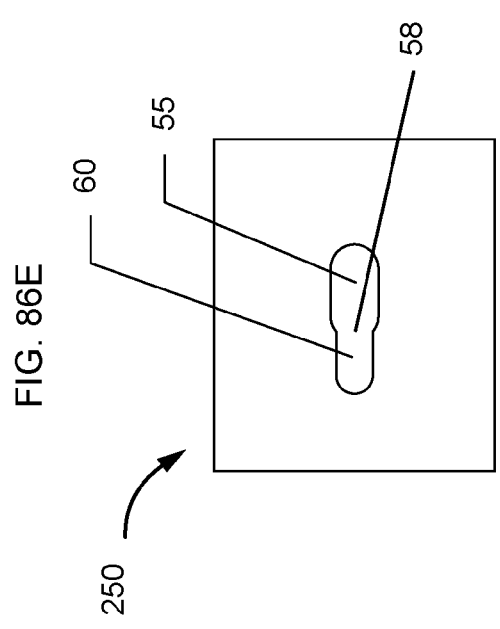
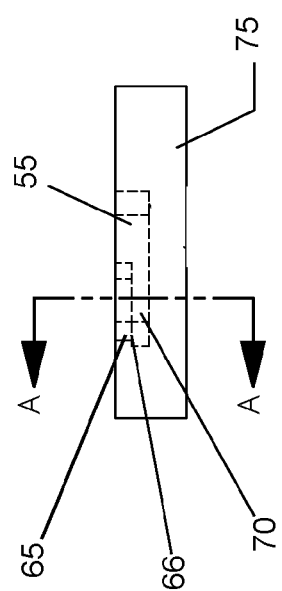

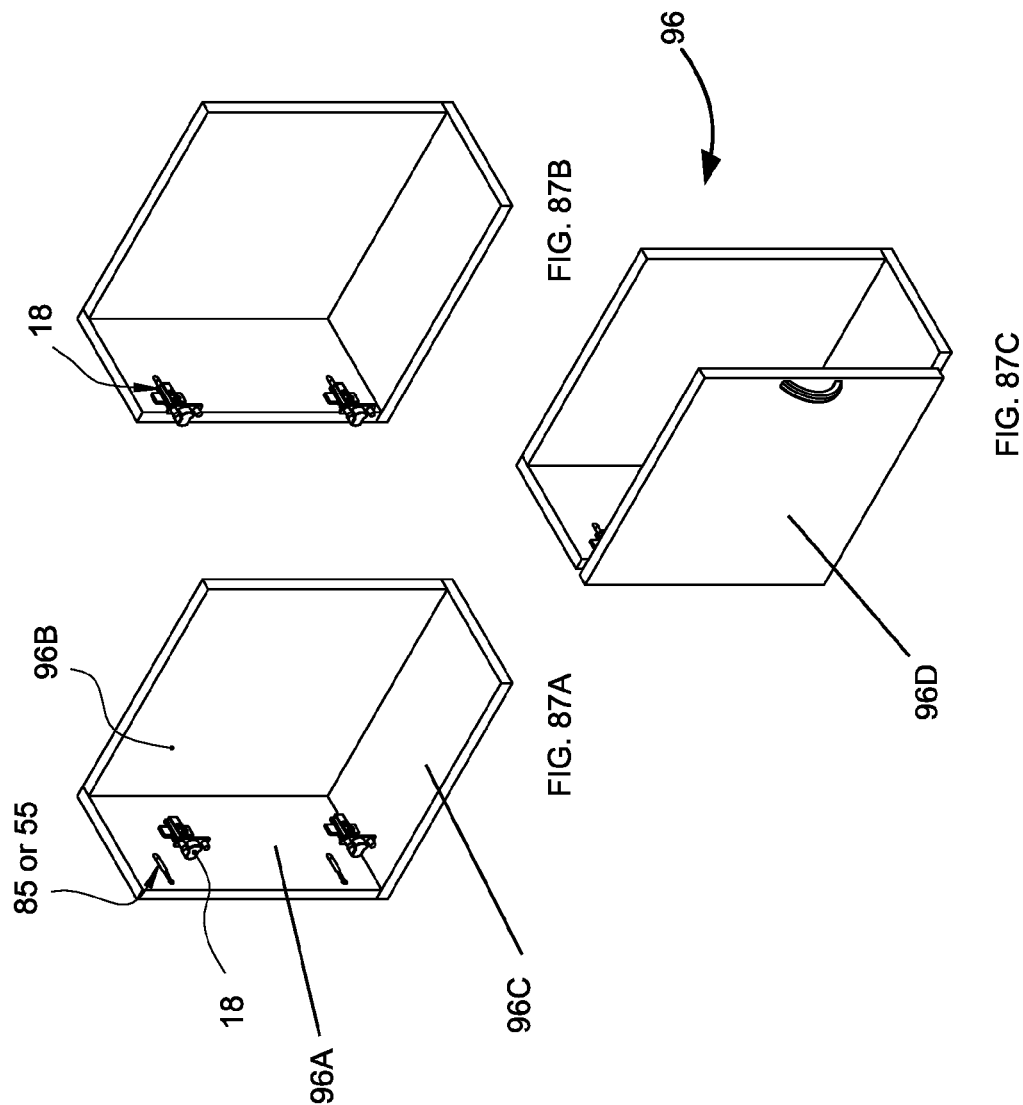

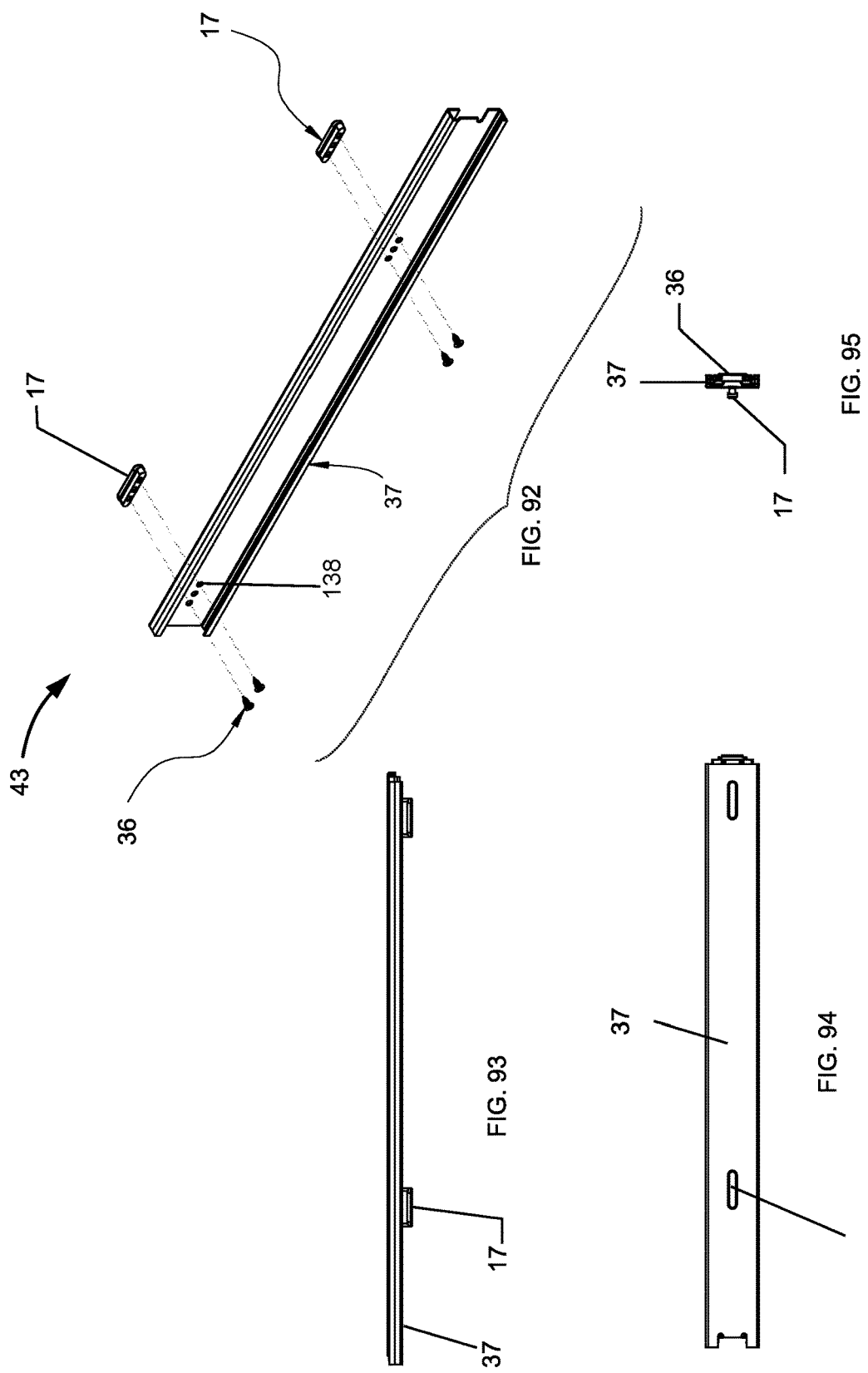

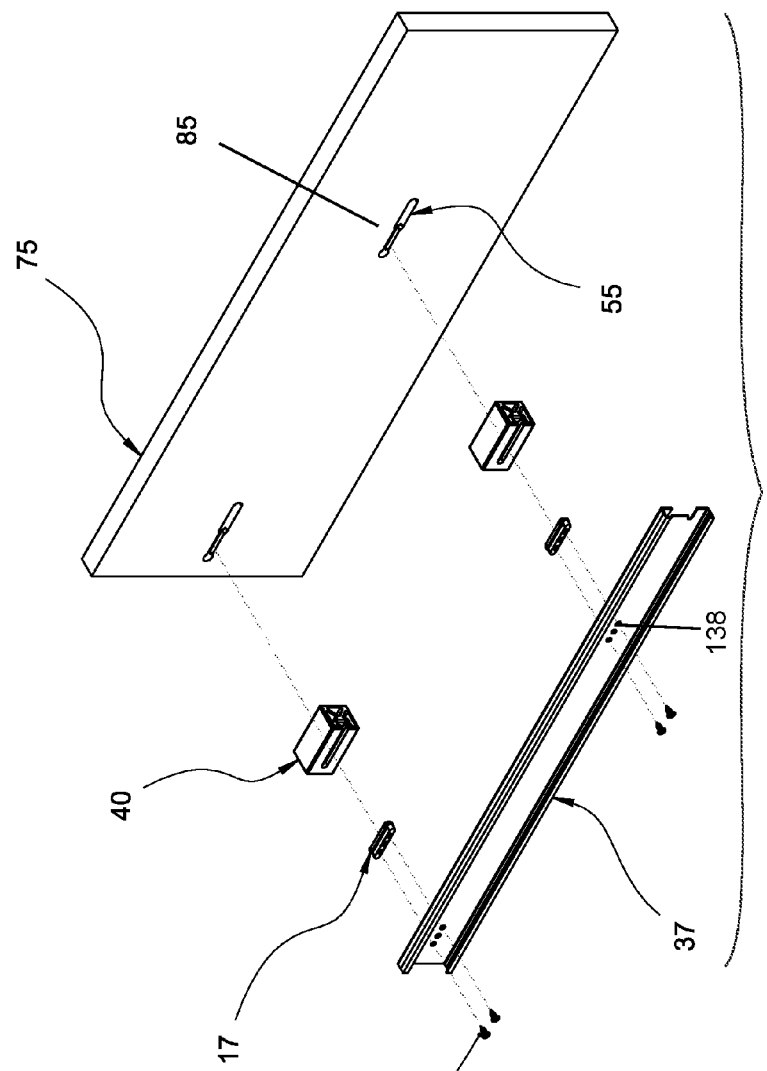
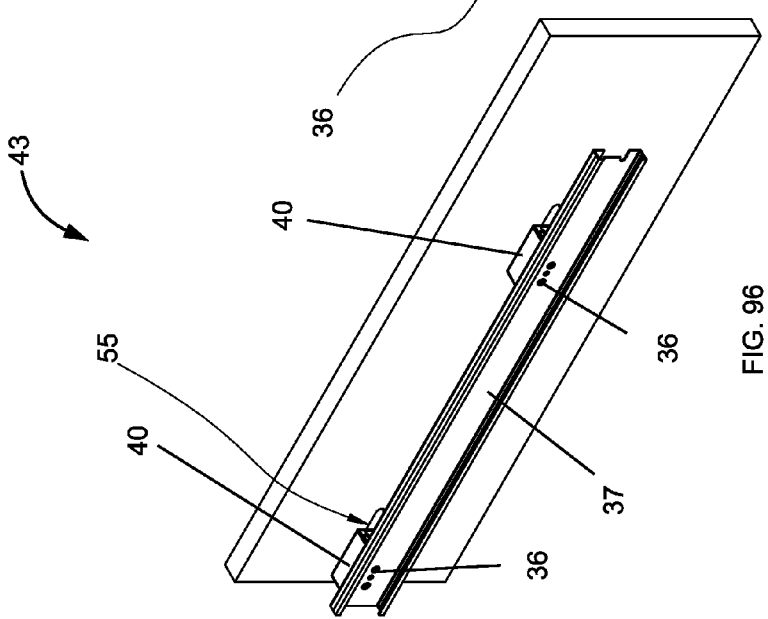

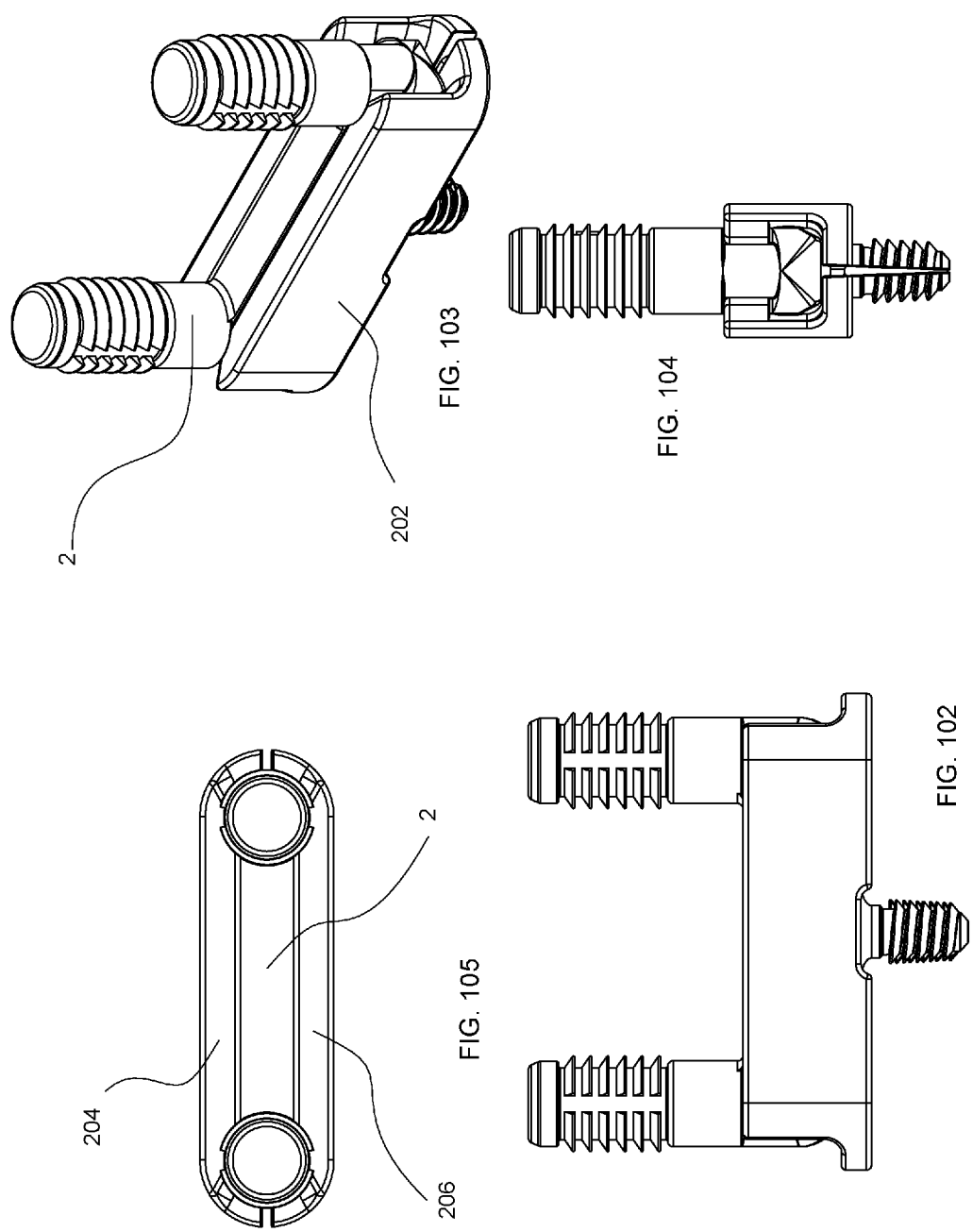

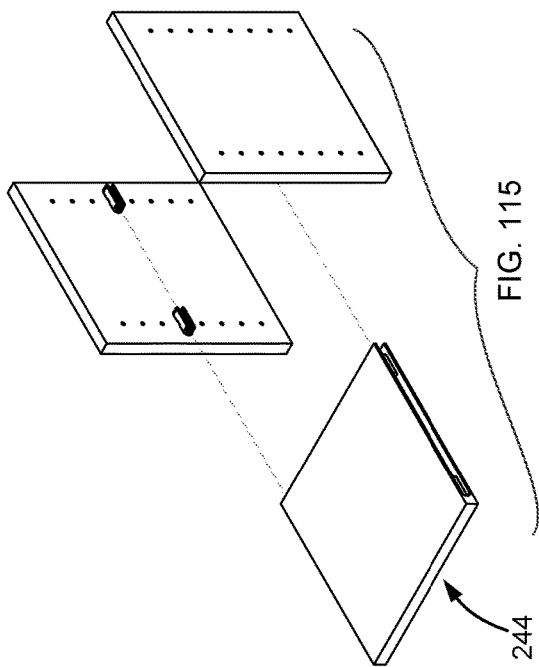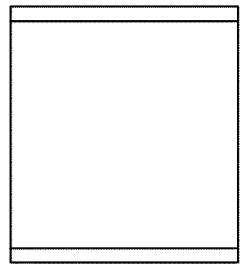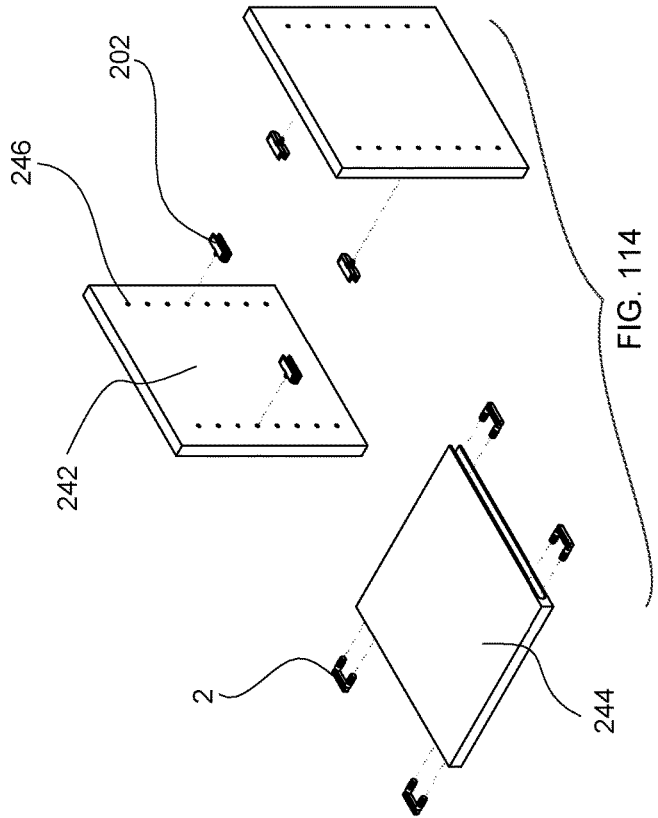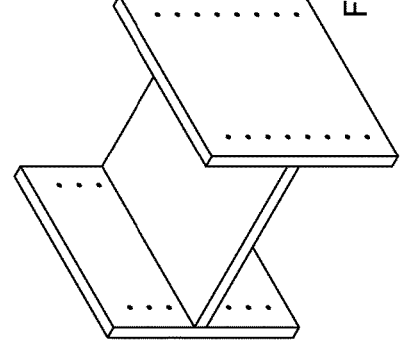

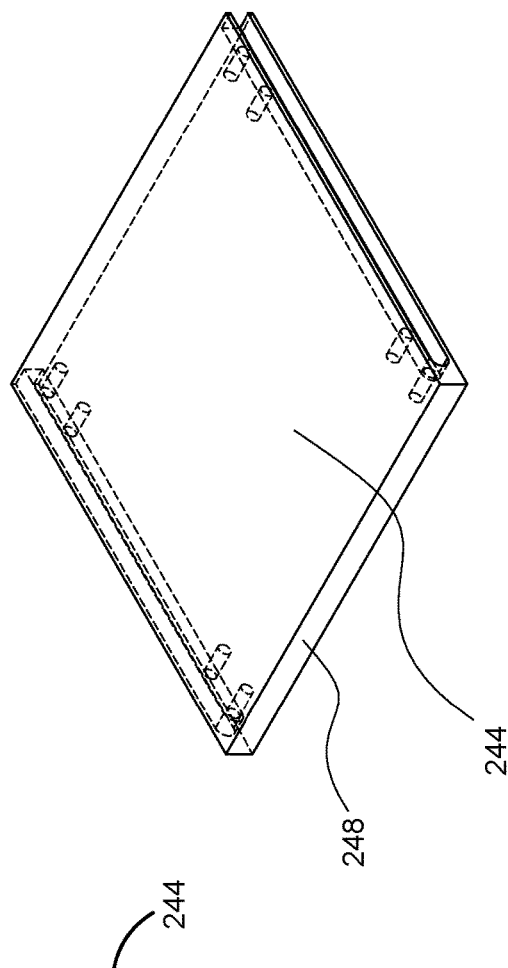
FIG. 119
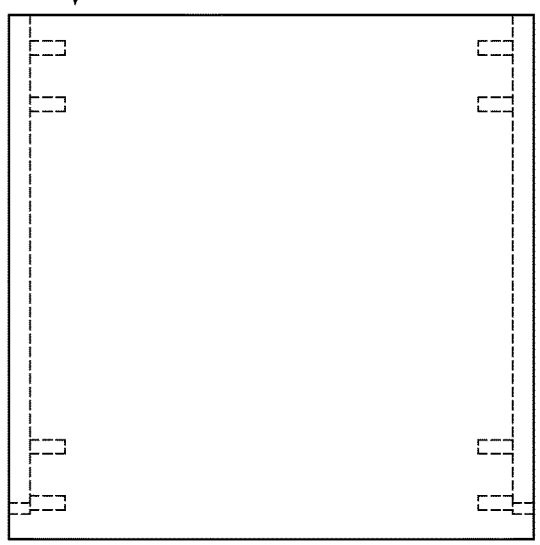
FIG. 118
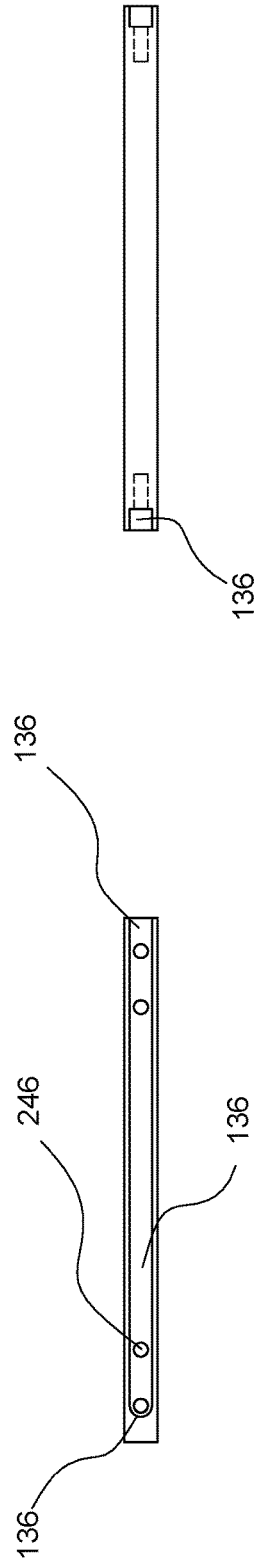
FIG. 121
FIG. 120

CHANNEL LOCK FASTENERS AND FASTENING SYSTEM

CROSS-REFERENCE TO RELATED APPLICATIONS

This application claims the benefit of U.S. Provisional Application No. 62/194,800, filed Jul. 20, 2015 and U.S. Provisional Application No. 62/245,211, filed Oct. 22, 2015, each of which is hereby incorporated by reference in its entirety.

BACKGROUND OF THE INVENTION

1. Field of Invention

This invention relates to fasteners; more particularly, to tool-less fastening systems for furniture, cabinets, fixtures, wood, plastic, metal, and a variety of substrates. It also pertains to fasteners that use, in one format or another, a tight friction fit as the pertinent fastening element.

2. Background

Increased commercialization of ready to assemble ("RTA") furniture and the requirement to assemble cabinets, store fixtures, and many other wood and plastic products, faster, easier and at the point of sale is driving the requirement to develop fastening systems capable of these attributes.

Additionally, the increasing cost of transportation has driven case good furniture manufacturers to develop a means of shipping their products in a more condensed manner so as to reduce total cargo volume. The problem is there is no cost effective way to quickly assembly the product after shipping that is simple, sturdy, tool-less and invisible after assembly has been or is currently available in the market. While many attempts have been made to develop fasteners for this purpose, none have been commercially successful in meeting all these characteristics.

For many years the only available products used to join wood parts together were nails, glue, screws, nuts and bolts. All of these fasteners were used primarily in the furniture or cabinet manufacturing plant for assembly of their products. Furniture, cabinets, and other wood products were preassembled at the factory and delivered to the store for purchase. The first products were of simple construction and were shipped with instructions on how to screw and glue them together. As the demand for less expensive ready to assemble furniture gained in popularity the first product to make it easier to assemble was the cam-lock. A cam-lock fastener is comprised of a metal pin that screwed into the face of the board and a round metallic female component that was placed in a hole close to the edge of the opposing wood panel. The metal pin is screwed into the opposing panel face and then inserted into the opposing hole where the cam housing is located. The head on the metal pin is engaged in a circular style cam. The cam has a location for a screw driver to turn it clockwise thus connecting the pin head to the cam and turning it such that the two panels are drawn together. The female housing containing the cam element has a small indent or cleat to catch the pin and keep it from backing out and coming loose.

While cam-locks are now ubiquitous in the wood working environment and have helped the industry to further develop products that can be mass produced and shipped flat packed they have serious limitations.

The first limitation is realized during installation when a bag full of hardware to include cam-locks and other fasteners and hardware arrive with the product. The time, complications and instructions required for many people to understand how to use these products can be significant. Many people, even though experienced and skilled in using these products can take hours in putting the final product together. Cam-locks and other fasteners currently available in the market cannot be preinstalled by the manufacturer which further complicates this process and adds considerable time for the consumer or professional installer to complete the assembly.

Another important issue is that cam-locks and screws come loose, even falling out in many cases after the assembly is completed. The assembled furniture or cabinet then begins to wobble and eventually comes completely loose or falls out. This problem is well known in the industry and necessitates most cam lock assembled furniture to be tightened up periodically to keep this from happening.

The third issue is with visibility. Furniture and cabinet manufacturers many times try to hide the fastener from visibility after assembly but this is very difficult to do in most cases. When fastener systems are visible after assembly the assumed value of the furniture is considerably less as it is both unsightly but also certifies that it was not assembled in a professionally equipped factory.

Following the invention of the cam-lock there have been several attempts to patent fastener devices that would compete with or improve on the cam-lock device. Most have failed for one reason or another. One of the common causes for failure is the impracticality of successfully installing the product using high speed commercially available machines.

As such, there is a need for a fastener which allows wood and plastic cabinet and furniture products to be flat packed and to be assembled 4 to 5 times faster than with other fastener systems currently available. Additionally the fasteners allow the manufacturer to pre-install the fasteners so there is no "bag" of hardware. The assembly only requires that the pre-installed fasteners connects to the slot in the wood and either slides or pushes the panels together. There is no need for any tools required or hours of frustration reading many pages of instructions. This new fastener results in a sturdy piece of furniture or cabinet with all fastener locations being invisible after assembly. Of considerable importance is that the fasteners remain tightly held in place and never require periodic tightening to keep the furniture or cabinet from becoming wobbly or loosening up. Of additional importance is that the fastener is extremely economical both in its method of manufacture and in its application or insertion into the wood panels. The panels only require the use of conventional wood working tools to install. Factories or woodworking shops with the ability to drill holes in the edge of a panel and to machine or router slots in the face of a panel can easily and successfully install these fasteners. Furthermore, there is a need to secure an adjustable "fixed shelf" having an invisible joint while using no tools during assembly.

SUMMARY

These features, advantages and other embodiments of the present invention are further made apparent, in the remainder of the present document, to those of ordinary skill in the art.

According to an embodiment of the present invention, there is a fastener comprising: a body having a first surface opposing a parallel second surface, a first face opposing a parallel second face, the first and second faces perpendicular to the first and second surfaces. Each of the first and second surfaces terminating at a first end and an opposing second end. The fastener further comprises a channel formed longitudinally into each of the first and second surfaces, spanning between the first and second ends. Each channel is recessed at a depth into a center of the body to form at least one step near the first face and extending longitudinally between the first and second ends.

According to an embodiment, each channel is formed with a protruding step with an interference edge formed near at least one of the faces. In an embodiment, the interference edge of each step terminates at each end with a ramp/tapering. According to another embodiment, each of the first and second faces terminates at each end as a tapering sled which meets the end of each ramp of a respective interference edge. In other embodiments, at least one of the faces transitions into the surfaces via a longitudinal chamfer or slanted edge. According to a further embodiment, each of the opposing ends is curved or rounded forming a wedge edge.

In another embodiment of the present invention, there is a fastener comprising: a body having a first surface opposing a parallel second surface, a first face opposing a parallel second face, the first and second faces perpendicular to the first and second surfaces, each of the first and second surfaces terminating at a rounded first end and opposing rounded second end. The first face and the second face, each have a chamfered edge where the first face and second face transition to the first surface, and where the first face and second face transition to the second surface. The fastener comprises a channel formed longitudinally into each of the first and second surfaces, spanning between the first and second ends. Furthermore, each channel is recessed at a depth into a center of the body to form a first step near the first face and a second step near the second face, each step extending longitudinally between the first and second ends.

In yet another embodiment of the present invention, there is a fastening system comprising: a fastener body having a first surface opposing a parallel second surface, a first face opposing a parallel second face, the first and second faces perpendicular to the first and second surfaces, each of the first and second surfaces terminating at a first end and opposing second end. At least the first face of the fastener body has chamfered edges where the first face transitions to the first surface and where the first face transitions to the second surface. The body further comprises a channel formed longitudinally into each of the first and second surfaces, spanning between the first and second ends, each channel recessed at a depth into a center of the body to form at least one step near the first face and/or the second face, and extending lengthwise between the first and second ends. The fastening system further comprises a slot formed into a surface of a substrate, the slot having a first section beginning from a first end and a second section begging from an opposing second end. The slot is configured to initially receive a face of the fastener body at the first section, and the second section is configured to slidingly receive the fastener body from the first section. In an embodiment, the first section of the slot is wider than the second section of the slot. In a further embodiment, the width of the second section changes from the top (surface) of the substrate along the depth of the slot.

According to another embodiment of the present invention, there is a fastening slot formed into a surface of a substrate and configured to receive a mating fastener body. The fastening slot comprises a first longitudinal groove and a second longitudinal groove, each continuously meeting at a conjunction point near a center of the slot. The first longitudinal groove having a width larger than a width of the second longitudinal groove, the widths tapering at the conjunction point. The fastening slot comprises a depth of the second longitudinal groove having a bottom portion and a top portion, the top portion being closer to the surface of the substrate, and the width of the depth differing between the bottom portion and the top portion. According to an embodiment, the width at the bottom portion is wider than a width of the top portion of the second longitudinal groove. The longitudinal groove may be substantially t-slotted.

In other embodiments of the present invention, the fastener comprises a symmetrically formed solid body. In embodiments, the body is made of a solid polymeric material or a non-metal material. In other embodiments, the body is made of solid metallic material.

According to embodiments of the present invention, at least one of the faces of the fastener is configured to engage a corresponding channel lock slot which is formed into a substrate. The height dimension of the fastener body is configured specifically to match with the dimension of a routed slot in a first substrate such that when one face is inserted into the routed slot, the other face is embedded in or otherwise attached to another substrate or element. In an embodiment, when one face of the fastener is inserted into a routed slot, the remaining portion of the fastener body is inserted at the opposing face into a corresponding routed slot routed in another substrate.

In another embodiment, while a first face of the fastener is insertable into a routed slot, the remaining portion of the fastener body is inserted at an opposing second face into a substrate by pressure, for example by way of two posts extending from the second face. In another embodiment, each of the two posts has a barbed outer surface.

The fastener locks substrates together such that the substrate edges are flush against each other, revealing no portion of the fastener. The fastener and slots are essentially hidden from view when installed, resulting in a connection having an invisible lock.

Additional features and benefits of the exemplary embodiment(s) of the present invention will become apparent from the detailed description, figures and claims set forth below.

BRIEF DESCRIPTION OF THE DRAWINGS

In order to more fully describe embodiments of the present invention, reference is made to the accompanying drawings. These drawings are not to be considered limitations in the scope of the invention, but are merely illustrative.

FIG. 1 illustrates a front view of the channel lock, according to an embodiment of the present invention.

FIG. 2 illustrates a perspective view of the channel lock, according to an embodiment of the present invention.

FIG. 3 illustrates a side view of the channel lock, according to an embodiment of the present invention.

FIG. 4 illustrates a top view of the channel lock, according to an embodiment of the present invention.

FIG. 41 illustrates a front view of the barbed channel lock with tabs, according to an embodiment of the present invention.

FIG. 42 illustrates a perspective view of the barbed channel lock with tabs, according to an embodiment of the present invention.

FIG. 43 illustrates a side view of the barbed channel lock with tabs, according to an embodiment of the present invention.

FIG. 44 illustrates a top view of the barbed channel lock with tabs, according to an embodiment of the present invention.

FIG. 57 illustrates a front view of the barbed channel slicer, according to an embodiment of the present invention.

FIG. 58 illustrates a perspective view of the barbed channel slicer, according to an embodiment of the present invention.

FIG. 59 illustrates a side view of the barbed channel slicer, according to an embodiment of the present invention.

FIG. 60 illustrates a top view of the barbed channel slicer, according to an embodiment of the present invention.

FIG. 68A-68B illustrates a panel assembly using a channel lock, according to an embodiment of the present invention.

FIG. 69A-69B illustrates a panel assembly using a barbed channel lock, according to an embodiment of the present invention.

FIG. 70 illustrates a slide on shelf assembly using a barbed channel lock, according to an embodiment of the present invention.

FIG. 71 illustrates a top view of the slide on shelf assembly using a barbed channel lock, according to an embodiment of the present invention.

FIGS. 72A and 72B illustrate a rear view and side view of a shelf respectively, according to an embodiment of the present invention.

FIG. 77 illustrates a panel assembly using the double barbed dowels, according to an embodiment of the present invention.

FIG. 78 illustrates a panel assembly using a barbed channel slicer, according to an embodiment of the present invention.

FIG. 79 illustrates a front view of the drawer slide/hinge channel lock, according to an embodiment of the present invention.

FIG. 80 illustrates a perspective view of the drawer slide/hinge channel lock, according to an embodiment of the present invention.

FIG. 81 illustrates a side view of the drawer slide/hinge channel lock, according to an embodiment of the present invention.

FIG. 82 illustrates a top view of the drawer slide/hinge channel lock, according to an embodiment of the present invention.

FIG. 83 illustrates an exploded view of a hinge assembly, according to an embodiment of the present invention.

FIG. 84 illustrates a bottom perspective view of a hinge assembly, according to an embodiment of the present invention.

FIG. 85 illustrates a side view of a hinge assembly, according to an embodiment of the present invention.

FIG. 86 illustrates a bottom view of a hinge assembly, according to an embodiment of the present invention.

FIG. 86E illustrates an elevational view of the hinge plate rout, according to an embodiment of the present invention.

FIG. 86F illustrates another elevational view of the hinge plate rout, according to an embodiment of the present invention.

FIG. 86G illustrates a cross sectional view of the hinge plate rout, according to an embodiment of the present invention.

FIG. 86H illustrates a cross sectional view of a hinge plate rout along A-A, according to an embodiment of the present invention.

FIGS. 87A-87C illustrates installation of a hinge assembly, according to an embodiment of the present invention.

FIG. 92 illustrates an exploded front perspective view of an installation of the drawer slide/hinge channel lock to a drawer slide, according to an embodiment of the present invention.

FIG. 93 illustrates a top view of an installed drawer slide/hinge channel lock to a drawer slide, according to an embodiment of the present invention.

FIG. 94 illustrates a rear view of an installed drawer slide/hinge channel lock to a drawer slide, according to an embodiment of the present invention.

FIG. 95 illustrates a side view of an installed drawer slide/hinge channel lock to a drawer slide, according to an embodiment of the present invention.

FIG. 96 illustrates an assembled view of the drawer slide, drawer slide/hinge channel lock, and spacer secured to a panel with double slots, according to an embodiment of the present invention.

FIG. 97 illustrates an exploded view of a drawer slide, drawer slide/hinge channel lock, and spacer installed on a panel with double slots, according to an embodiment of the present invention.

FIG. 102 illustrates a front view of the barbed channel lock installed on a channel lock shelf fastener, according to an embodiment of the present invention.

FIG. 103 illustrates a perspective view of the barbed channel lock installed on a channel lock shelf fastener, according to an embodiment of the present invention.

FIG. 104 illustrates a side view of a barbed channel lock installed on a channel lock shelf fastener, according to an embodiment of the present invention.

FIG. 105 illustrates a top view of a barbed channel lock installed on a channel lock shelf fastener, according to an embodiment of the present invention.

FIG. 107 illustrates a perspective view of one half of the channel lock shelf fastener, according to an embodiment of the present invention.

FIG. 108 illustrates a side view of one half of the channel lock shelf fastener, according to an embodiment of the present invention.

FIG. 109 illustrates a top view of one half of the channel lock shelf fastener, according to an embodiment of the present invention.

FIG. 110 illustrates a front view of the outer surface of the channel lock shelf fastener, according to an embodiment.

FIG. 111 illustrates a perspective view of the assembled adjustable shelf fastener side 1 and 2, according to an embodiment of the present invention.

FIG. 112 illustrates a side view of the assembled channel lock shelf fastener, according to an embodiment of the present invention.

FIG. 113 illustrates a top view of the assembled channel lock shelf fastener, according to an embodiment of the present invention.

FIGS. 114-117 illustrate an adjustable shelf assembly, according to an embodiment of the present invention.

FIGS. 118-121 illustrate a shelf, according to an embodiment of the present invention.

DETAILED DESCRIPTION OF SPECIFIC EMBODIMENTS

Figure 6:
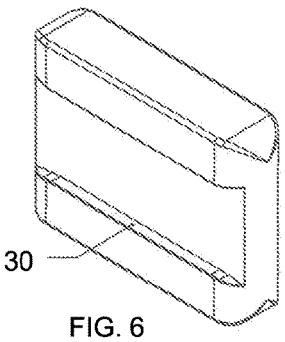
FIG. 6 illustrates a perspective view of another example of the channel lock, according to an embodiment of the present invention.

The description above and below and the drawings of the present document focus on one or more currently preferred embodiments of the present invention and also describe some exemplary optional features and/or alternative embodiments. The description and drawings are for the purpose of illustration and not limitation. Those of ordinary skill in the art would recognize variations, modifications, and alternatives. Such variations, modifications, and alternatives are also within the scope of the present invention. Section titles are terse and are for convenience only.

Embodiments of the present invention are ideally made out of a plastic or metal composite material. Aluminum or steel may be utilized for construction with a sheet metal type design. Metal embodiments are used when more shear strength is needed for a particular structure or used for higher temperature environments so the fasteners do not plasticize. It can potentially be made from other materials with the required mechanical properties for strength and flexibility. The objects upon which the fastening system may be applied are hardware, panels, substrates, other construction elements and connections, which can comprise a variety of materials including wood, plastic and/or metal alloys, composites, or combinations thereof. The term rout is given its ordinary meaning but can also refer to the double slot 85. A dado 136 can also be referred to as a slot. The channel lock fastener 1 has a stopping face 25 or the mounting face that can also be referred to as first face 25a (or keyslot stopping face 27) and the side opposing the stopping face 25 or the mounting face can also be referred to as the second face 25b. The wedge edges 35 can also be referred to as located at the first end 35a or second end 35b. The center support 20 can also be referred to as the channel. According to an embodiment of the present invention, the channel 20 is located on each side of the fastener 1, on a first surface 8a and second surface 8b. The key step 10 can also be referred to as the step.

FIGS. 1-97 illustrate various embodiments of the fasteners, made of one piece, and routs wherein the fastening system disclosed herein is used for attaching hardware, panels, substrates, other construction elements and connections. The embodiments of the channel lock 1 are made of one piece and require the face of a panel 75 or substrate to be routed and/or the edge to be drilled. The various embodiments of the fasteners described below provide connectivity between panels 75 or substrates without the use of glue or other adhesives. The fasteners themselves comprise latching structures and do not have a failure point. As described further below, the channel lock 1 utilizes an insertion ramp 5 and interference edge 30 to create a friction fit connection to a panel 75 when slid into the keyway 60 of the double slot 85.

Figure 5:
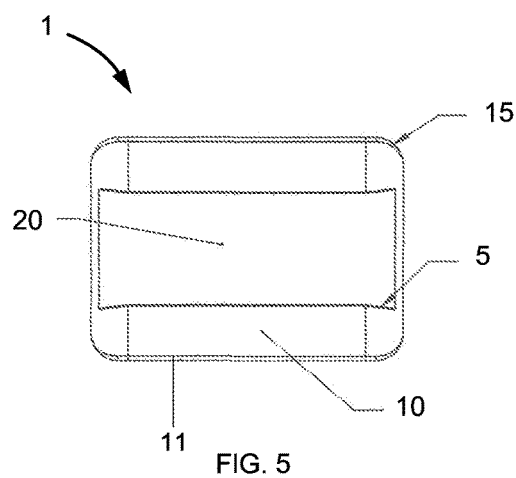
FIG. 5 illustrates a front view of another example of the channel lock, according to an embodiment of the present invention.
Figure 66B:
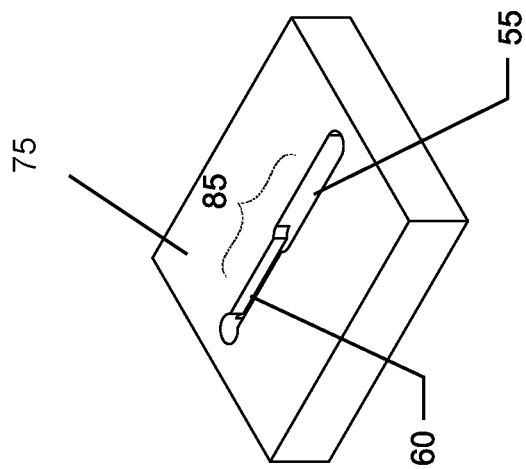
FIG. 66B illustrates another elevational view of a double slot having a router bit hole, according to an embodiment of the present invention.
Figure 66A:
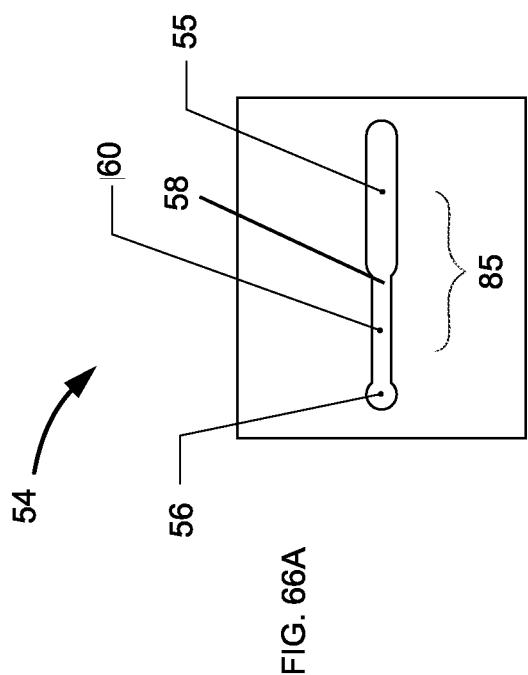
FIG. 66A illustrates an elevational view of the double slot having a router bit hole, according to an embodiment of the present invention.

FIGS. 1-8 illustrate two embodiments of the channel lock 1 fastener (hereinafter referred to as "channel lock"). The channel lock 1, according to an embodiment of the present invention comprising the insertion ramp 5, key step 10, insertion slot chamfer 11, sled 15, center support 20, stopping face 25, interference edge 30, and wedge edge 35. The channel lock 1 embodiment illustrated in FIGS. 1-8 can create a removable sturdy joint between two panels 75 or substrates that each have a routed double slot 85 as shown in FIGS. 66A and 66B. Referring to FIGS. 1-4, in an embodiment of the present invention, the channel lock 1 length is about 33 millimeters, the height is about 18 millimeters and the width is about 8 millimeters. This embodiment can be made of nylon material, however, other materials contemplated above can also be used. FIGS. 1 and 5 represent a front view of the channel lock 1, according to an embodiment of the present invention. The insertion ramp 5 guides the key step 10 into the undercut slot 70 (not shown, see FIG. 66A) while the sled 15 allows the motion to be smooth when the panels 75 (not shown, see FIG. 68A) are pushed together from each end and the channel lock 1 slides fully into the keyway 60 (not shown, see FIG. 64A). The center support 20 fits snug in the center support slot 65 (not shown, see FIG. 66A). The stopping face 25 is parallel to the surface of panel 75 and even on the bottom of the insertion/release slot 55 when pushed into the insertion/release slot 55 (not shown, see FIG. 68A). Referring now to FIG. 1, in one embodiment of the channel lock 1, an insertion slot chamfer 11 is present. The insertion slot chamfer 11 is located along an edge of the fastener where the stopping face 25 transitions to each side surface 8a, 8b. The insertion slot chamfer 11 guides the channel lock 1 into the insertion/release slot 55 (not shown, see FIG. 68A). This makes it easier to align the channel lock 1 with the insertion/release slot 55 to push the stopping face 25 toward the bottom of the insertion/release slot 55 before sliding it into the keyway 60 (not shown, see FIG. 68A).

Figure 8:
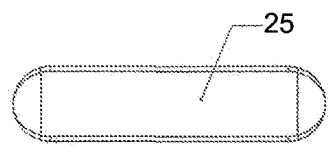
FIG. 8 illustrates a top view of another example of the channel lock, according to an embodiment of the present invention.
Figure 7:
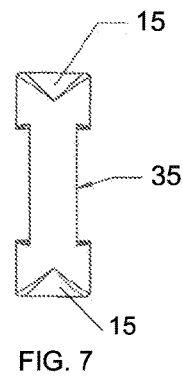
FIG. 7 illustrates a side view of another example of the channel lock, according to an embodiment of the present invention.

FIGS. 2 and 6 represent a perspective view of the channel lock 1, according to an embodiment of the present invention. The interference edge 30 creates a friction fit inside the undercut slot 70 (not shown, see FIG. 66A). FIGS. 3 and 7 illustrate a side view of the channel lock 1, according to an embodiment of the present invention. The sled 15 located on the channel lock 1 allows a smooth sliding motion of the channel lock 1 when moving along the double slot 85 (not shown, see FIG. 64A). The wedge edge 35 wedges the channel lock 1 tightly against the center support slot 65 and stops the channel lock 1 at the end of the keyway 60 or router bit hole 56 (not shown, see FIG. 64A, 64B). The interference fit of these multiple components create a rigid joint between the connected panels 75. As further shown, according an embodiment of the present invention, there is at least a step 10a formed near the first face 25a. Another opposing step 10b is located near the second face 10b. An insertion slot chamfer 11a is located along an edge of the fastener where the stopping face 25a transitions to first or second surface 8a, 8b, next to step 10a. A corresponding insertion slot chamfer 11b is located along an edge of the fastener where the stopping face 25b transitions to the first or second surface 8a, 8b, next to step 10b. FIGS. 4 and 8 illustrate a top view of the channel lock 1, according to an embodiment of the present invention. When the channel lock 1 is inserted into the insertion/release slot 55, the stopping face 25 faces down towards the bottom of the insertion/release slot 55 (not shown, see FIG. 68A). Once the stopping face 25 sits substantially even on the bottom of the insertion/release slot 55, the channel lock 1 is ready to slide into the keyway 60.

For barbed channel locks 2, further described below, the barbs 50 are semi-circle in shape which allows the barbs 50 to flex inward when pushed into eight millimeter diameter barbed post holes 57 (not shown, see FIG. 69A). The barbs 50 flex inward because their radii are greater than the barbed post holes 57 diameter. The diameter of the barbed post 45 is slightly smaller than the diameter of the barbed post holes 57, which provides room for the barbs 50 to flex into. When the fasteners are made of such material as nylon, the thin triangular cross-sectional geometry of the barbs 50 of the barbed channel lock 2, in relation to the diameter of the barbed post holes 57 allow the barbs 50 to flex easily when the barbed posts 45 are inserted into the barbed post holes 57. This decreases the insertion force needed to install the barbed channel lock 2 into the barbed post holes 57 and reduces the risk of creating stress cracks that can weaken the panel 75 or substrate. As such, flexible barbs 50 have larger radii than rigid barbs in relation to the diameter of the barbed post holes 57. The larger flexible barbs 50 radii create more interference between the barbs 50 and the barbed post holes 57 which increases the holding strength of the barbed channel lock 2 to the panel 75 or substrate. Due to this interference, the barbs 50 prevent the barbed channel lock 2 from being removed from the barbed post holes 57 after insertion. When tension is placed on the barbed channel lock 2 to remove the barbed post 45 from the barbed post holes 57, the barbs 50 can only slightly flex backward towards its initial position before digging into the panel 75 or substrate. Since the barbs 50 are secure in the substrate when the barbed channel lock 2 is under tension, the joint remains solid and sturdy.

Figure 12:
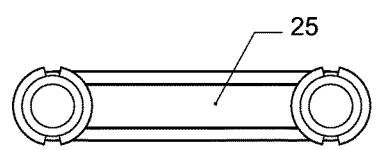
FIG. 12 illustrates a top view of the barbed channel lock, according to an embodiment of the present invention.
Figure 9:
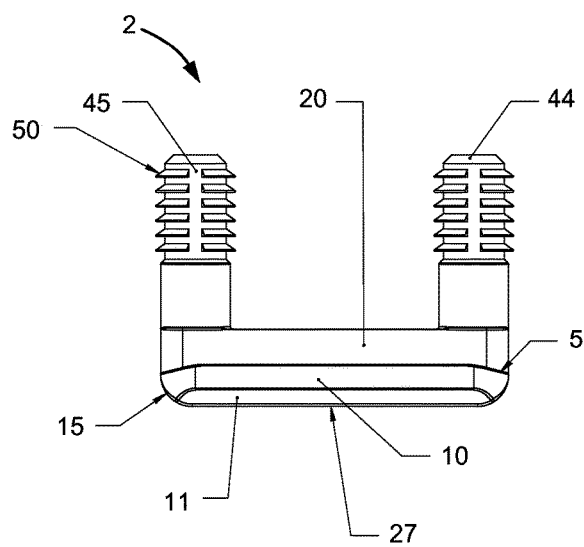
FIG. 9 illustrates a front view of the barbed channel lock, according to an embodiment of the present invention.
Figure 13:
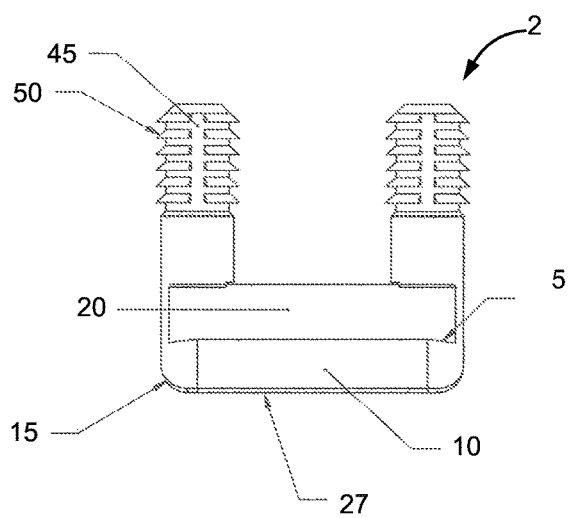
FIG. 13 illustrates a front view of another example of the barbed channel lock, according to an embodiment of the present invention.

FIGS. 9-20 illustrate three embodiments of the barbed channel lock 2, which comprise of one piece. The barbed channel lock 2, according to an embodiment of the present invention comprising the insertion ramp 5, key step 10, insertion slot chamfer 11, sled 15, center support 20, stopping face 25, key slot stopping face 27, interference edge 30, wedge edge 35, barbed post 45, barb 50. FIGS. 9 and 13, illustrate a front view of the barbed channel lock 2 in two different embodiments. The length is about 40 millimeters, height of about 29 millimeters, and width of about 8 millimeters. The material can be nylon but other abovementioned material can be contemplated. The insertion ramp 5 guides the key step 10 into the undercut slot 70 (not shown, see FIG. 66A) while the sled 15 allows the motion to be smooth. The center support 20 fits snug in the center support slot 65 (not shown, see FIG. 66A). The center support slot 65 is compressed between the interference edge 30 and a connecting panel 75 to create a tight friction fit in which the mating surfaces of the two connecting panels 75 are cinched together. The key step 10 slides into the undercut slot 70 and the key slot stopping face 27 is substantially flushed against the bottom of the keyway 60 when the barbed channel lock 2 is secure in the double slot 85. The barbed posts 45 are inserted into a panel 75 via two appropriately drilled barbed post holes 57 until the stopping face 25 is seated substantially against the surface of the panel 75 and the barbs 50 are secure in the panel 75 (not shown, see FIG. 69A). The barbed post holes 57 are about 8 millimeters in diameter, 21 millimeters in depth and 32 millimeters apart. The key slot stopping face 27 is substantially flushed against the undercut slot 70 when the barbed channel lock 2 is in the keyway 60 of the double slot 85. The embodiment shown in FIG. 9 also comprises an insertion hole chamfer 44, which helps guide the barbed posts 45 into the barbed post holes 57.

Figure 10:
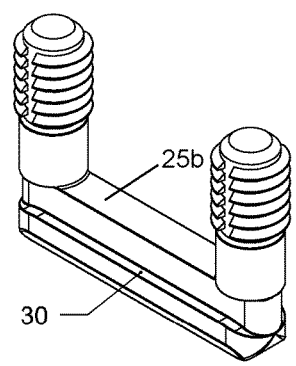
FIG. 10 illustrates a perspective view of the barbed channel lock, according to an embodiment of the present invention.
Figure 11:
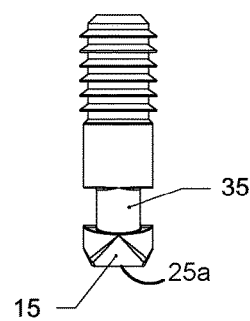
FIG. 11 illustrates a side view of the barbed channel lock, according to an embodiment of the present invention.
Figure 16:
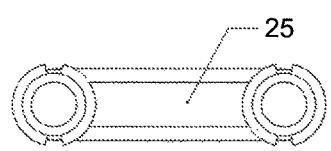
FIG. 16 illustrates a top view of another example of the barbed channel lock, according to an embodiment of the present invention.
Figure 14:
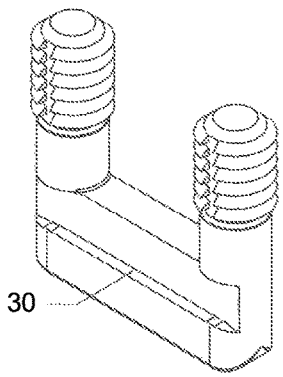
FIG. 14 illustrates a perspective view of another example of the barbed channel lock, according to an embodiment of the present invention.
Figure 15:
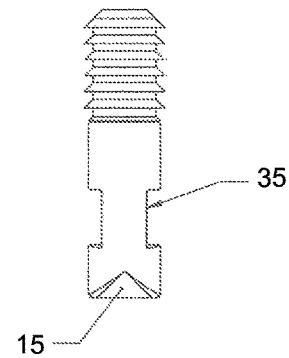
FIG. 15 illustrates a side view of another example of the barbed channel lock, according to an embodiment of the present invention.
Figure 18:
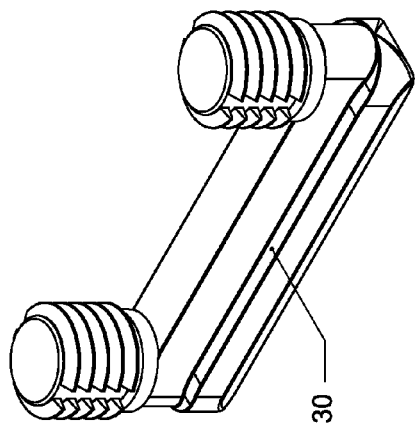
FIG. 18 illustrates a perspective view of yet another example of the barbed channel lock, according to an embodiment of the present invention.
Figure 19:
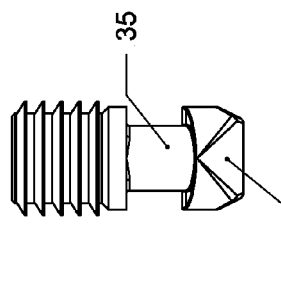
FIG. 19 illustrates a side view of yet another example of the barbed channel lock, according to an embodiment of the present invention.
Figure 20:
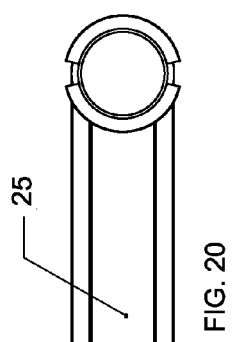
FIG. 20 illustrates a top view of yet another example of the barbed channel lock, according to an embodiment of the present invention.
Figure 17:
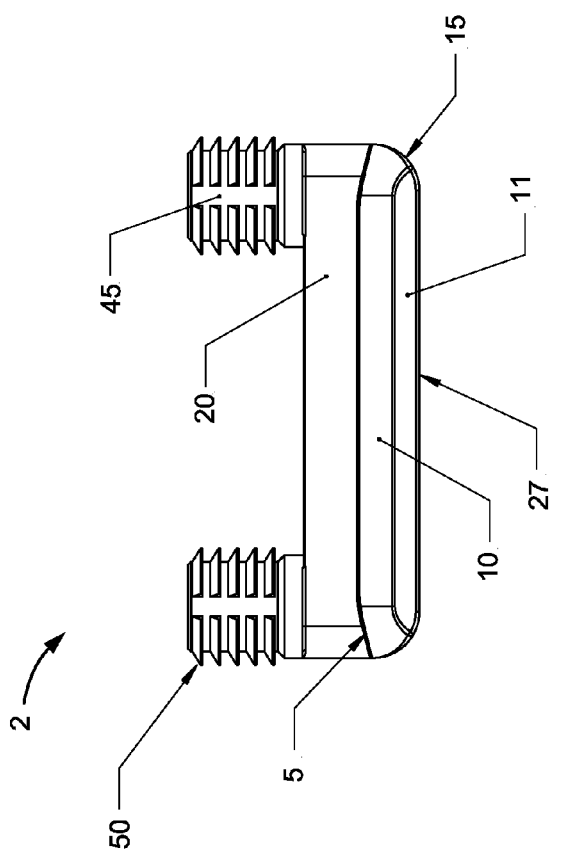
FIG. 17 illustrates a front view of yet another example of the barbed channel lock, according to an embodiment of the present invention.

FIGS. 10 and 14, illustrate a perspective view of the barbed channel lock 2 in two different embodiments. The interference edge 30 creates a friction fit inside the undercut slot 70. FIGS. 11 and 15, illustrate a side view of the barbed channel lock 2 in two different embodiments. The sled 15 located on the barbed channel lock 2 allows a smooth sliding motion of barbed channel lock 2 when moving along the double slot 85. The wedge edge 35 wedges the barbed channel lock 2 tightly against the center support slot 65 and stops it at the end of the keyway 60 or router bit hole 56. The interference fit of these multiple components create a rigid joint between the connected panels 75 (not shown, see FIG. 69B). FIGS. 12 and 16, illustrate a top view of the barbed channel lock 2, in two different embodiments. When the barbed channel lock 2 is inserted into the barbed post holes 57 of a panel 75 or substrate, the stopping face 25 is substantially even against the surface of the panel 75 or substrate and stops the barbed channel lock 2 from being inserted deeper into the substrate or panel 75 (not shown, see FIG. 69A).

FIGS. 17-20, illustrate yet another embodiment of the barbed channel lock 2. This embodiment of the barbed channel lock 2, functions substantially the same as the other barbed channel lock 2 embodiments. However, it is a 9 millimeter barbed channel lock 2 comprising about a 40 millimeter length, about an 18 millimeter height and about an 8 millimeter width. This embodiment can be made of nylon in addition to the other materials mentioned before. The 9 millimeter barbed channel lock 2 embodiment requires no tools for the user to use when they are preinstalled from the factory into the 8 millimeter barbed post holes 57. The barbed post 45 is installed on the face of a panel 75 rather than on the edge. The 9 millimeter barbed channel lock 2 provides a means of connection between two faces of two panels 75 or substrate. To install a 9 millimeter barbed channel lock 2 and connect two panels 75 together, it requires drilling two 8 millimeter barbed post holes 57 about 9 millimeters deep into the face of one panel 75 and routing the double slot 85 into the face of another panel 75. Further, if a drilled face of a panel 75 or substrate needs to be connected to a panel 75 edge containing a double slot 85, or slotted edges 90, the 9 millimeter barbed channel lock 2 can be used (not shown, see FIG. 70). Two of the 9 millimeter barbed channel lock 2 can be installed onto two opposing sides of a singular panel 75 that is no less than 18 millimeters thick utilizing only two 8 millimeter diameter holes drilled through the panel 75 face. The 9 millimeter barbed channel lock 2 uses the same configured double slot 85 as the barbed channel lock with holes 4 and barbed channel lock 2; however, the barbed post holes 57 have a diameter of about 8 millimeters and depth of about 9 millimeters.

Figure 22:
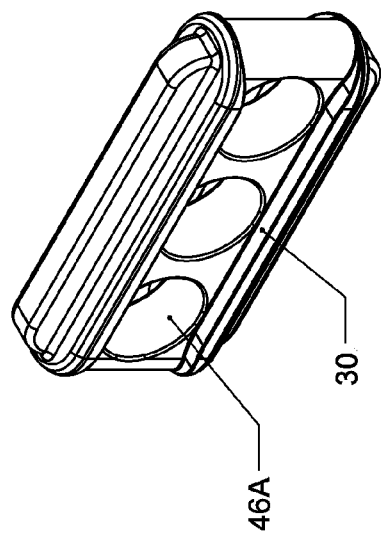
FIG. 22 illustrates a perspective view of the channel lock with holes, according to an embodiment of the present invention.
Figure 23:
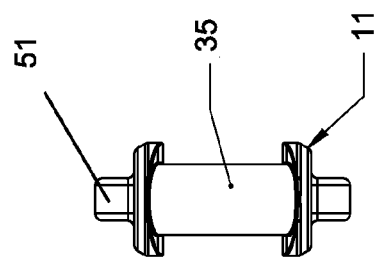
FIG. 23 illustrates a side view of the channel lock with holes, according to an embodiment of the present invention.
Figure 24:
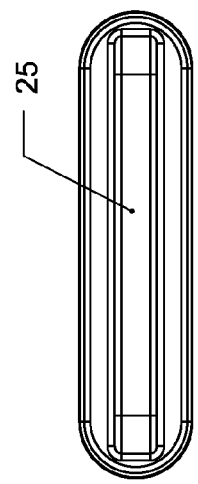
FIG. 24 illustrates a top view of the channel lock with holes, according to an embodiment of the present invention.
Figure 21:
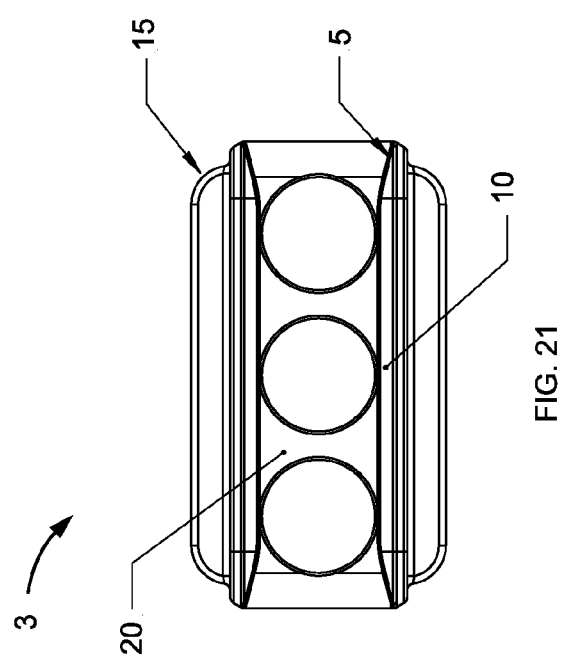
FIG. 21 illustrates a front view of the channel lock with holes, according to an embodiment of the present invention.
Figure 26:
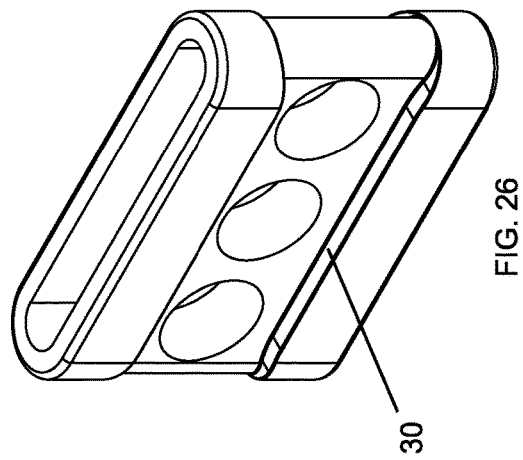
FIG. 26 illustrates a perspective view of another example of the channel lock with holes, according to an embodiment of the present invention.
Figure 27:
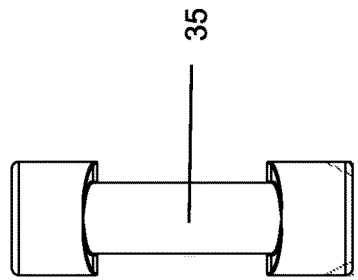
FIG. 27 illustrates a side view of another example of the channel lock with holes, according to an embodiment of the present invention.
Figure 28:
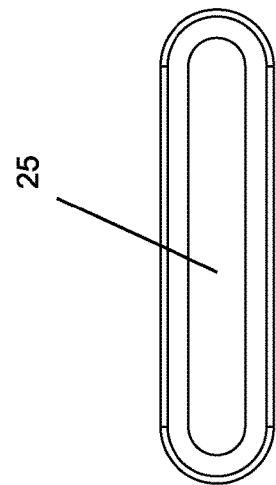
FIG. 28 illustrates a top view of another example of the channel lock with holes, according to an embodiment of the present invention.
Figure 25:
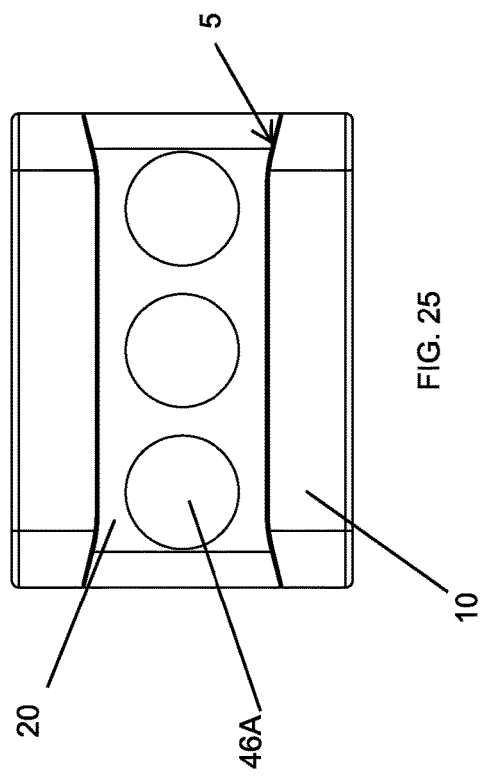
FIG. 25 illustrates a front view of another example of the channel lock with holes, according to an embodiment of the present invention.
Figure 30:
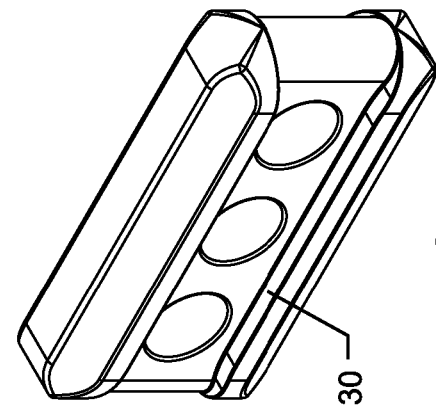
FIG. 30 illustrates a perspective view of yet another example of the channel lock with holes, according to an embodiment of the present invention.
Figure 29:
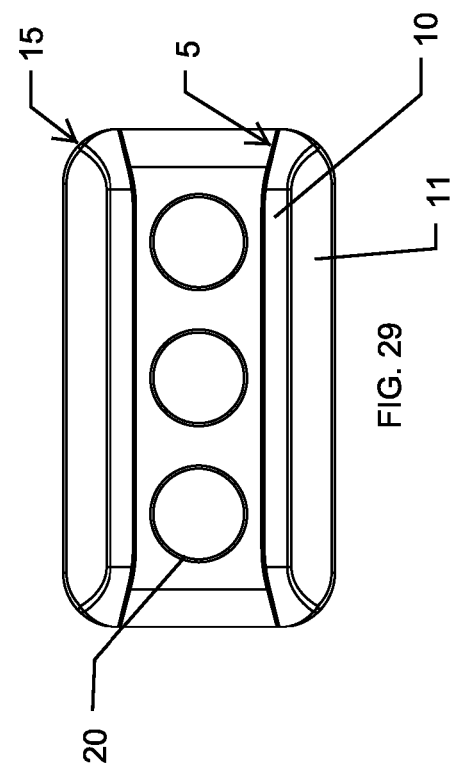
FIG. 29 illustrates a front view of yet another example of the channel lock with holes, according to an embodiment of the present invention.

FIGS. 21-32 illustrate three embodiments of the channel lock with holes 3, which is made of one piece. The channel lock with holes 3, according to an embodiment of the present invention comprising the insertion ramp 5, key step 10, insertion slot chamfer 11, sled 15, center support 20, stopping face 25, interference edge 30, fin 51 and wedge edge 35, hole on center support 46A. The weight and cost of production for the channel lock with holes 3 is reduced during the molding process. The excessive material from the channel lock with holes 3 is removed without compromising the structural integrity necessary for its application. The holes on the center support 46A can serve as areas for glue to interweave between the channel lock with holes 3 and substrate, though it is not necessary to use glue. FIGS. 21, 25, 29 illustrate the insertion ramp 5 guiding the key step 10 into the undercut slot 70 while the sled 15 allows the motion to be smooth when the panels 75 are pushed together from each end. However, the embodiment illustrated in FIG. 25 does not comprise the sled 15. The center support 20 for all three embodiments fits snug in the center support slot 65. FIGS. 22, 26, 30 illustrate the interference edge 30 creating a friction fit inside the undercut slot 70.

Figure 31:
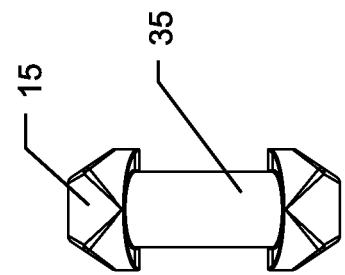
FIG. 31 illustrates a side view of yet another example of the channel lock with holes, according to an embodiment of the present invention.
Figure 32:
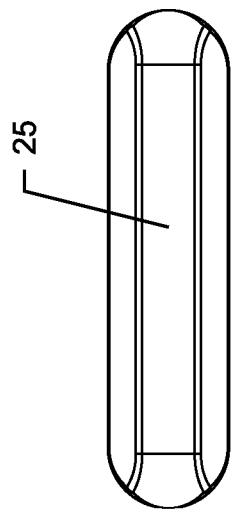
FIG. 32 illustrates a top view of yet another example of the channel lock with holes, according to an embodiment of the present invention.

FIG. 23, FIGS. 27 and 31 illustrate a side view of the channel lock with holes 3, according to an embodiment of the present invention. The embodiment shown in FIG. 31 comprises the sled 15 located on the channel lock with holes 3, which allow a smooth sliding motion of the channel lock with holes 3 when moving along the double slot 85. The embodiment illustrated in FIG. 23 and FIG. 27 does not comprise a sled 15. The wedge edge 35 wedges the channel lock with holes 3 tightly against the center support slot 65. The interference fit of these multiple components create a rigid joint between the connected panels 75. FIGS. 24, 28, 32 illustrate a top view of the channel lock with holes 3, according to an embodiment of the present invention. When the channel lock with holes 3 is inserted into the insertion/release slot 55, the stopping face 25 faces down towards the bottom of the insertion/release slot 55. The stopping face 25 is parallel to the surface of the opposing panel 75.

Referring to FIGS. 21-24, the fin 51 makes the channel lock with holes 3 lighter because excess material surrounding the fin 51 is removed. The fin 51 maintains the overall height of the channel lock with holes 3. FIG. 23 illustrates the insertion slot chamfer 11. The insertion slot chamfer 11 guides the channel lock with holes 3 into the insertion/release slot 55. This makes it easier to align the channel lock with holes 3 with the insertion/release slot 55 before sliding it into the keyway 60. The length of this embodiment is about 33 millimeters, the height is about 18 millimeters and the width is about 8 millimeters.

Figure 33:
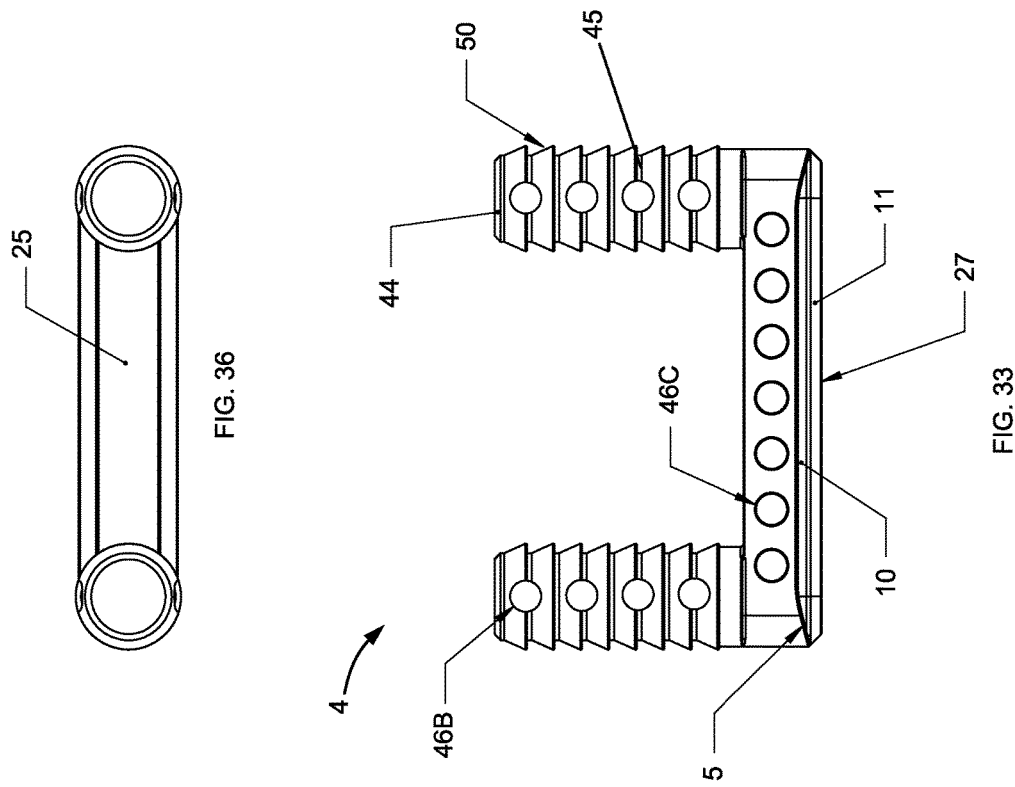
FIG. 33 illustrates a front view of the barbed channel lock with holes, according to an embodiment of the present invention.

The barbed channel lock 2 can be made of relatively non-flexible materials as well as aluminum alloys. FIGS. 33-36 illustrate the relatively non-flexible barb 50 found on the barbed channel lock with holes 4, which is made of one piece, according to an embodiment of the present invention comprising the insertion ramp 5, key step 10, insertion slot chamfer 11, stopping face 25, key slot stopping face 27, interference edge 30, wedge edge 35, insertion hole chamfer 44, barbed post 45, hole on barb 46B, hole 46C, and barb 50. The barb 50 radii are smaller and have a more gradual insertion angle than the flexible barb 50 mentioned above. The barbs 50 illustrated in FIG. 33 are rigid, but the smaller radius and gradual insertion allows the barbs 50 to be inserted without damaging the panel 75 or substrate. The pull out strength of the rigid barbs 50 may be less than that of the flexible barbs 50, mentioned above, when used with panels 75 or substrates made of softer material. However, the pull strength may be higher when used with panels 75 or substrates made with harder material. The length of this embodiment is about 40 millimeters, height is about 26.25 millimeters and width is about 8 millimeters. It is made from zinc-aluminum alloy; however, other abovementioned materials can be contemplated. The size of the holes 46B-46C can vary and the quantity can vary. Adhesives such as epoxy or wood glue can be inserted into the holes 46B-46C, and/or double slot 85 and/or barbed post holes 57, allowing better security between the barbed channel lock with holes 4 and substrate. FIG. 33 illustrates a front view of the barbed channel lock with holes 4. The insertion ramp 5 guides the fastener into the undercut slot 70. The barbed posts 45 are inserted into a panel 75 via two appropriately drilled barbed post holes 57 until the stopping face 25 is seated substantially against the surface of the panel 75 and the barbs 50 are secure in the panel 75. The barbed post holes 57 are about 8 millimeters in diameter and 21 millimeters in depth. The insertion hole chamfer 44 helps guide the barbed posts 45 into the barbed post holes 57.

Figure 34:
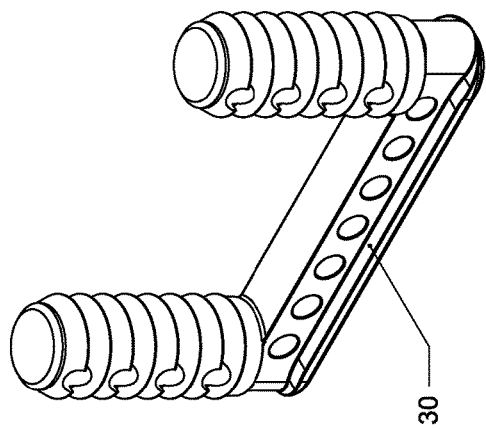
FIG. 34 illustrates a perspective view of the barbed channel lock with holes, according to an embodiment of the present invention.
Figure 35:
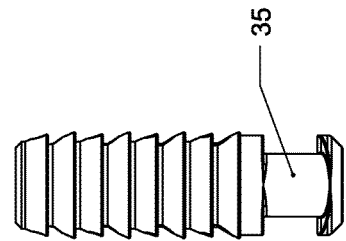
FIG. 35 illustrates a side view of the barbed channel lock with holes, according to an embodiment of the present invention.
Figure 36:
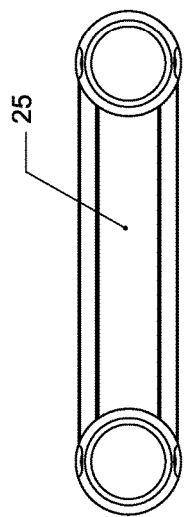
FIG. 36 illustrates a top view of the barbed channel lock with holes, according to an embodiment of the present invention.

FIG. 34 illustrates a perspective view of the barbed channel lock with holes 4. The interference edge 30 creates a friction fit inside the undercut slot 70. FIG. 35 illustrates a side view of the barbed channel lock with holes 4. The wedge edge 35 wedges the barbed channel lock with holes 4 tightly against the center support slot 65 and stops the barbed channel lock with holes 4 at the end of the keyway 60 or router bit hole 56. The interference fit of these multiple components create a rigid joint between the connected panels 75. FIG. 36 illustrates a top view of the barbed channel lock with holes 4. When the barbed posts 45 of the barbed channel lock with holes 4 is inserted into the barbed post holes 57 of a panel 75 or substrate, the stopping face 25 faces down towards the bottom of the barbed post holes 57.

Figure 37:
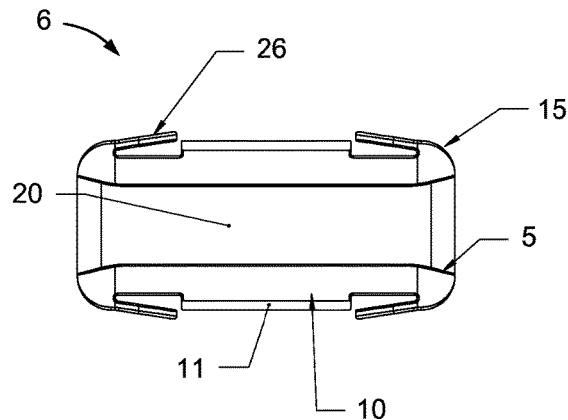
FIG. 37 illustrates a front view of the channel lock with tabs, according to an embodiment of the present invention.

FIGS. 37-40 illustrate the channel lock with tabs 6, which is made of one piece, comprising the insertion ramp 5, key step 10, insertion slot chamfer 11, sled 15, center support 20, stopping face 25, tab 26, interference edge 30, and wedge edge 35. The channel lock with tabs 6 functions similarly to the channel lock 1, however, the channel lock with tabs 6 has tabs 26 that click into the tab hole 61 of the panel 75 or substrate (not shown, see FIG. 74). FIG. 37 represents a front view of the channel lock with tabs 6, according to an embodiment of the present invention. The insertion ramp 5 guides the key step 10 into the undercut slot 70 while the sled 15 allows the motion to be smooth when the panels 75 are pushed together from each end. The center support 20 fits snug in the center support slot 65. The stopping face 25 is parallel to the surface of panel 75. The insertion slot chamfer 11 guides the channel lock with tabs 6 into the insertion/release slot 55. This makes it easier to align the channel lock with tabs 6 with the insertion/release slot 55 before sliding it into the keyway 60. As the fastener is sliding into the keyway 60 the tabs 26 are folded inward. Once the tabs 26 align with the tab hole 61 located in the key way 60, the tabs 26 lock the fastener into place by springing into the tab hole 61 (not shown, see FIG. 76). Only two of the four tabs 26 lock the fastener into two panels 75 or substrate; one tab 26 in each of the tab holes 61. The other two tabs 26 remain folded inward. There are four tabs 26, so the fastener is symmetrical and can be inserted into the insertion/release slot 55 from either side.

Figure 40:
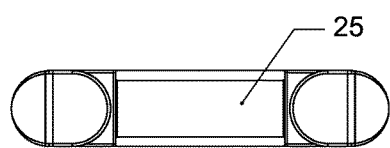
FIG. 40 illustrates a top view of the channel lock with tabs, according to an embodiment of the present invention.
Figure 38:
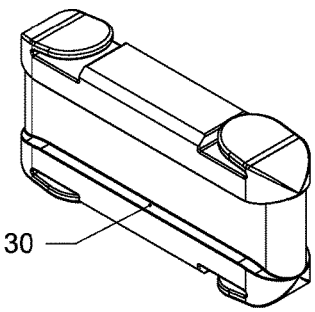
FIG. 38 illustrates a perspective view of the channel lock with tabs, according to an embodiment of the present invention.
Figure 39:
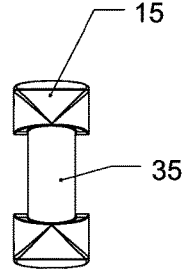
FIG. 39 illustrates a side view of the channel lock with tabs, according to an embodiment of the present invention.

FIG. 38 represents a perspective view of the channel lock with tabs 6, according to an embodiment of the present invention. The interference edge 30 creates a friction fit inside the undercut slot 70. FIG. 39 illustrates a side view of the channel lock with tabs 6, according to an embodiment of the present invention. The sled 15 located on the channel lock with tabs 6 allows a smooth sliding motion when moving along the double slot 85. The wedge edge 35 wedges the channel lock with tabs 6 tightly against the center support slot 65 and stops the channel lock with tabs 6 at the end of the keyway 60 or router bit hole 56. FIG. 40 illustrates a top view of the channel lock with tabs 6, according to an embodiment of the present invention. When the channel lock with tabs 6 is inserted into the insertion/release slot 55, the stopping face 25 faces down towards the bottom of the insertion/release slot 55.

FIGS. 41-44 illustrate the barbed channel lock with tabs 7, which is made of one piece, according to an embodiment of the present invention comprising the insertion ramp 5, insertion slot chamfer 11, sled 15, center support 20, stopping face 25, tabs 26, key slot stopping face 27, interference edge 30, wedge edge 35, insertion hole chamfer 44, barbed post 45, barb 50. FIG. 41 illustrates a front view of the barbed channel lock with tabs 7, wherein, the insertion ramp 5 guides the key step 10 into the undercut slot 70 while the sled 15 allows the motion to be smooth when the panels 75 are pushed together from each end. The center support 20 fits snug in the center support slot 65. The barbed posts 45 are inserted into a panel 75 or substrate via two appropriately drilled barbed post holes 57 until the stopping face 25 is seated substantially against the surface of the substrate 75 and the barbs 50 are secure in the panel 75 or substrate. The key slot stopping face 27 is substantially flushed against the undercut slot 70 when the barbed channel lock with tabs 7 is in the double slot 85. The tabs 26 provide added connection with the panel 75 or substrate by locking the fastener into the tab hole 61. The insertion slot chamfer 11 guides the barbed channel lock with tabs 7 with the insertion/release slot 55 before sliding it into the keyway 60. As the fastener is sliding into the keyway 60, the tabs 26 are folded inward. Once a tab 26 is aligned with the tab hole 61 located in the keyway 60, the tab 26 locks the fastener into place by springing into the tab hole 61.

FIG. 42, illustrates a perspective view of the barbed channel lock with tabs 7 in an embodiment of the present invention where interference edge 30 creates a friction fit inside the undercut slot 70. FIG. 43 illustrates a side view of the barbed channel lock with tabs 7 where the sled 15 allows a smooth sliding motion of the barbed channel lock with tabs 7 as it moves along the double slot 85. The wedge edge 35 wedges the barbed channel lock with tabs 7 tightly against the center support slot 65 and stops the barbed channel lock with tabs 7 at the end of the keyway 60 or router bit hole 56. The interference fit of these multiple components create a rigid joint between the connected panels 75. FIG. 44 illustrates a top view of the barbed channel lock with tabs 7. When the barbed post 45 of the barbed channel lock with tabs 7 is inserted into the barbed post holes 57 of a panel 75 or substrate, the stopping face 25 is substantially flush against the surface of the panel 75 and the barbs 50 are secure in the panel 75.

Figure 45:
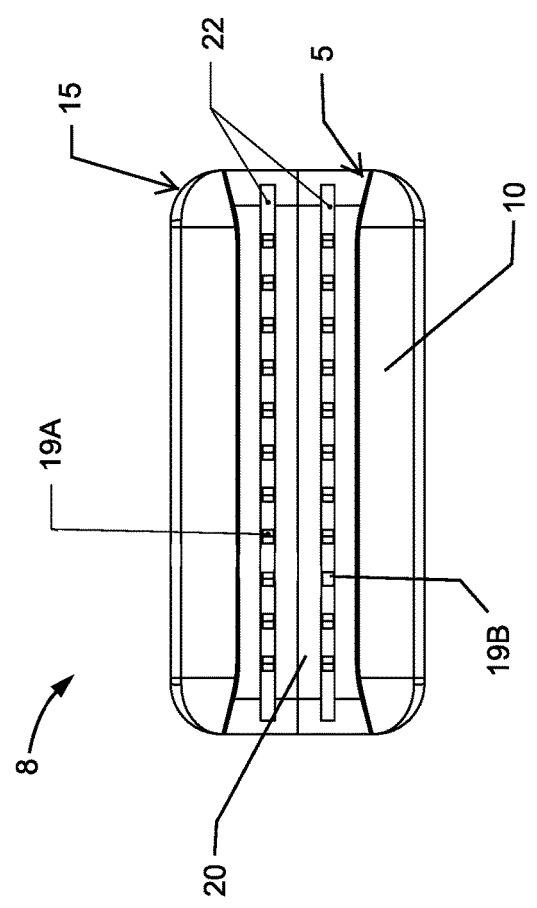
FIG. 45 illustrates a front view of the channel lock with locking barbs, according to an embodiment of the present invention.

FIGS. 45-48 illustrate the channel lock with locking barbs 8, made of one piece, according to an embodiment of the present invention comprising the insertion ramp 5, key step 10, sled 15, locking barbs 19A and 19B, center support 20, slots 22, stopping face 25, interference edge 30, and wedge edge 35. FIG. 45 represents a front view of the channel lock with locking barbs 8, according to an embodiment of the present invention. The insertion ramp 5 guides the key step 10 into the undercut 70 while the sled 15 allows the motion to be smooth when the panels 75 are pushed together from each end. The center support 20 fits snug in the center support slot 65. The stopping face 25 is parallel to the surface of panel 75. Referring now to FIG. 45, the locking barbs 19A and 19B flex and fold into the slot 22 as the fastener slides into the key way 60 starting from the insertion/release slot 55. The locking barbs 19A and 19B grip the walls of the double slot 85 and prevent the channel lock with locking barbs 8 from sliding back out.

Figure 46:
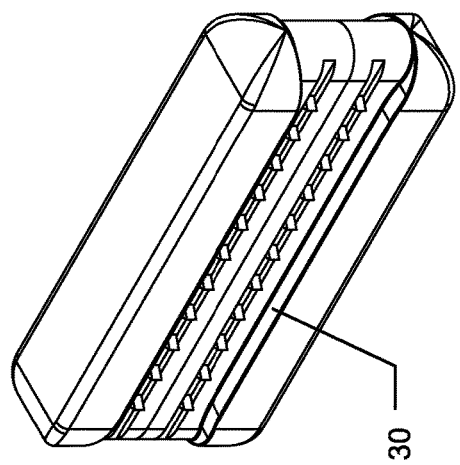
FIG. 46 illustrates a perspective view of the channel lock with locking barbs, according to an embodiment of the present invention.
Figure 47:
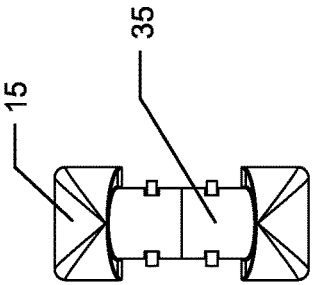
FIG. 47 illustrates a side view of the channel lock with locking barbs, according to an embodiment of the present invention.
Figure 48:
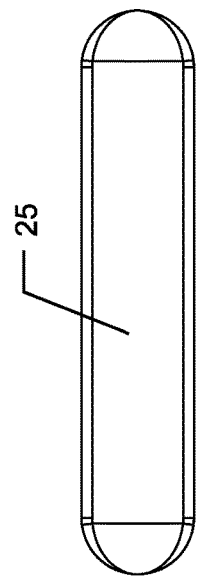
FIG. 48 illustrates a top view of the channel lock with locking barbs, according to an embodiment of the present invention.

FIG. 46 represents a perspective view of the channel lock with locking barbs 8, according to an embodiment of the present invention. The interference edge 30 creates a friction fit inside the undercut slot 70. FIG. 47 illustrates a side view of the channel lock with locking barbs 8, according to an embodiment of the present invention. The sled 15 allows the channel lock with locking barbs 8 to smoothly move along the double slot 85. The wedge edge 35 wedges the channel lock 8 tightly against the center support slot 65. The interference fit of these multiple components create a rigid joint between the connected panels 75. FIG. 48 illustrates a top view of the channel lock with locking barbs 8, according to an embodiment of the present invention. When the channel lock with locking barbs 8 is inserted into the insertion/release slot 55, the stopping face 25 faces down towards the bottom of the insertion/release slot 55.

Figure 49:
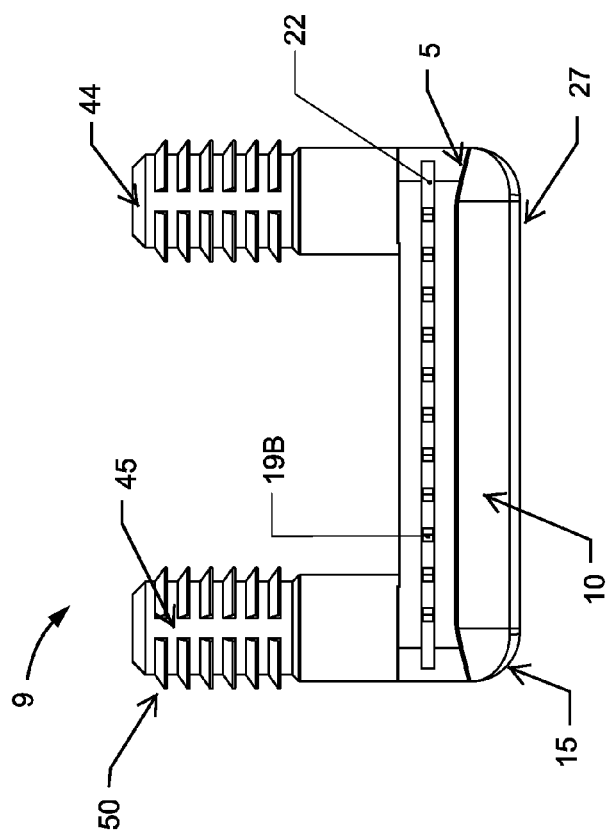
FIG. 49 illustrates a front view of the barbed channel lock with locking barbs, according to an embodiment of the present invention.
Figure 54:
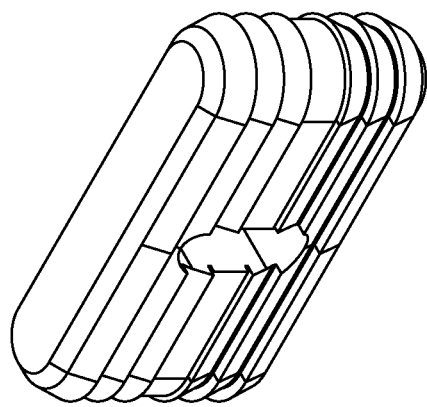
FIG. 54 illustrates a perspective view of the channel slicer, according to an embodiment of the present invention.
Figure 55:
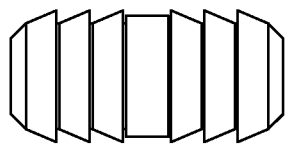
FIG. 55 illustrates a side view of the channel slicer, according to an embodiment of the present invention.
Figure 56:
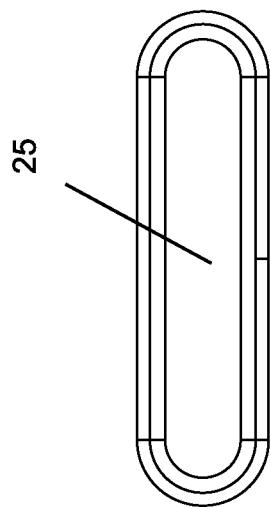
FIG. 56 illustrates a top view of the channel slicer, according to an embodiment of the present invention.
Figure 53:
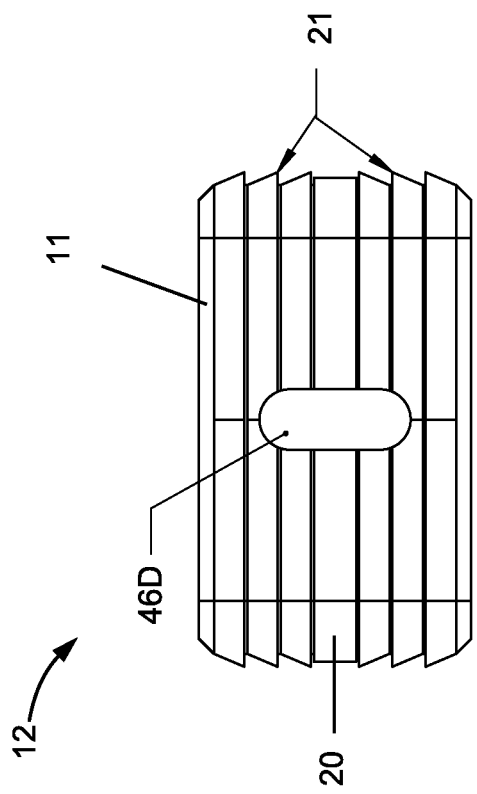
FIG. 53 illustrates a front view of the channel slicer, according to an embodiment of the present invention.

FIGS. 49-52 illustrates the barbed channel lock with locking barbs 9, made of one piece, according to an embodiment of the present invention comprising the insertion ramp 5, key step 10, sled 15, locking barbs 19B, slots 22, stopping face 25, key slot stopping face 27, interference edge 30, wedge edge 35, insertion hole chamfer 44, barbed post 45, barb 50. FIG. 49 illustrates a front view of the barbed channel lock with locking barbs 9 having the insertion ramp 5, which guides the key step 10 into the undercut slot 70 while the sled 15 allows the motion to be smooth. The barbed posts 45 are inserted into a panel 75 via two appropriately drilled barbed post holes 57 until the stopping face 25 is seated substantially against the surface of the panel 75 and the barbs 50 are secure in the panel 75 or substrate. The key slot stopping face 27 is substantially flushed against the undercut slot 70 when the barbed channel lock with locking barbs 9 is in the double slot 85. The locking barb 19B flex and fold into the slot 22 as the fastener slides into the keyway 60 starting from the insertion/release slot 55. The locking barb 19B grip the walls of the double slot 85 and prevent the channel lock with locking barbs 9 from sliding back out.

Figure 50:
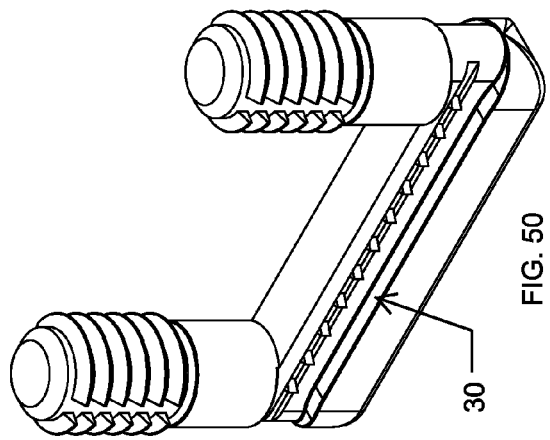
FIG. 50 illustrates a perspective view of the barbed channel lock with locking barbs, according to an embodiment of the present invention.
Figure 51:
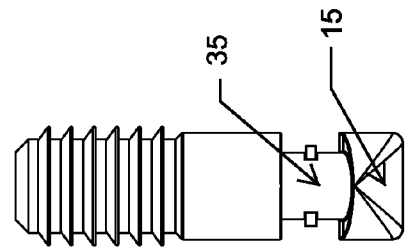
FIG. 51 illustrates a side view of the barbed channel lock with locking barbs, according to an embodiment of the present invention.
Figure 52:
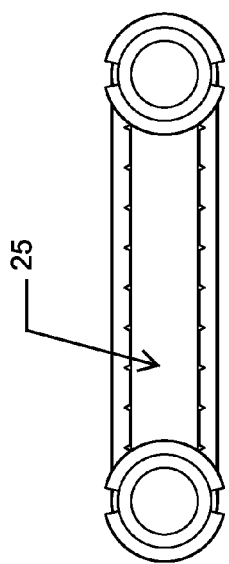
FIG. 52 illustrates a top view of the barbed channel lock with locking barbs, according to an embodiment of the present invention.

FIG. 50 illustrates a perspective view of the barbed channel lock with locking barbs 9 where the interference edge 30 creates a friction fit inside the undercut slot 70. FIG. 51 illustrates a side view of the barbed channel lock with locking barbs 9 having a sled 15 which creates a smooth sliding motion when moving along the double slot 85. The wedge edge 35 wedges the barbed channel lock with locking barbs 9 tightly against the center support slot 65. The interference fit of these multiple components create a rigid joint between the connected panels 75. FIG. 52 illustrates a top view of the barbed channel lock with locking barbs 9. When the barbed channel lock with locking barbs 9 is inserted into the barbed post holes 57 of a panel 75 or substrate, the stopping face 25 is substantially even on the surface of the panel 75 or substrate.

FIGS. 53-56 illustrate the channel slicer 12, made of one piece, according to an embodiment of the present invention comprising the slicing barbs 21, stopping face 25, insertion chamfer 11, and a removal hole 46D. The channel slicer 12 is pushed into one end of an 8 millimeter wide dado 136 that is about twice the overall length of the channel slicer 12 and has a depth of about half the height of the channel slicer 12. The insertion chamfer 11 guides the stopping face 25 toward the bottom of the dado 136 until it is fully seated and only half of the channel slicer 12 is protruding from the dado. The slicing barbs 21 prevent the channel slicer 12 from pulling back out of the dado because of their triangular structure. Similar to the channel lock 1, a second panel 75 with an identical routed dado 136 can be connected to the first panel containing the barbed channel slicer 12 by pushing the protruding portion of the channel slicer 12 into the dado 136 of the second panel 75 and sliding the two panels 75 together. As the channel slicer 12 slides from one end of each dado 136 to the other, it cuts into the walls of the dado 136 with the slicing barbs 21, creating grooves, which prevent the fastener from being removed and locks the fastener to the panel 75. The removal hole 46D allows the user to remove the channel slicer 12 by removing it out of the slot 136 with a tool, such as a screwdriver. The slicing barbs 21 are tapered so that the channel slicer 12 can be pushed into a standard 8 mm wide dado 136 that is twice as long as the fastener. After it is pushed in, the channel slicer 12 is slid from one side of the 8 mm dado 136 to the other.

FIGS. 57-60 illustrate the barbed channel slicer 13, made of one piece, according to an embodiment of the present invention comprising the slicing barbs 21, stopping face 25, barbed post 45, insertion slot chamfer 11, center support 20, key slot stopping face 27, insertion hole chamfer 44, and barb 50. Referring to FIG. 57, the barbed posts 45 are inserted into the edge of a panel 75 via two appropriately drilled barbed post holes 57 until the stopping face 25 is seated substantially flush against the surface of the panel 75 so the barbs 50 are secure in the panel 75 or substrate. The insertion hole chamfer 44 helps guide the barbed posts 45 into the barbed post holes 57. Once the barbed channel slicer 13 is secure to the edge of one panel 75 by the barbed post 45, it can be connected to a second panel 75 having an 8 millimeter wide dado 136 that is at least as deep as the protruding portion of the barbed channel slicer 13 and twice the length of the barbed channel slicer 13 (not shown, see FIG. 78). The barbed channel slicer 13 cuts into the sides of the dado 136 with the slicing barbs 21 thus making it difficult for the fastener from being removed. The slicing barbs 21 are tapered so that the barbed channel slicer 13 can be pushed into a standard 8 mm wide dado 136 that is twice as long as the fastener. After it is pushed in, the barbed channel slicer 13 is slid from one side of the dado 136 to another (further described below). FIG. 58 illustrates a perspective view of the barbed channel slicer 13, and FIG. 59 illustrates a side view of the barbed channel slicer 13, according to an embodiment of the present invention having. FIG. 60 illustrates the top view of the barbed channel slicer 13, according to an embodiment of the present invention having a stopping face 25, which aids the barbed channel slicer 13 to be substantially flush against a panel 75 when the barbed posts 45 are inserted into the edge of a panel 75 via two appropriately drilled barbed post holes 57.

Figure 62:
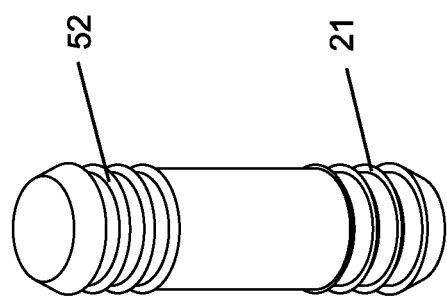
FIG. 62 illustrates a perspective view of the double barbed slicing dowel, according to an embodiment of the present invention.
Figure 61:
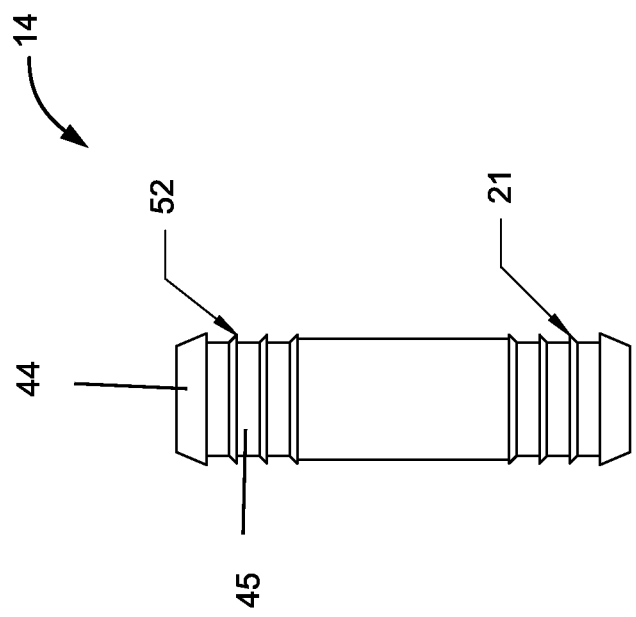
FIG. 61 illustrates a side view of the double barbed slicing dowel, according to an embodiment of the present invention.
Figure 63:
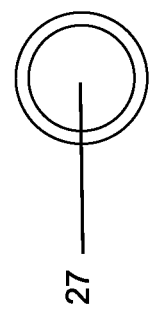
FIG. 63 illustrates a top view of the double barbed slicing dowel, according to an embodiment of the present invention.

FIGS. 61-63 illustrate the double barbed slicing dowel 14, made of one piece, according to an embodiment of the present invention comprising insertion barbs 52, insertion hole chamfer 44, barbed post 45, key slot stopping face 27, and slicing barbs 21. The use of at least two double barbed slicing dowels 14 can replace the barbed channel slicer 13. FIG. 61 illustrates a side view of the double barbed slicing dowel 14, according to an embodiment of the present invention having a plurality of insertion barbs 52 at the top portion of the dowel. The insertion hole chamfer 44 helps guide the barbed post 45 into a 8 millimeter diameter barbed post hole 57. The insertion barbs 52 are inserted into a 8 millimeter diameter barbed post hole 57 in the edge of one panel 75 and the opposing bottom end having the slicing barbs 21 is inserted into a 8 millimeter wide dado 136 in the face of a second panel 75. The two panels 75 are then slid together in their final assembly position and locked as shown in FIG. 77. The insertion barbs 52 secure the double barbed slicing dowel 14 in the barbed post holes 57 like the barbs 50 of the barbed channel slicer 13. The slicing barbs 21 cut into the walls of the dado 136 creating grooves, which secure it to the panel 75, similar to the channel slicer 12 and barbed channel slicer 13. FIG. 62 illustrates a perspective view of the double barbed slicing dowel 14, according to an embodiment of the present invention showing the insertion barbs 52 and slicing barbs 21 having a circular shape and wrapping around the circumference of the double barbed slicing dowel 14. FIG. 63 illustrates a top view of the double barbed slicing dowel 14, according to an embodiment of the present invention showing the cylindrical configuration of the fastener. The fastener is completely symmetrical and the slicing barbs 21 are identical to the insertion barbs 52, so either end of the double barbed slicing dowel 14 can be inserted into the dado 136.

Figure 64A:
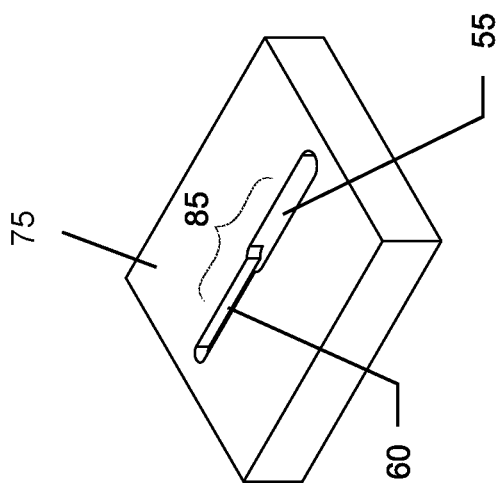
FIG. 64A illustrates a top view of the double slot, according to an embodiment of the present invention.
Figure 64B:
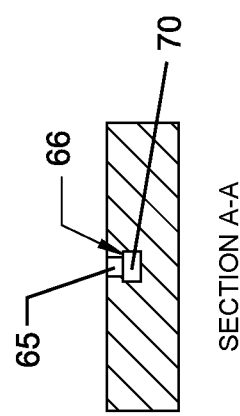
FIG. 64B illustrates a perspective view of a double slot, according to an embodiment of the present invention.
Figure 64C:
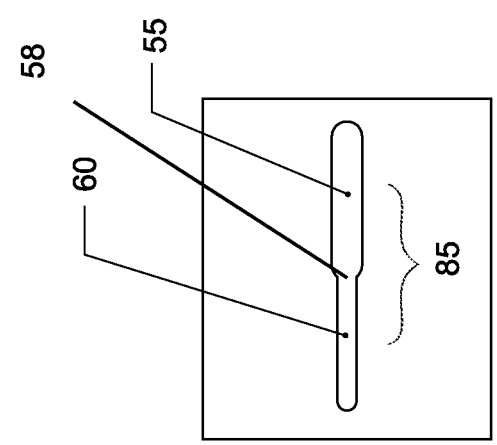
FIG. 64C illustrates a side view with phantom lines of a double slot, according to an embodiment of the present invention.

FIGS. 64A-64C illustrate a rout 54 according to an embodiment of the present invention comprising a double slot 85 having an insertion/release slot 55, keyway 60, conjunction point 58, where the keyway 60 comprises an undercut 66, which divides the keyway 60 into a center support slot 65 (top portion) and undercut slot 70 (bottom portion). The insertion/release slot 55 can also be referred to as the first section or the first longitudinal groove. The keyway 60 can also be referred to as the second section or the second longitudinal groove.

FIG. 64A illustrates a top view of the double slot 85, according to an embodiment of the present invention. This particular double slot 85 is typically used in conjunction with fasteners such as the channel lock 1 or the channel lock with holes 3, the channel lock with tabs 6, the channel lock with locking barbs 8, and the drawer slide/hinge channel lock 17. However, other fasteners can be contemplated. For this particular description, the channel lock 1 and channel lock with holes 3 are used. The double slot 85 is made in the panel 75 or substrate. The length of the insertion/release slot 55 is about 27 millimeters and the length of the keyway 60 is about 25 millimeters and a total length of the double slot 85 is about 56 millimeters; however, the lengths can vary based upon the size of the fastener and substrate 75. The conjunction point 58 is where the insertion/release slot 55 transitions to becoming the keyway 60. The depth of the double slot 85 ranges between 8.5 to 9.3 millimeters. FIG. 64B illustrates a perspective view of a double slot 85, according to an embodiment of the present invention as is appears on the face of a panel 75. FIG. 64C illustrates a side view with phantom lines of a double slot 85, according to an embodiment of the present invention. The rout 54 is substantially straight and the routing is precision cut with a CNC router. The key step 10 on one side of the fastener, such as the channel lock 1, is secured in the undercut slot 70 of the double slot 85 in one panel 75, and the key step 10 on the opposing side of the fastener, such as the channel lock 1, is secured in the undercut slot 70 of the double slot 85 in the second panel 75. At the undercut 66 is where the interference edge 30 of the fastener creates a friction fit connection to a panel 75 when slid into the keyway 60. Half of the fastener, such as the channel lock 1 is secured into each of the two panels 75 each having their own double slot 85 once the panels 75 are slid together and the channel lock 1 reaches the end of each of the keyway 60 in each panel 75. The interference edge 30 on the fastener has a tight friction fit against the undercut slot 70 which draws the faces of the two connecting panels 75 together and connects the faces together. The center support slot 65 snugly holds the center support 20 portion of the fastener. The channel lock 1 or channel lock with holes 3 and the undercut slot 70 are completely hidden after the panels 75 are assembled.

Figure 65:
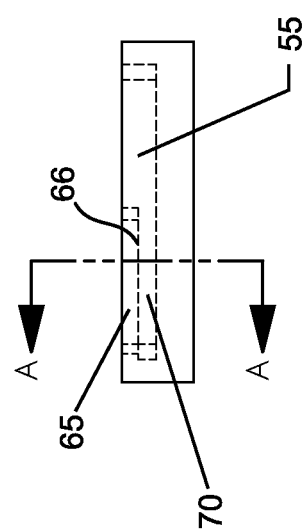
FIG. 65 illustrates a cross sectional view of a double slot along Section A-A, according to an embodiment of the present invention.

FIG. 65 illustrates a cross sectional view of a double slot 85 along Section A-A, which is the keyway 60 portion of the double slot 85, the keyway 60 portion comprising the center support slot 65 and undercut slot 70, which together form a t-slot, according to an embodiment of the present invention. The center support slot 65 snugly holds center support 20 found on channel lock 1 or channel lock with holes 3. The undercut slot 70 draws the two faces of the panel 75 together because it makes a tight friction fit with the interference edge 30. The undercut slot 70 is for the interference edge 30 of the fastener to slide in. Only half of the depth of the insertion/release slot 55 is routed when the router bit 135 plunges down about 4.5 millimeters, which is about half the total depth of 9 or so millimeters, forming the conjunction point 58 (not shown, see FIG. 64A), then the router bit 135 routs horizontally towards the outer edge/first end of the insertion/release slot 55/first longitudinal groove. To create the double slot 85 without the router bit hole 56 shown in FIGS. 64A-64C, the router bit 135 plunges down the full depth of about 9 millimeters once it reaches the outer/first end of the insertion release slot 55 after routing the insertion/release slot 55. After plunging down 9 millimeters, the router bit 135 travels horizontally towards the end of the keyway 60, meanwhile routing the lower half of the insertion/release slot 55 and keyway 60 because the keyway 60 comprises the undercut slot 70 and center support slot 65. Once the router bit 135 reaches the end of the keyway 60 and therefore has routed the full length of the double slot 85, it goes back to its previous path until it reaches the conjunction point 58 where it can vertically lift up out of the double slot 85 and away from the panel 75. The router bit hole 56 can be formed by the router bit 135 at the end of the keyway 60 if the travel distance of the router bit 135 needs to be decreased.

Figure 66C:
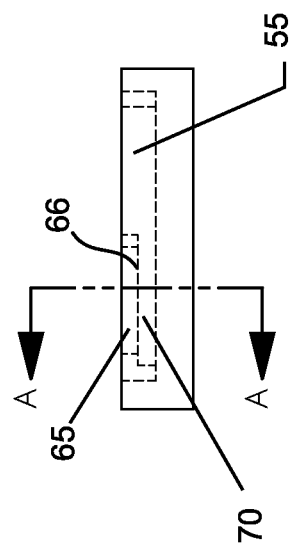
FIG. 66C illustrates a cross sectional view of a double slot having a router bit hole, according to an embodiment of the present invention.

FIGS. 66A-66C illustrate another embodiment of a rout 54, however, this embodiment has a router bit hole 56 where the router bit 135 cuts through during the routing process. To create a double slot 85 having a router bit hole 56 as shown in FIGS. 66A, 66B, the router bit 135 reaches the outer end/first end of the insertion/release slot 55, it lifts upwards and out of the panel 75. The router bit 135 then plunges down to the full depth of about 9 millimeters and forms the router bit hole 56 on the end/second end of the keyway 60/second longitudinal groove and moves toward the conjunction point 58 forming the keyway 50/second longitudinal groove until it reaches the first end of the insertion/release slot 55 and then the router bit 135 is removed by lifting upwards. The double slot 85 of the embodiment illustrated in FIGS. 64A-64B may be more desirable because it creates a stronger joint once two panels 75 are connected with a fastener described herein. This is because there is more surface area of contact between the interference edge 30 and the undercut of the undercut slot 70 without the router bit hole 56. The removal of substrate by the router bit hole 56 weakens the geometry of the keyway 60, which can increase the chances of failure of the substrate when a joint is formed with the double slot 85 and the present invention is under stress. In many cases, the affect of the router bit hole 56 on the strength of the joint will be minuscule and can be used if a simpler routing process is desired.

Another embodiment of the double slot 85 has a length of the insertion/release slot 55 is about 34 millimeters and the length of the keyway 60 is about 30 millimeters and a total length of the double slot 85 is about 68 millimeters. The depth of the double slot 85 ranges between 9.0 to 9.3 millimeters. This embodiment is typically used in conjunction with fasteners comprising barbed post 45 such as the barbed channel lock 2, the barbed channel lock with holes 4, the barbed channel lock with locking barbs 9; however, other fasteners can be contemplated. The depth of the double slot 85 can be adjusted to increase or decrease the friction fit of two panels 75 connected with the channel lock 1 or barbed channel lock 2 embodiments. A shallower depth may or may not decrease the friction between the interference edge 30 and the undercut of the undercut slot 70, and will decrease the friction between the edges/faces of the two panels 75 being connected. A deeper depth of the double slot 85 will increase the friction between the interference edge 30 and the undercut 66 of the undercut slot 70, as well as increase the friction between the edges/faces of the two panels 75 being connected. The length of the double slot 85 can also be changed for different applications as long as the fastener being used fits into the insertion/release slot 55. For example, the length of the keyway 60 can be shortened to keep the double slot 85 hidden, or from being routed too close to the edge of a panel 75 when space is limited. Also, the length of the keyway 60 can be extended to allow for the panel 75 positions to be adjustable. In other applications, a double slot 85 may be unnecessary if the keyway 60 comprises an undercut slot 70 and center support slot 65 that can be routed through the edge of a panel 75, thus eliminating the need for an insertion slot 55. With this type of rout 54, a channel lock 1 or barbed channel lock 2 can be inserted directly into the keyway 60 from the opening in the edge of the panel as further described below and illustrated in FIGS. 70-72A and 72B.

Figure 67:
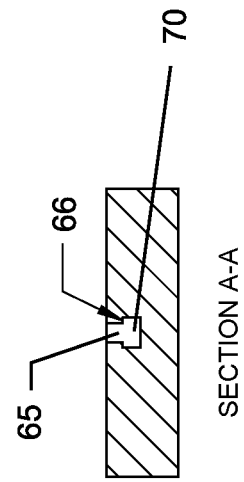
FIG. 67 illustrates a cross sectional view of a double slot having a router bit hole along A-A, according to an embodiment of the present invention.

FIG. 67 illustrates a cross sectional view along A-A of a double slot 85 having a router bit hole, which is the keyway 60 portion of the double slot 85, the keyway 60 portion comprising the center support slot 65 and undercut slot 70, which together form a t-slot, according to an embodiment of the present invention. The center support slot 65 snugly holds center support 20 found on channel lock 1 or channel lock with holes 3. The undercut slot 70 draws the two faces of the panel 75 together because it makes a tight friction fit with the interference edge 30. The undercut slot 70 is for the interference edge 30 of the fastener to slide in.

FIG. 68A-68B illustrates a panel assembly, according to an embodiment of the present invention using a channel lock 1 inserted in the insertion/release hole 55 and sliding toward the keyway 60 along the undercut slot 70 (not shown, see FIG. 66A). FIG. 68A illustrates, two panels 75, each having a double slot 85 and how the channel lock 1 is inserted into the insertion/release slot 55. In order to lock the two panels 75 together by the double slots 85 via the channel lock 1 the double slots 85 need to be aligned parallel with their keyways 60 pointing in opposing directions as shown in FIG. 68A. This ensures that the channel lock 1 fully slides into each keyway 60. FIG. 68B illustrates the channel lock 1 inserted substantially halfway into each panel's 75 insertion/release hole 55 and the faces of the two panels 75 are substantially flushed together. FIG. 68B illustrates the panels 75 are substantially slid together in opposing directions until the motion stops and the panels 75 are substantially aligned in the desired position. The sliding motion stops when the wedge edge 35 reaches the end of each keyway 60. If the double slots 85 are routed on each panel 75 in the precise position, the panels 75 will be perfectly aligned as desired when the sliding motion stops. The panels 75 can be separated by sliding them in the opposite direction in which they were assembled. The channel lock 1 can be removed without damaging it or the panel 75.

FIG. 69A-69B illustrates a panel assembly using a barbed channel lock 2, according to an embodiment of the present invention. FIG. 69A illustrates the barbed channel lock 2 inserted into a panel 75 via two drilled barbed post holes 57 until the stopping face 25 is substantially flushed against the panel 75. The barbs 50 secure the barbed channel lock 2 to the panel 75 permanently fixing it to the panel 75. FIG. 69A also illustrates the protruding portion of the barbed channel lock 2 that remains on the exterior of the panel 75. This protruding portion can then be aligned with the double slot 85 on a mating panel to connect the two panels 75 together. FIG. 69A illustrates two barbed channel locks 2 inserted into two sets of barbed post holes 57 drilled in a panel 75 and align with two double slots 85 on a mating panel 75. The spacing between the sets of barbed post holes 57 of the first panel is the same as the spacing between the double slots 85 in the mating panel 75. FIG. 69B illustrate the key slot stopping face 27 being inserted into the insertion/release hole 55 of another panel 75 and the edge of the panel 75 containing the inserted barbed channel locks 2 being substantially flushed against the face of the panel 75 containing the double slots 85. The panels can then be connected together by sliding the barbed channel lock 2 along the undercut slot 70 until the wedge edge 35 reaches the end of the keyway 60. A friction fit is created between the panel 75 face and panel 75 edge, and between the interference edge 30 of the fastener and the undercut of the undercut slot 70 when the barbed post holes 57 and double slots 85 are precisely machined on each panel 75. The panels 75 will be aligned in the desired location when the sliding motion stops. The barbed channel locks 2 cannot be removed from the panel 75 containing the barbed post holes 57 in which the barbed posts 45 are inserted. The two connected panels 75 can be disconnected by reversing the sliding motion.

FIGS. 70-72A and 72B illustrate a sliding method and various perspectives of two panels 75 being connected together by a shelf 76 with slotted edges 90, using an embodiment of a fastener of the present invention. The slotted edges 90 have the same profile as the keyway 60, having an undercut slot 70 and a center support slot 65. FIG. 70 illustrates two vertical panels 75 on which 9 millimeter barbed channel locks 2 are attached. The left vertical panel 75 shows one 9 millimeter barbed channel lock 2 in the inserted position and one prior to insertion, showing the location of the 8 millimeter barbed post holes 57 drilled into the panel 75, and a shelf 76 having slotted edges 90 on opposing edges. The 9 millimeter barbed channel locks 2 are inserted into 8 millimeter barbed post holes 57 drilled 9 millimeters deep and the barbs 50 secure them to the panel 75. FIG. 71 illustrates the barbed channel locks 2 inserted in the panels 75 and at least two panels 75 are substantially aligned in parallel, with the barbed channel lock 2 in each side panel 75 being at the same height. A shelf 76 having slotted edges 90 is slid, with the opening 105 side first onto the 9 millimeter barbed channel lock 2 so the exposed end of the barbed channel lock 2 on the side panel 75 slides onto the slotted edge 90 until the wedge edge 35 of the front most 9 millimeter barbed channel lock 2 reaches the slot end 100 of the slotted edge 90. The slotted edge 90 may be of various lengths and widths depending on the size of the panel 75 and/or shelf 76. The slotted edge 90 can also run along different edges of the panel 75. There can be multiple numbers of the barbed channel lock 2 located on each side panel 75 at varying heights and widths from each other. The barbed channel lock 2 can be located on both sides of the same side panel 75. FIG. 72A illustrates the rear view of a shelf 76 and FIG. 72B illustrates a side view of the shelf 76, according to an embodiment of the present invention. The slotted edges 90 extend through the edge of the shelf 76 and the slot end 100 is the stopping point for the fastener.

Figure 75:
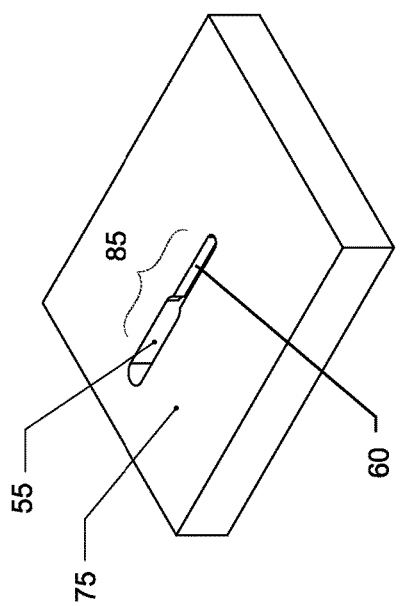
FIG. 75 illustrates another perspective view of a double slot for a channel lock with tabs, according to an embodiment of the present invention.
Figure 76:
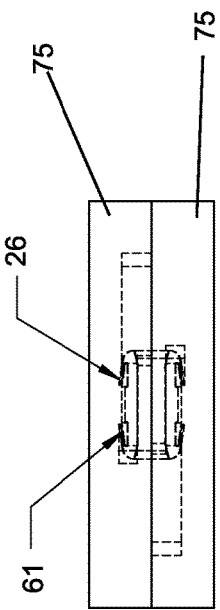
FIG. 76 illustrates a panel assembly using a channel lock with tabs, according to an embodiment of the present invention.
Figure 73:
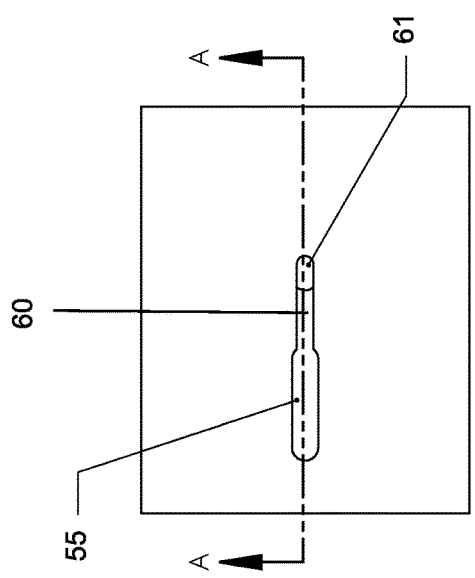
FIG. 73 illustrates an elevational view of a rout for a channel lock with tabs, according to an embodiment of the present invention.
Figure 74:
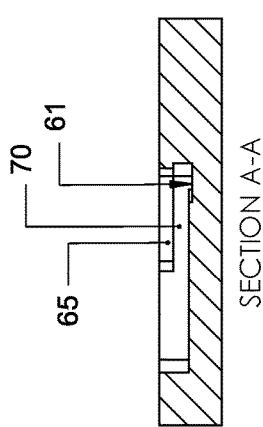
FIG. 74 illustrates a cross sectional view of a double slot along A-A for a channel lock with tabs, according to an embodiment of the present invention.
Figure 86A:
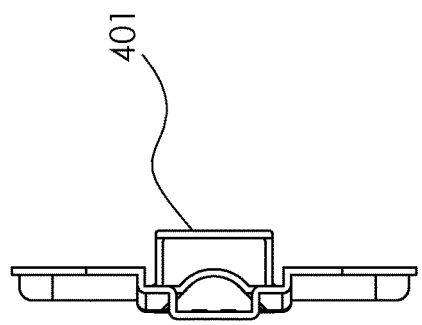
FIG. 86A illustrates a front view of a modified hinge plate, according to an embodiment of the present invention.
Figure 86B:
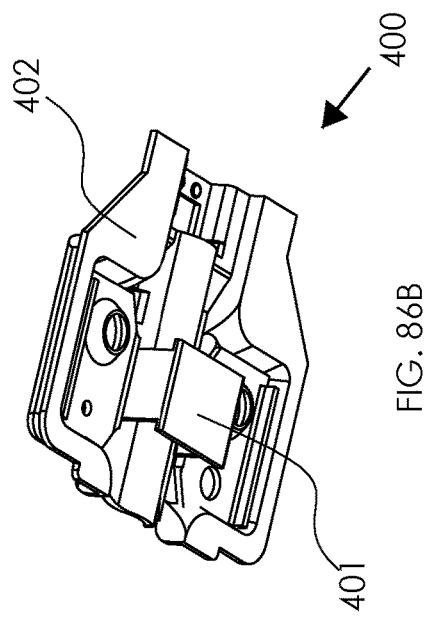
FIG. 86B illustrates a bottom perspective view of a modified hinge plate, according to an embodiment of the present invention.
Figure 86C:
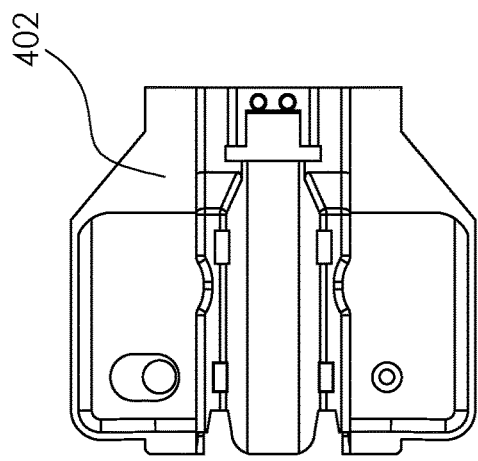
FIG. 86C illustrates a top view of a modified hinge plate, according to an embodiment of the present invention.
Figure 86D:
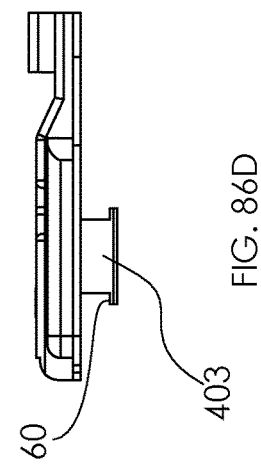
FIG. 86D illustrates a side view of a modified hinge plate, according to an embodiment of the present invention.

FIGS. 73-76 illustrate a rout 54 for a channel lock with tabs 6, according to an embodiment of the present invention. This rout is a double slot 85 identical to that of FIG. 65A with an additional tab hole 61. Referring to FIG. 73, the tab hole 61 is a shallow hole located at the end of the keyway 60 which is about 2 millimeters deeper than the bottom of the keyway 60. FIG. 74 illustrates a cross sectional view of a double slot 85 along A-A for a channel lock with tabs 6, according to an embodiment of the present invention comprising a center support 65, undercut slot 70 and tab hole 61. The routing is done with a CNC router. FIG. 75 illustrates another perspective view of a double slot for a channel lock with tabs 6, according to an embodiment of the present invention comprising a double slot 85 having an insertion/release slot 55 and keyway 60 section. FIG. 76 illustrates a panel assembly using a channel lock with tabs 6, according to an embodiment of the present invention. The channel lock with tabs 6 lock with the panel 75 or substrate by clicking into the tab hole 61 when the tabs 26 spring back from the folded position to their natural position.

FIG. 77 illustrates a panel assembly using the double barbed slicing dowels 14, according to an embodiment of the present invention and the steps for assembly. As previously described (see FIGS. 61-63), the insertion barbs 52 are inserted into a 8 millimeter diameter barbed post hole 57 (not shown) in the edge of one panel 75 and the insertion barbs 52 secure it to the panel 75. The opposing bottom end of the double barbed slicing dowel 14 having the slicing barbs 21 is inserted into a 8 millimeter wide dado 136 in the face of a second panel 75. The two panels 75 are then slid together in their final assembly position and locked. The slicing barbs 21 cut into the walls of the 8 millimeter wide dado 136 creating grooves which prevent the slicing barbs 21 from pulling out of the panel 75.

FIG. 78 illustrates a barbed channel slicer 13 assembly and the steps for assembly, according to an embodiment of the present invention. As previously described, the barbed posts 45 are inserted into the edge of a panel 75 via two appropriately drilled barbed post holes 57 (not shown, see FIG. 69A) until the stopping face 25 is seated substantially flush against the panel 75 (not shown, see FIG. 69A) and the barbs 50 are secure in the panel 75 or substrate. Once the barbed channel slicer 13 is secure to the edge of one panel 75 by the barbed post 45, it can be connected to a mating panel 75 having an 8 millimeter wide dado 136 that is at least as deep as the protruding portion of the barbed channel slicer 13 and twice the length of the barbed channel slicer 13. Then the bottom portion of the barbed channel slicer 13 is aligned with the 8 millimeter wide dado 136 so that the user can insert the slicing barbs 21 into the 8 millimeter wide dado 136. The slicing barbs 21 are tapered so that the barbed channel slicer 13 can be easily pushed into the dado 136 until the edge of the panel 75 is substantially flushed against the face of the panel 75 having the dado 136. After the barbed channel slicer 13 is pushed in, the barbed channel slicer 13 is slid from one end of the dado 136 to the other. While doing so, the slicing barbs 21 cut into the sides of the dado 136 creating grooves in the substrate, thus preventing the fastener from being removed and this locks the two panels 75 together.

FIG. 79-82 illustrate a side view of the drawer slide/hinge channel lock 17, according to an embodiment of the present invention comprising an insertion ramp 5, insertion chamfer 11, screw hole 23, mounting face 24, interference edge 30, key step 10, center support 20 and wedge edge 35. The drawer slide/hinge channel lock 17 can be attached to hardware such as hinges, drawer slides, decorative sconces, castors, closet rod supports, or decorative wood trim and the like. Referring to FIG. 79, in one embodiment of the present invention, there is a side view of the drawer slide/hinge channel lock 17 having an insertion ramp 5 which guides the key step 10 into the undercut slot 70. The wedge edge 35 wedges the drawer slide/hinge channel lock 17 tightly against the center support slot 65. FIG. 80 illustrates a perspective view of the drawer slide/hinge channel lock 17, according to an embodiment of the present invention. The interference edge 30 creates a friction fit against the undercut of the undercut slot 70. FIG. 81 illustrates another side view of the drawer slide/hinge channel lock 17, according to an embodiment of the present invention having an insertion slot chamfer 11. The insertion slot chamfer 11 guides the drawer slide/hinge channel lock 17 into the insertion/release slot 55. This aligns the fastener with the insertion/release slot 55 making it easier to push the drawer slide/hinge channel lock 17 in before sliding it into the keyway 60. FIG. 82 illustrates a top view of the drawer slide/hinge channel lock 17, according to an embodiment of the present invention. The mounting face 24 allows the drawer slide/hinge channel lock 17 to be mounted to various surfaces via two sheet metal tapping screws 36. The drawer slide/hinge channel lock 17 can be mounted to the base plate of a hinge 38 to eliminate the need for screw holes to secure it to the inside of a cabinet for hanging a door.

FIG. 83-86 illustrates a European type hinge assembly 18, according to an embodiment of the present invention comprising drawer slide/hinge channel lock 17, tapping screw 36, hinge 38, and hinge mounting plate 39. FIG. 83 illustrates an exploded view of a hinge assembly 18, according to an embodiment of the present invention where the drawer slide/hinge channel lock 17 is mounted to the hinge plate 39 by a plurality of tapping screws 36. The hinge 38 is then secured to the hinge mounting plate 39. FIGS. 84-86 illustrate different perspectives of the assembled hinge assembly 18. The drawer slide/hinge channel lock 17 can be used with various types of hinges as long as the hinge mounting plate 39 is designed with the necessary screw holes 138 to attach the drawer slide/hinge channel lock 17 to.

FIGS. 86A-86D illustrates various views of a modified hinge plate 400, according to an embodiment of the present invention. The sheet metal channel lock 401 is made from 1 mm thick stamped mild steel. The hinge channel lock is attached to the hinge mounting plate 402 by a cam screw rivet and/or welding. The user pushes the sheet metal channel lock 401 protruding from the hinge mounting plate 402 into the insertion/release slot 55 of the hinge rout (not shown, see FIG. 86E) until the hinge mounting plate 402 is substantially flush against the surface of the substrate 75 (for example on a cabinet end panel). Then the user slides the modified hinge plate 400 toward the bottom of the cabinet so the hinge channel lock slides into the keyway 60 of the double slot 85 until the sheet metal channel lock edge 403 reaches the end of the keyway 60 of the hinge rout 250. The interference edge 30 of the sheet metal channel lock creates a friction fit against the undercut 66 of the hinge rout 250 which secures the hinge mounting plate to substrate 75 This eliminates the need for tools when installing hinges. The user can adjust the upper hinge(s) by sliding the hinge mounting plate 402 toward the top of the cabinet to properly align it with the cabinet door.

FIG. 86E illustrates an elevational view of the hinge plate rout 250, according to an embodiment of the present invention having an insertion/release slot 55, conjunction point 58, and a keyway 60. FIG. 86F illustrates another elevational view of the hinge plate rout 250, according to an embodiment of the present invention located on a panel 75. The hinge plate rout 250 functions like the channel lock double slot 85; however, the hinge plate rout 250 is a smaller embodiment. FIG. 86G illustrates a cross sectional view of the hinge plate rout 250, according to an embodiment of the present invention comprising an insertion/release slot 55, a center support slot 65, undercut 66, an undercut slot 70 located on a panel 75. FIG. 86H illustrates a cross sectional view of a hinge plate rout 250 along A-A, according to an embodiment of the present invention having an undercut slot 70, center support slot 65 and undercut 66.

Figure 88:
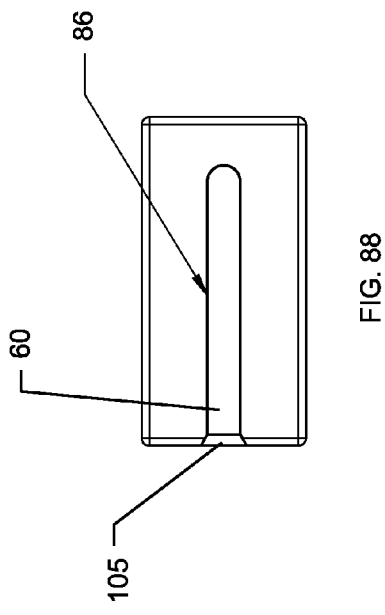
FIG. 88 illustrates a top view of a spacer used with a drawer slide/hinge channel lock, according to an embodiment of the present invention.
Figure 90:
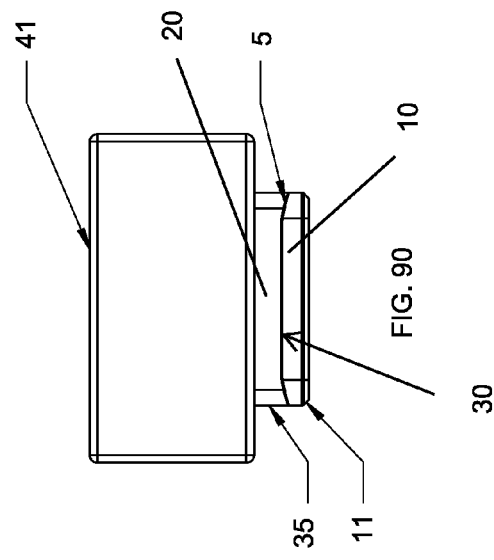
FIG. 90 illustrates a side view of a spacer used with a drawer slide/hinge channel lock, according to an embodiment of the present invention.
Figure 89:
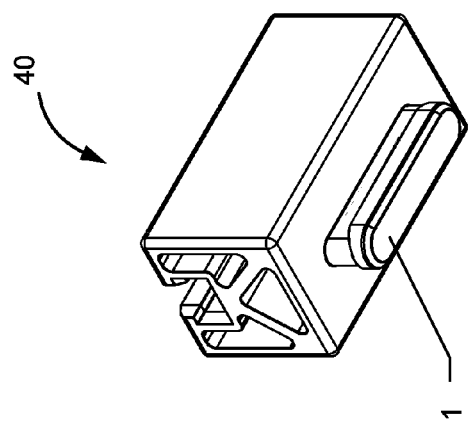
FIG. 89 illustrates a bottom perspective view of a spacer used with a drawer slide/hinge channel lock, according to an embodiment of the present invention.
Figure 91:
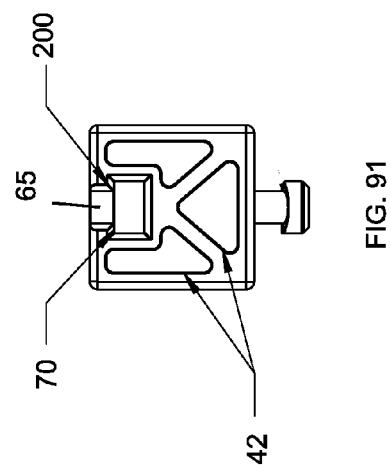
FIG. 91 illustrates the back view of a spacer used with a drawer slide/hinge channel lock, according to an embodiment of the present invention.

FIGS. 87A-87C illustrates installation of the drawer slide/hinge channel lock 17, according to an embodiment of the present invention comprising the same double slot 85 used for the channel lock 1, hinge assembly 18, and cabinet 96, cabinet side 96A, cabinet back 96B, cabinet bottom 96C, cabinet door 96D. FIG. 87A illustrates a pre-routed double slot 85 in the proper location of the cabinet 96 with the drawer slide/hinge channel lock 17 substantially aligned with the insertion/release slot 55. The user pushes the drawer slide/hinge channel lock 17 protruding from the hinge mounting plate 39 of the hinge assembly 18 into the insertion/release slot 55 until the hinge mounting plate 39 (not shown, see FIG. 84) is substantially flush against the cabinet side panel 96A. Then the user slides the hinge assembly 18 toward the front of the cabinet so the drawer slide/hinge channel lock 17 slides into the keyway 60 of the double slot 85 until the wedge edge reaches the end of the keyway 60. This eliminates the need for tools needed when installing the hinge onto panels 75 of cabinet 96 and reduces the amount of adjustment needed to align the door on the cabinet 75. FIG. 87B illustrates a plurality of hinge assemblies 18 inserted into the keyway 60. FIG. 87C illustrates an assembled cabinet 96 when the cabinet door 96D is attached to the hinge assembly 18. FIGS. 88-91 illustrate a spacer 40 used with a drawer slide/hinge channel lock 17, according to an embodiment of the present invention comprising a bottom side of the spacer 40 having a configuration of half a channel lock 1, insertion ramp 5, insertion slot chamfer 11, wedge edge 35, spacer block 41, voids 42, and locking slot 86. FIG. 88 illustrates a top view of a spacer 40 used with a drawer slide/hinge channel lock 17, according to an embodiment of the present invention having a locking slot 86. The locking slot 86 has the same profile as the keyway 60 section of the double slot 85 comprising an undercut slot 70 and a center support slot 65. As explained above with an opening 105 on the side of the spacer block 41 of the spacer 40. FIG. 89 illustrates a bottom perspective view of a spacer 40 used with a drawer slide/hinge channel lock 17, according to an embodiment of the present invention having half of a channel lock 1 molded into the body of the spacer 40. FIG. 90 illustrates a side view of a spacer 40 used with a drawer slide/hinge channel lock 17, according to an embodiment of the present invention with the half channel lock 1. The insertion slot chamfer 11 guides the channel lock 1 portion of the spacer 40 into the insertion/release slot 55. The insertion ramp 5 guides the key step 10 into the undercut slot 70 of the routed double slot 85 as it slides through the keyway 60. The interference edge 30 of the channel lock 1 creates a friction fit against the undercut of the undercut slot 70 of the double slot 85. The wedge edge 35 of the channel lock 1 wedges tightly against the center support slot 65 at the end of the keyway 60 and the center support 20 fits snug in the center support slot 65. FIG. 91 illustrates another side view of a spacer 40 used with a drawer slide/hinge channel lock 17, according to an embodiment of the present invention where the drawer slide/hinge channel lock 17 is inserted into the locking slot 86. The insertion slot chamfer 200 guides the drawer slide/hinge channel lock 17 into the locking slot 86. This makes it easier to align the drawer slide/hinge channel lock 17 with the opening 105 before sliding it into the locking slot 86. The insertion ramp 5 of the drawer slide/hinge channel lock 17 guides the key step 10 into the undercut slot 70 of the locking slot 86. The wedge edge 35 of the drawer slide/hinge channel lock 17 wedges tightly against the center support slot 65 at the end of the keyway 60 and the center support 20 fits snug in the center support slot 65 of the locking slot 86. The interference edge 30 creates a friction fit inside the undercut of the undercut slot 70. The voids 42 are for weight reduction and for lowering cost in manufacturing. The spacer 40 replaces the typical 1 inch wooden spacer used to space a drawer slide 1 inch away from a cabinet end panel 75. The installation of this spacer saves time because it requires no tools or screws to install it to both the cabinet end panel 75 and the drawer slide when used in conjunction with the drawer slide/hinge channel lock 17, and it also eliminates the time needed to align the drawer slide onto the spacer/cabinet before securing it into place.

FIGS. 92-95 illustrate an installed drawer slide/hinge channel lock 17 to a drawer slide base rail 37, according to an embodiment of the present invention comprising the drawer slide/hinge channel lock 17, tapping screw 36, and drawer slide base rail 37. The screw holes 138 of the drawer slide base rail 37 are aligned with the tapping screw 36 on one side of the drawer slide base rail 37 and the drawer slide/hinge channel lock 17 on the opposing side. FIG. 93 illustrates a top view of an installed drawer slide/hinge channel lock 17 to a drawer slide, according to an embodiment of the present invention. The drawer slide assembly 43 can be attached to a panel 75 having two double slots 85 routed in the proper locations. The drawer slide can simply slide onto a panel 75 via the drawer slide/hinge channel locks 17 which eliminates tools for installation as well the time needed to align and adjust the drawer slide before securing it into place. Depending on the application, a one-inch spacer 40 may be used for clearance, for instance in an inset drawer of a cabinet with a hinged door. The spacer block 41 can be installed onto the cabinet or furniture panel 75 first by pushing the channel lock 1 portion of the spacer 40 into the corresponding rout 54 or double slot 85 located on the panel. Secondly, the spacer block 41 is slid so that the channel lock 1 portion slides to the end of the keyway 60 of the double slot 85 to lock it in place. Once the spacer block 41 is in place and the spacer 40 is secure, the user can slide the drawer slide/hinge channel lock 17 on the drawer slide assembly 43 into the locking slot 86 of the spacer 40. FIG. 94 illustrates a rear view of an installed drawer slide/hinge channel lock 17 to a drawer slide, according to an embodiment of the present invention. FIG. 95 illustrates a side view of an installed drawer slide/hinge channel lock 17 to a drawer slide, according to an embodiment of the present invention having on one side of the drawer slide base rail 37 the drawer slide/hinge channel lock 17 and the opposing side the tapping screw 36. FIG. 96 illustrates an assembled view of the drawer slide assembly 43 and spacer 40 inserted into a rout 54 or double slot 85 of a panel 75, according to an embodiment of the present invention as the spacer 40 is used in conjunction with the drawer slide assembly 43. When a drawer is inset inside of a cabinet/furniture skeleton and the cabinet/furniture skeleton has a hinged door, the spacer 40 is needed to allow the drawer to clear the hinges. The spacer 40 works similarly to the channel lock 1 because it holds about the same geometry at the bottom of the spacer 40. Referring to FIG. 97, illustrating an exploded view of a drawer slide assembly 43 and spacer 40 installed on a panel 75, according to an embodiment of the present invention. As mentioned previously, the drawer slide assembly 43 is assembled by screwing the tapping screw 36 with the mounting face 24 of the drawer slide/hinge channel lock 17 to the drawer slide base rail 37. The spacer 40 is then connected to the panel 75 by sliding into the rout 54. Once the spacer 40 is securely locked, the drawer slide assembly 43 is slid into the spacer 40. The drawer slide spacer 40 can be used in conjunction with any drawer slide assembly 43 having drawer slide/hinge channel locks 17 preinstalled onto it via the appropriate screw holes 138. The drawer slide/hinge channel lock 17 can be installed on any drawer slide having the appropriate mounting holes for the screws 36. For drawer slide and hinge applications, the drawer slide/hinge channel lock 17 is meant to be installed during the manufacturing of the drawer slide or hinge, not by the user/consumer. If the drawer slide/hinge channel lock 17 is preinstalled on a hinge or drawer slide, it will save the user/consumer time when installing this hardware over conventional methods.

FIG. 97 illustrates an exploded view of a drawer slide and spacer installed on a panel, according to an embodiment of the present invention. The installation of the drawer slide/hinge channel lock 17 comprises a plurality of tapping screws 36 in alignment with the drawer slide/hinge channel lock 17 having the drawer slide base rail 37 sandwiched in the middle. The cabinet/furniture panel 75 comprises a plurality of routs 54 on the face of the panel 75 having a similar configuration to the rout 54 used for the channel lock 1; however, the depth can be a range of about 8.4 millimeters to 8.7 millimeters. The spacer 40 portion that comprises the configuration of the channel lock 1 is slide into the rout 54 or double slot 85. Once spacers 40 are securely installed, the drawer slide/hinge channel lock 17 are slid into the spacers 40 via the keyway 60.

Figure 99:
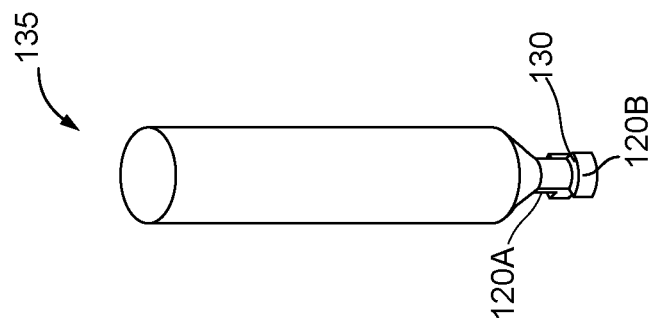
FIG. 99 illustrates a perspective view of a router bit, according to an embodiment of the present invention.
Figure 98:
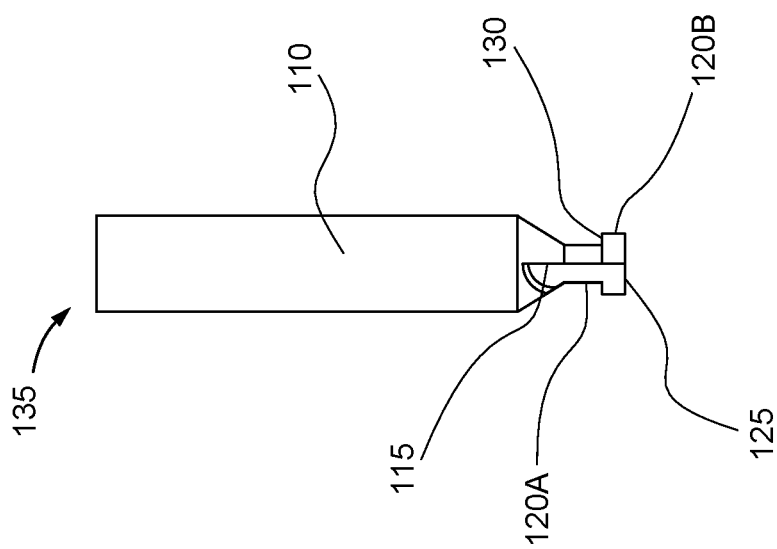
FIG. 98 illustrates a side view of a router bit, according to an embodiment of the present invention.

FIGS. 98-99 illustrates a router bit 135, according to an embodiment of the present invention comprising a shank 110, chamfer cutter 115, slot cutting edge 120A and 120B, plunge cutting edge 125, and retract cutting edge 130. There are three cutting edges, the plunge cutting edge 125, the routing and chamfer edge 115 and retract cutting edge 130. The chamfer cutter 115 is not used for the routs described herein. The plunge cutting edge 125 can plunge cut a hole into the face of a panel 75 by moving about 90 degrees down towards the face and rotating clock-wise as it plunges. Once the router bit 135 reaches the appropriate depth, the routing starts as the router bit 135 moves horizontally along the panel 75 creating the rout 54. Slot cutting edge 120A routs the center support slot 65. The slot cutting edge 120B routs the undercut slot 70 of the double slot 85. The slot cutting edge 120B also routs the insertion/release slot 55 of the double slot 85. Once the router bit 135 reaches the appropriate length, it retracts upward away from the panel 75. The shank 110 provide the router bit structure and support and is about 0.5 inches in diameter which is the end that is clamped into a router collet. The slot cutting edge 120A and 120B are the cutting edges that remove material of the substrate as the router bit 135 moves horizontally while cutting the rout 54. The router bit 135 can be made from high speed steel or solid carbide. It can also be carbide tipped or diamond tipped. Router bit 135 is used to rout all the above mentioned routs 54.

Figure 100C:
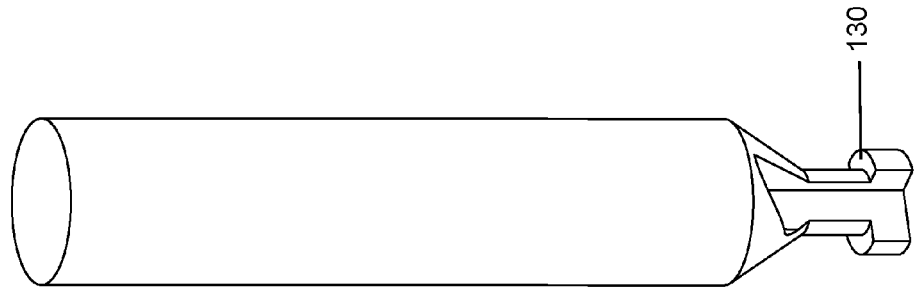
FIGS. 100A-100C illustrate various views of a router bit, according to an embodiment of the present invention.
Figure 100B:
Figure 100A:

FIG. 99 is a perspective view of a router bit 135, according to an embodiment of the present invention illustrating the cylindrical shape of the router bit 135. FIG. 100A illustrates a bottom perspective view of the router bit 135 having the plunge cutting edge 125. FIG. 100B illustrates a side view of the router bit 135 having a chamfer cutter 115, slot cutting edge 120A, 120B. FIG. 100C illustrates a top perspective view of the router bit 135 having a retract cutting edge 130.

Figure 101B:
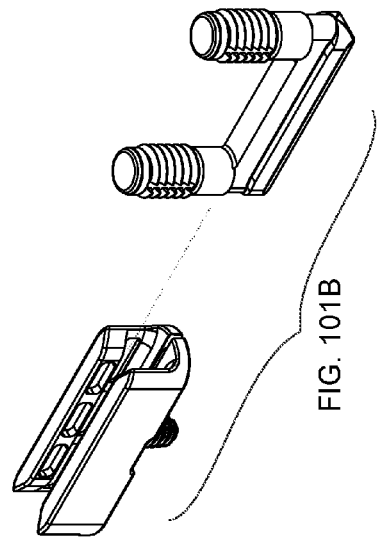
FIGS. 101A-FIG. 101D illustrate the assembling of the channel lock shelf fastener, according to an embodiment of the present invention.
Figure 101D:
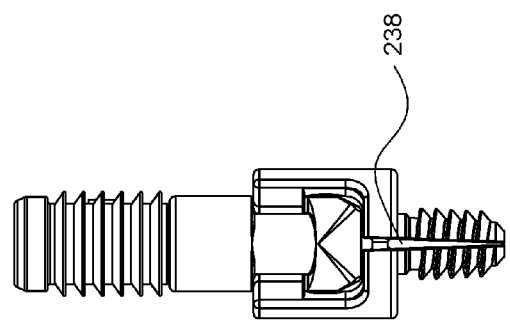
Figure 101A:
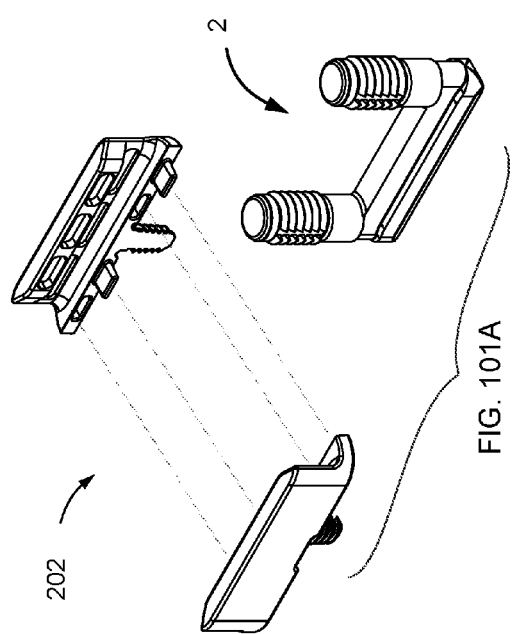
Figure 101C:
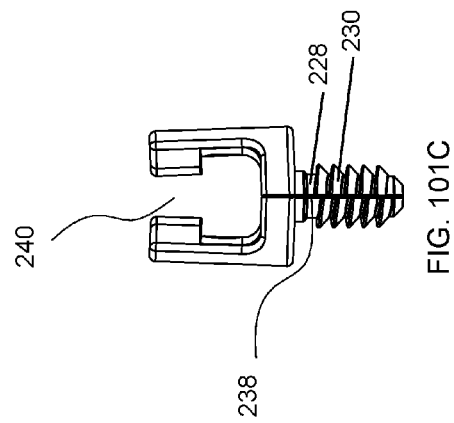
Figure 109:
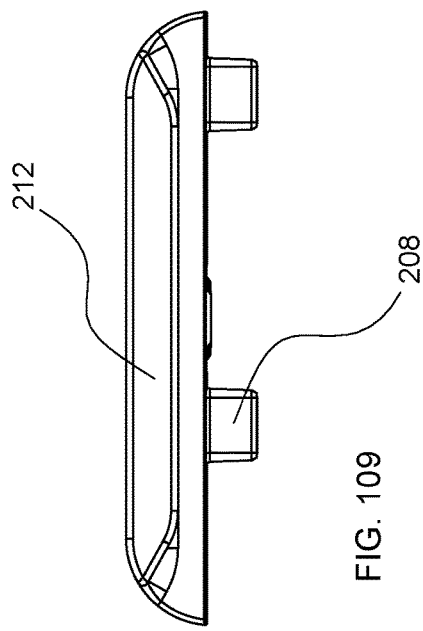
Figure 113:
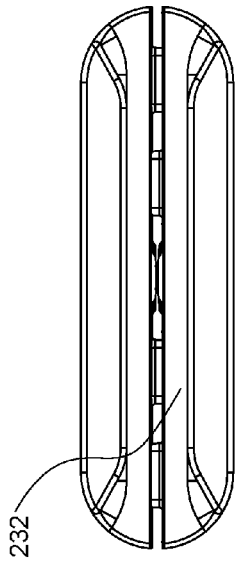

FIGS. 101A-FIG. 101D illustrate the assembling of the channel lock shelf fastener 202, according to an embodiment of the present invention. The channel lock shelf fastener 202 is used in conjunction with the barbed channel lock 2 to create this joint. Its main function will be for use in closets and cabinets but is not limited to such. The channel lock shelf fastener 202 works with partitions and end panels with standard five millimeter diameter line bores 246 and can be easily installed and removed to alter shelf spacing. As shown in FIG. 101A, the channel lock shelf fastener 202 consists of two identical halves that mate together via the alignment pins 208 and alignment holes 210 (not shown, see FIG. 109). Once aligned, the two halves of the channel lock shelf fastener 202 can be put together as shown in FIG. 101A and FIG. 101B. FIG. 101C, illustrates a side view of the channel lock shelf fastener 202 without the barbed channel lock 2 inserted into the keyway 232 (not shown, see FIG. 113). The two halves of the channel lock shelf fastener 202 are pinched together by the user and the barbed post 228 can be inserted straight into the five millimeter diameter bores 246 in the partition 242 or end panel. When pinched together, the mating surfaces 218 of each half of the channel lock shelf fastener 202 are substantially flush as shown in FIG. 101C. In this configuration, the gap 238 is in the closed position. The gap 238 expands and contracts. As the barbed channel locks 2 slide into the channel lock shelf fasteners 202, the two halves of the channel lock shelf fasteners 202 are spread apart approximately 1 to 2 mm to open the expansion/contraction gap 238 as shown in FIG. 101D.

Figure 107:
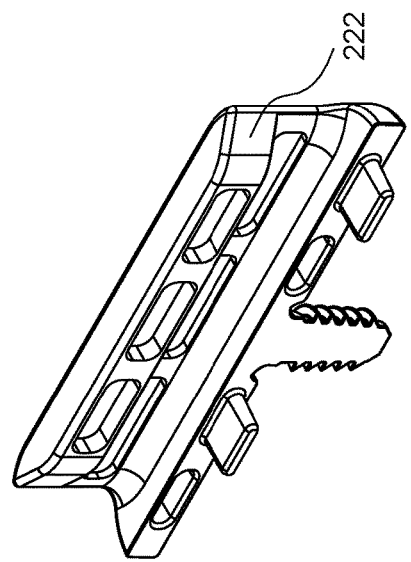
Figure 108:
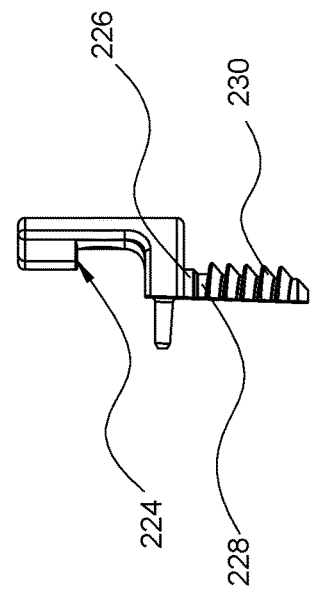
Figure 106:
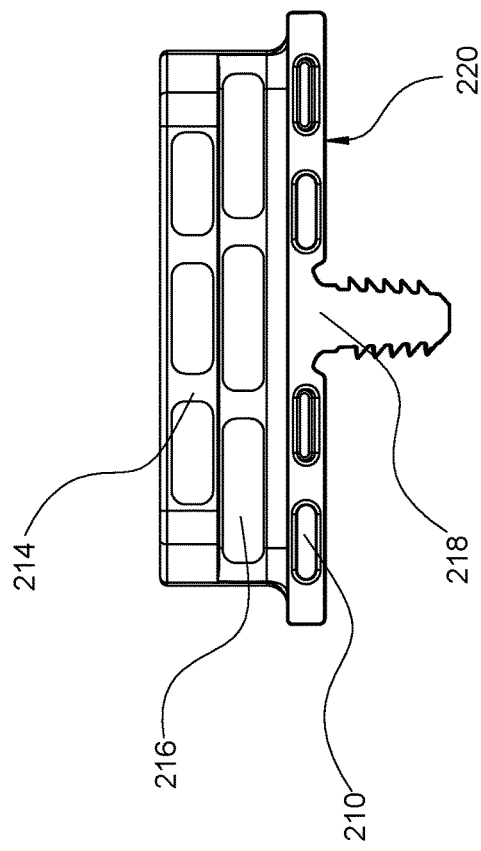
FIG. 106 illustrates a front view of one half of the channel lock shelf fastener, according to an embodiment of the present invention.

FIG. 102 illustrates a front view of the barbed channel lock 2 installed on a channel lock shelf fastener 202, according to an embodiment of the present invention. FIG. 103 illustrates a perspective view of the barbed channel lock 2 installed on a channel lock shelf fastener 202, according to an embodiment of the present invention. FIG. 104 illustrates a side view of a barbed channel lock 2 installed on a channel lock shelf fastener 202, according to an embodiment of the present invention. FIG. 105 illustrates a top view of a barbed channel lock 2 installed on a channel lock shelf fastener 202, according to an embodiment of the present invention having an adjustable shelf fastener side 1 204 and an adjustable shelf fastener side 2 206. FIG. 106 illustrates a front view of one half of the channel lock shelf fastener, according to an embodiment of the present invention having a center support 214, a recess 216, an alignment hole 210, a mating surface 218, a stopping face 2 220. FIG. 107 illustrates a perspective view of one half of the channel lock shelf fastener, according to an embodiment of the present invention having an insertion chamfer 222. FIG. 108 illustrates a side view of one half of the channel lock shelf fastener, according to an embodiment of the present invention having an undercut 224, barbed post 228, sold post 226, and barb 230.

Figure 111:
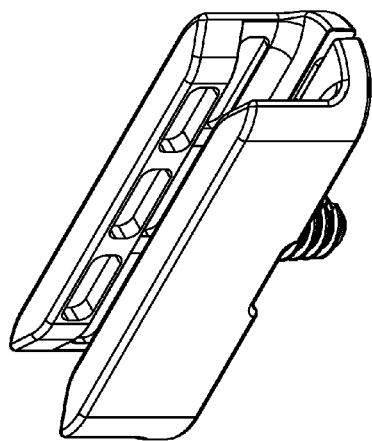
Figure 112:
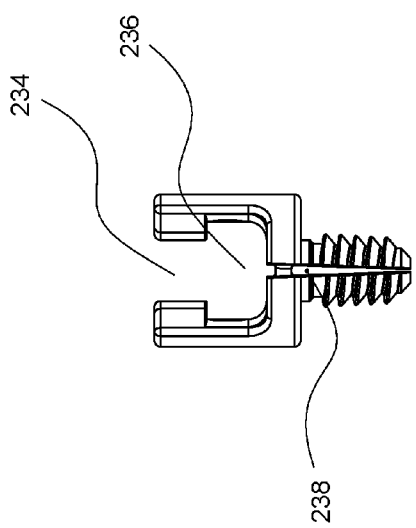
Figure 110:
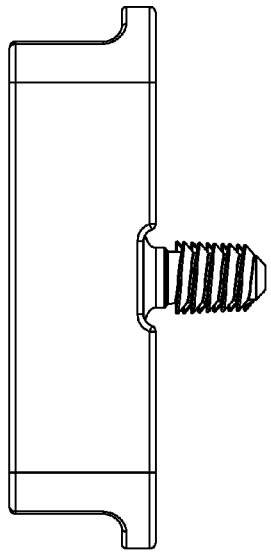

FIG. 110 illustrates a front view of the outer surface of the channel lock shelf fastener 202, according to an embodiment. FIG. 111 illustrates a perspective view of the assembled adjustable shelf fastener side 1 and 2, according to an embodiment of the present invention. The two sides are mirror images of each other. FIG. 112 illustrates a side view of the assembled channel lock shelf fastener 202, according to an embodiment of the present invention having a center support slot 234, an undercut slot 236, and a gap 238 that expands and contracts.

FIGS. 114-117 illustrate an adjustable shelf assembly, according to an embodiment of the present invention. The interference between the barbs 230 and the inner surface of the bore 246 is approximately zero so the barbed post 228 can easily be pushed into the bore 246 until the stopping face 2 220 (not shown, see FIG. 109) is substantially flush against the partition 242 or end panel as shown in FIG. 115. If difficulty is experienced when inserting the barbed post 228 into the bore 246, the barbs 230 are configured in a helical thread pattern so that the channel lock shelf fastener 202 can be easily threaded clockwise into the bore 246. Once the stopping face 2 220 is substantially flush, the channel lock shelf fastener 202 is oriented approximately horizontal so that the insertion chamfer 222 (not shown, see FIG. 107) of the keyway 232 is parallel with the front edge of the partition 242 or end panel. At least 4 pairs (8 halves) of the channel lock shelf fasteners 202 and 4 barbed channel locks 2 are used per shelf.

As shown in FIGS. 118-121, the shelf 244 should have a minimum thickness of 18 millimeters and have a ½" blind dado 136 routed along the two connecting edges of the shelf. As shown in FIG. 120, the dado 136 should be approximately centered on the edge, with one end of the dado 136 open and the other end of the dado 136 close. The open end of the dado 136 goes through the back edge of the shelf 244. The close end of the dado 136 stops at approximately 30 mm from the front edge of the shelf 244. The depth of the dado 136 should be at least the height of the channel lock shelf fastener 202 so the channel lock shelf fastener 202 is recessed and hidden inside the dado 136 once the shelf 244 is installed and the stopping face 1 212 is substantially flushed against the bottom of the dado 136. The 8 mm bores 246 are drilled on about the center of the shelf 244 edge and dado 136. The 8 mm bore 246 depths in the shelf 244 must be at least the length of the channel lock barbed post 45 plus the depth of the dado 136 so the stopping face 25 of the barbed channel lock 2 sits substantially flush against the bottom of the dado 136 once the barbed posts 228 are inserted into the 8 mm bores 246. Once the 4 barbed channel locks 2 are inserted into the shelf edges and the channel lock shelf fastener 202 are inserted into the desired 5 mm bores 246 of the partition 242 or end panel as shown in FIG. 114 and FIG. 115, the shelf 244 is connected to the partitions 242 by sliding in the direction of the centerlines shown in FIG. 115. As the shelf 244 is sliding onto the channel lock shelf fasteners 202, the dado 136 guides the channel lock shelf fasteners 202 and aligns the insertion chamfer 222 of the keyway 232 with the wedge edge 35 of the barbed channel lock 2. The insertion ramp 5 then guides the key step 10 into the undercut slot 236 in the same fashion as the double slot 85, and the interference edge 30 creates a friction fit against the undercut 234 of the channel lock shelf fastener 202. The barbed channel locks 2 closest to the back edge of the shelf 244 slide completely through the two front sets of channel lock shelf fasteners 202 so that they pass through and eventually slide into the keyways 232 of the two rear sets of channel lock shelf fasteners 202. As the barbed channel locks 2 slide into the keyways 232 of the channel lock shelf fasteners 202, the two halves of the channel lock shelf fasteners 202 are spread apart approximately 1 to 2 mm to open the expansion/contraction gap 238 as shown in FIG. 101D. The channel lock shelf fastener's 202 center support slot 234 is spread apart by the center support 20 of the barbed channel lock 2 to open the expansion/contraction gap 238. Opening the gap 238 creates an interference between the channel lock shelf fastener barbs 230 and the inner walls of the 5 mm partition 242 or end panel bores 246, which secures the channel lock shelf fastener 202 to the partition or end panel 242. Once the shelf 244 is fully installed in its final position as shown in FIG. 116, all of the barbed channel locks 2 are fully engaged in the keyways 232 of the channel lock shelf fasteners 202 as shown in FIG. 102 and FIG. 104, and all of the channel lock shelf fastener barbs 230 are wedged tightly inside the 5 mm bores 246 of the substrate. Once the shelf 244 is installed, all fasteners are hidden and the shelf is firmly fixed to the partitions 242 or end panels as shown in FIG. 116 and FIG. 117. To change the shelf position, the shelf 244 can simply slide back out with considerable force without tools, the channel lock shelf fasteners 202 can be removed by pulling out or unthreading out of the 5 mm bores 246 of the partitions 242 or end panels, then pushed back into the partition 242 or end panels in different bore locations, and the shelf 244 is reinstalled in the same manner just described.

According to embodiments of the present invention, the embodiments of the fasteners described herein may have a pull force ranging from about 90 to about 130 and a sheer force of over 100 pounds. However, other forces are possible as the pull force and sheer force may change depending on the material of the substrate or panel 75. In embodiments of the present invention, the fastener comprises a symmetrically formed solid body. In embodiments, the body is made of a solid polymeric material or a non-metal material. In other embodiments, the body is made of solid metallic material.

Throughout the description and drawings, example embodiments are given with reference to specific configurations. It will be appreciated by those of ordinary skill in the art that the present invention can be embodied in other specific forms. Those of ordinary skill in the art would be able to practice such other embodiments without undue experimentation. The scope of the present invention, for the purpose of the present patent document, is not limited merely to the specific example embodiments or alternatives of the foregoing description.

What is claimed is:

1. A fastening system comprising:
    a fastener body having a first surface opposing a parallel second surface, a first face opposing a parallel second face, the first and second faces perpendicular to the first and second surfaces, each of the first and second surfaces terminating at a first end and opposing second end;
        at least the first face having chamfered edges where the first face transitions to the first surface and where the first face transitions to the second surface,
        a channel formed longitudinally into each of the first and second surfaces, continuously spanning between the first and second ends, the channel of the first surface substantially identical to the channel of the second surface,
        each channel recessed at a depth into a center of the body to form at least one step near the first face and/or the second face, and extending lengthwise between the first and second ends, each channel having a first edge bounding the channel near the first face and a second edge bounding the channel near the second face, wherein a maximum depth of the first edge is equal to a maximum depth of the second edge, such that the first edge and second edge terminate at an equal distance out from the center; and
    a slot routed directly in a surface of a substrate, the slot having a first section beginning from a first end and a second section beginning from an opposing second end, the slot configured to initially receive a face of the fastener body at the first section, the second section configured to slidingly receive the fastener body from the first section, the second section having an undercut corresponding to the step of the channel, the undercut parallel to and adjacent the first edge of the fastener body when received, creating a friction fit connection.

2. The fastening system of claim 1, wherein at the surface of the substrate, the first section of the slot is wider along a length of the first section than along a length of the second section of the slot, and the first section having a length at least as long as a length of the fastener body.

3. The fastening system of claim 2, where a width of the second section changes from the surface of the substrate along a depth of the second section into the substrate.

4. The fastening system of claim 1, wherein the first surface and the second surface are symmetrical.

5. The fastening system of claim 1, wherein the first end and the opposing second end of the fastener are each rounded.

6. The fastening system of claim 1, wherein the at least one step terminates with a tapered end at the first end and opposing second end of the fastener.

7. The fastening system of claim 1, wherein the at least one step terminates with a ramped end at the first end and opposing second end of the fastener.

8. The fastening system of claim 1, wherein at least the first face comprises a chamfered edge where the first face transitions to the first surface and another chamfered edge where the first face transitions to the second surface.

9. The fastening system of claim 1, wherein the second face extends out with at least two spaced apart posts.

10. The fastening system of claim 9, wherein each of the at least two spaced apart posts comprise a plurality of barbs surrounding an outer surface of each post.

11. The fastening system of claim 10, wherein the two spaced apart posts are configured to press into a second substrate such that the first face with the at least one step is exposed for engaging with the slot.

12. The fastening system of claim 1, wherein the first face is symmetrical to the second face.

13. The fastening system of claim 1, wherein the second face further comprises chamfered edges where the second face transitions to the first surface and where the second face transitions to the second surface.

14. The fastening system of claim 1, wherein for each channel, the at least one step comprises a first step extending longitudinally near the first face and an opposite second step extending longitudinally near the second face.

15. The fastening system of claim 14, wherein the first step and second step each terminates with a ramped end at the opposing first end and second end of the fastener.

* * * * *